US011605387B1

(12) United States Patent
Muralitharan et al.

(10) Patent No.: US 11,605,387 B1
(45) Date of Patent: Mar. 14, 2023

(54) ASSISTANT DETERMINATION IN A SKILL

(71) Applicant: Amazon Technologies, Inc., Seattle, WA (US)

(72) Inventors: Yamini Muralitharan, Chennai (IN); Mugunthan Govindaraju, Chennai (IN); Aparna Nandyal, Chennai (IN); Jintomon Joseph, Chennai (IN); Suresh Boddu, Rajahmundry (IN); Leopold Bushkin, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 168 days.

(21) Appl. No.: 17/217,148

(22) Filed: Mar. 30, 2021

(51) Int. Cl.
*G10L 15/32* (2013.01)
*G10L 15/22* (2006.01)
*G10L 13/033* (2013.01)
*G10L 15/18* (2013.01)

(52) U.S. Cl.
CPC ............ *G10L 15/32* (2013.01); *G10L 13/033* (2013.01); *G10L 15/1815* (2013.01); *G10L 15/22* (2013.01); *G10L 2015/223* (2013.01)

(58) Field of Classification Search
CPC ... G10L 15/32; G10L 13/033; G10L 15/1815; G10L 15/22; G10L 2015/223
See application file for complete search history.

(56) References Cited

U.S. PATENT DOCUMENTS

| 10,692,489 | B1 | 6/2020 | Grizzel |
| 11,037,555 | B2 * | 6/2021 | Kothari ................. G06F 1/3203 |
| 2020/0241829 | A1 * | 7/2020 | Long .......................... G06F 3/16 |
| 2022/0180867 | A1 * | 6/2022 | Bobbili .................... G10L 15/22 |

FOREIGN PATENT DOCUMENTS

| WO | 2016085776 A1 | 6/2016 |
| WO | 2018009897 A1 | 1/2018 |

OTHER PUBLICATIONS

International Search Report and Written Opinion dated Apr. 5, 2022 for International Patent Application No. PCT/US2021/061713.

* cited by examiner

*Primary Examiner* — Abul K Azad
(74) *Attorney, Agent, or Firm* — Pierce Atwood LLP

(57) ABSTRACT

A speech-processing system may provide access to multiple virtual assistants. Speech-processing systems may perform actions for or on behalf of users with the aid of skills; e.g., a shopping skill, navigation skill, communications skill, etc. Some skills may be associated with more than one assistant. The speech-processing system may determine which assistant to invoke upon receiving a command from a user device. The identity of the virtual assistant is propagated to the skill and the device, as well as other components of the speech-processing system. In some cases, however, a multi-assistant skill may determine that an assistant other than the one initially selected by the speech-processing system is to handle the command. The skill may send the identity of the new assistant back to the speech-processing system. The speech-processing system may restart the command dissemination process to provide each component of the system with the updated assistant identity.

20 Claims, 18 Drawing Sheets

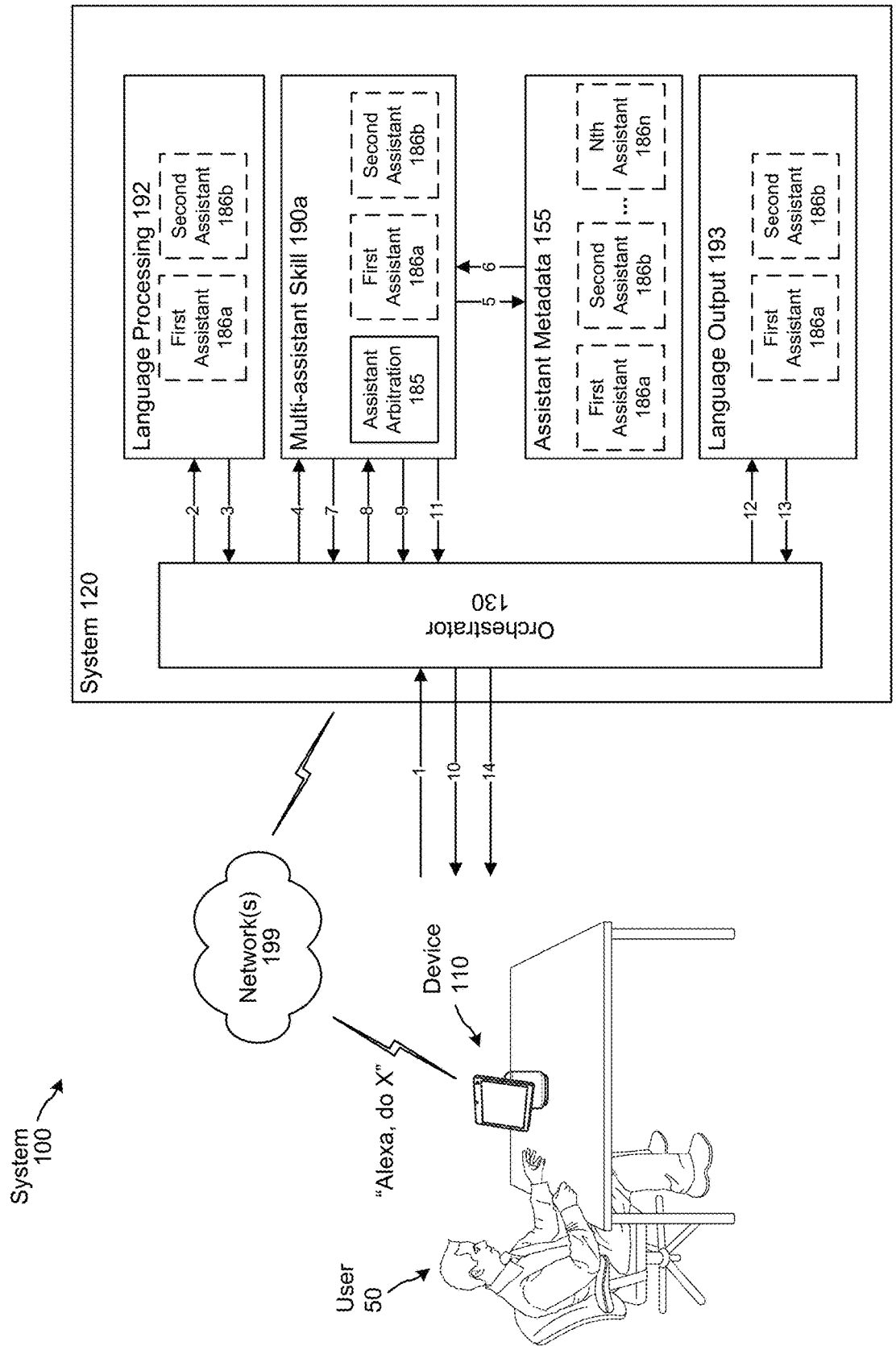

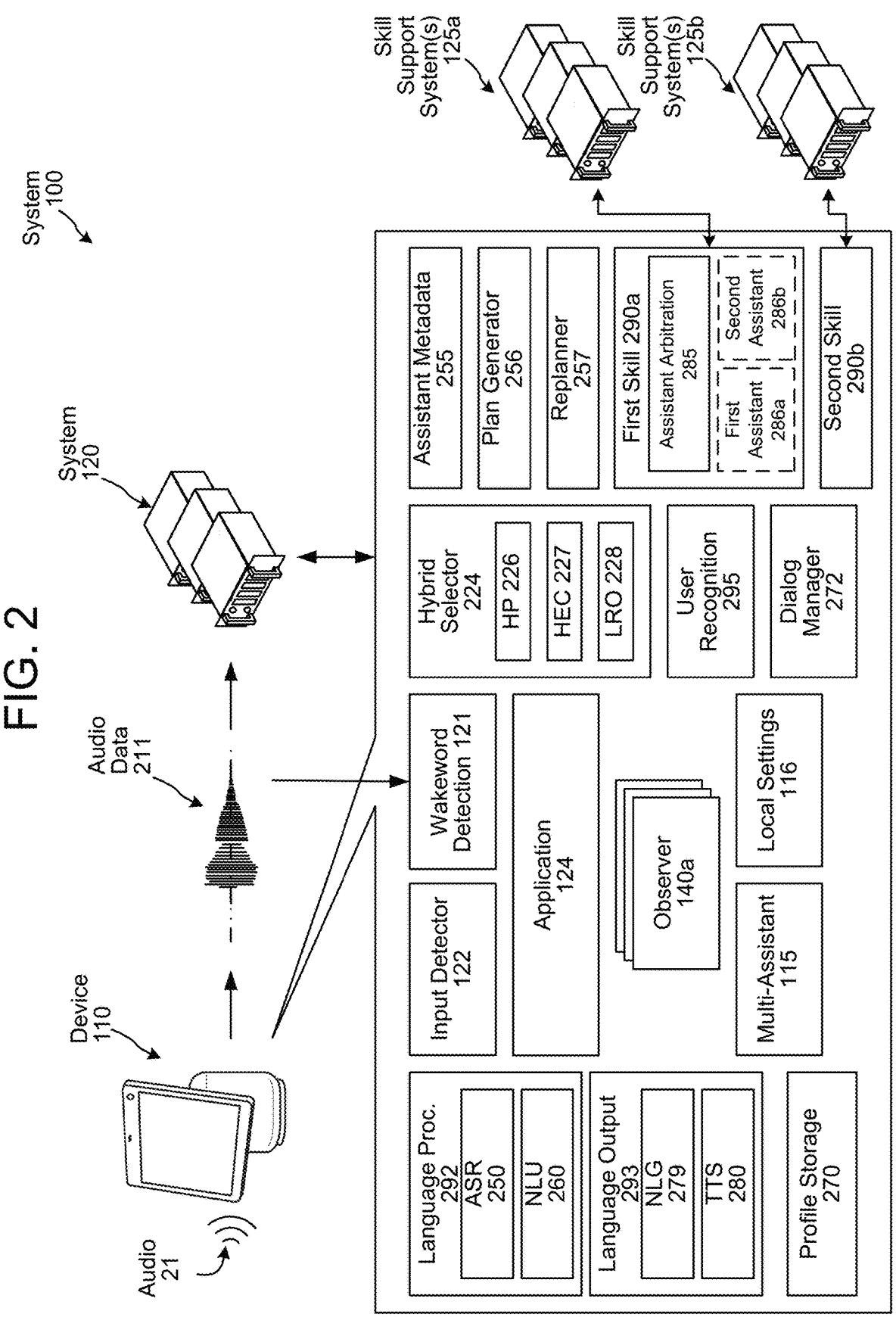

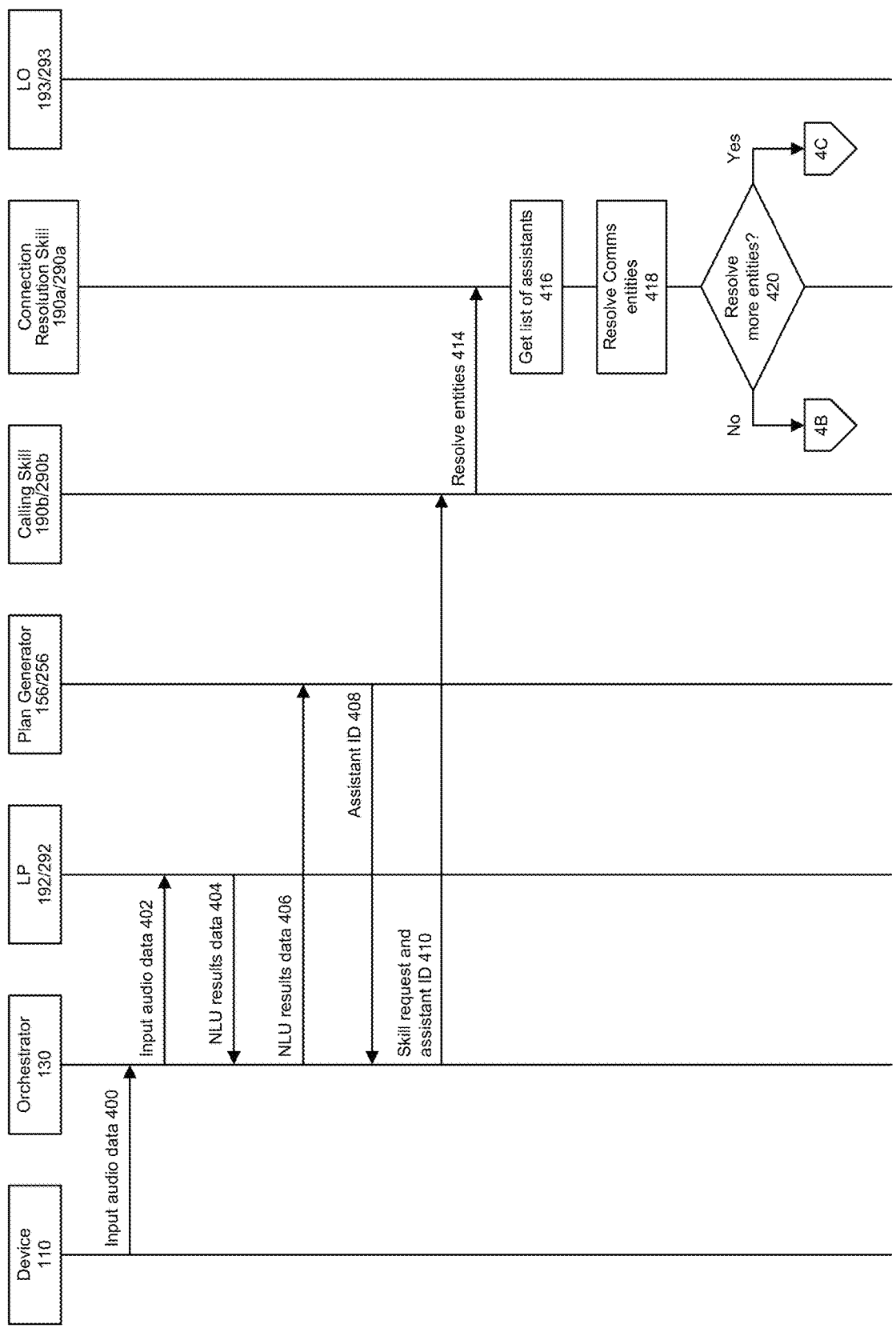

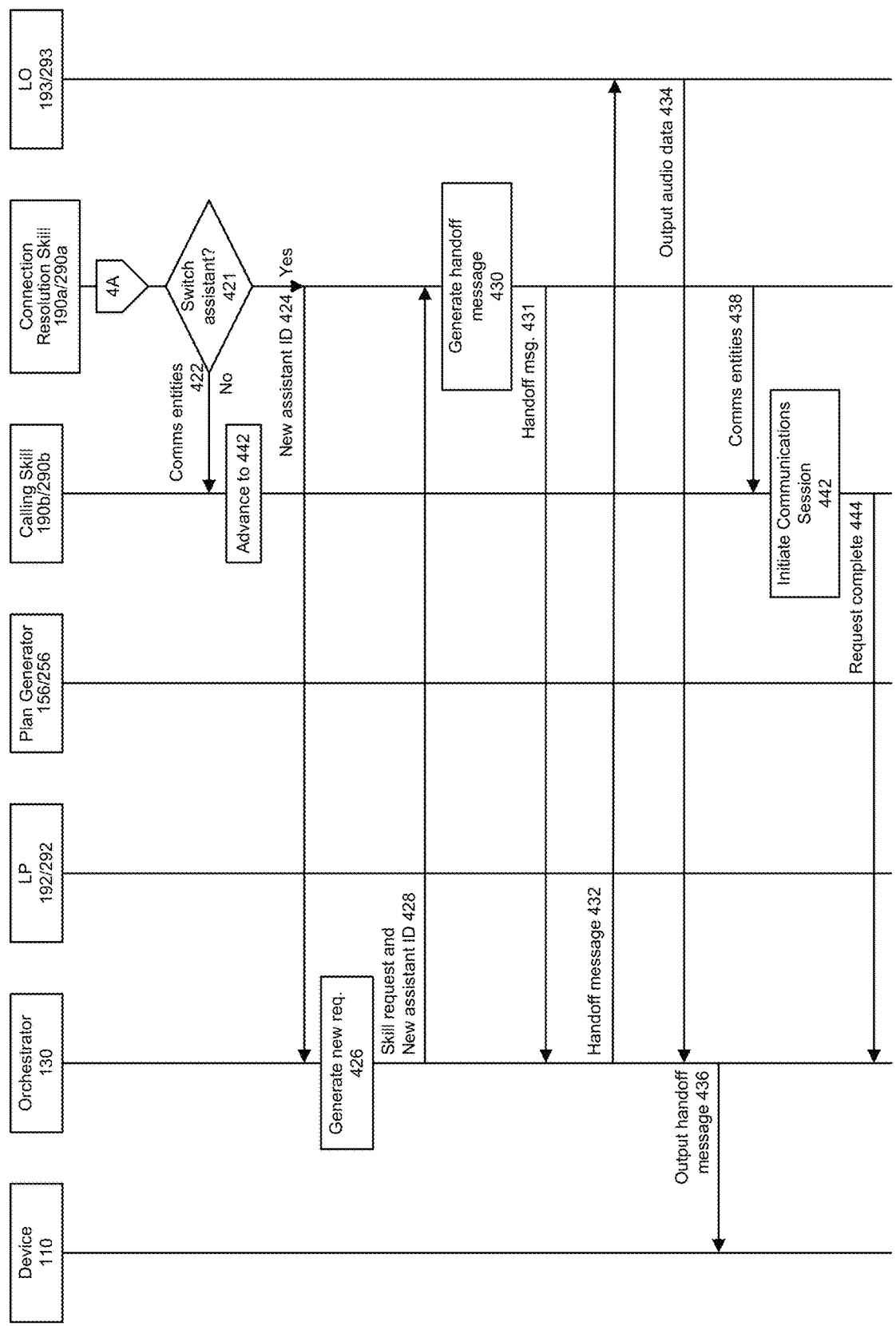

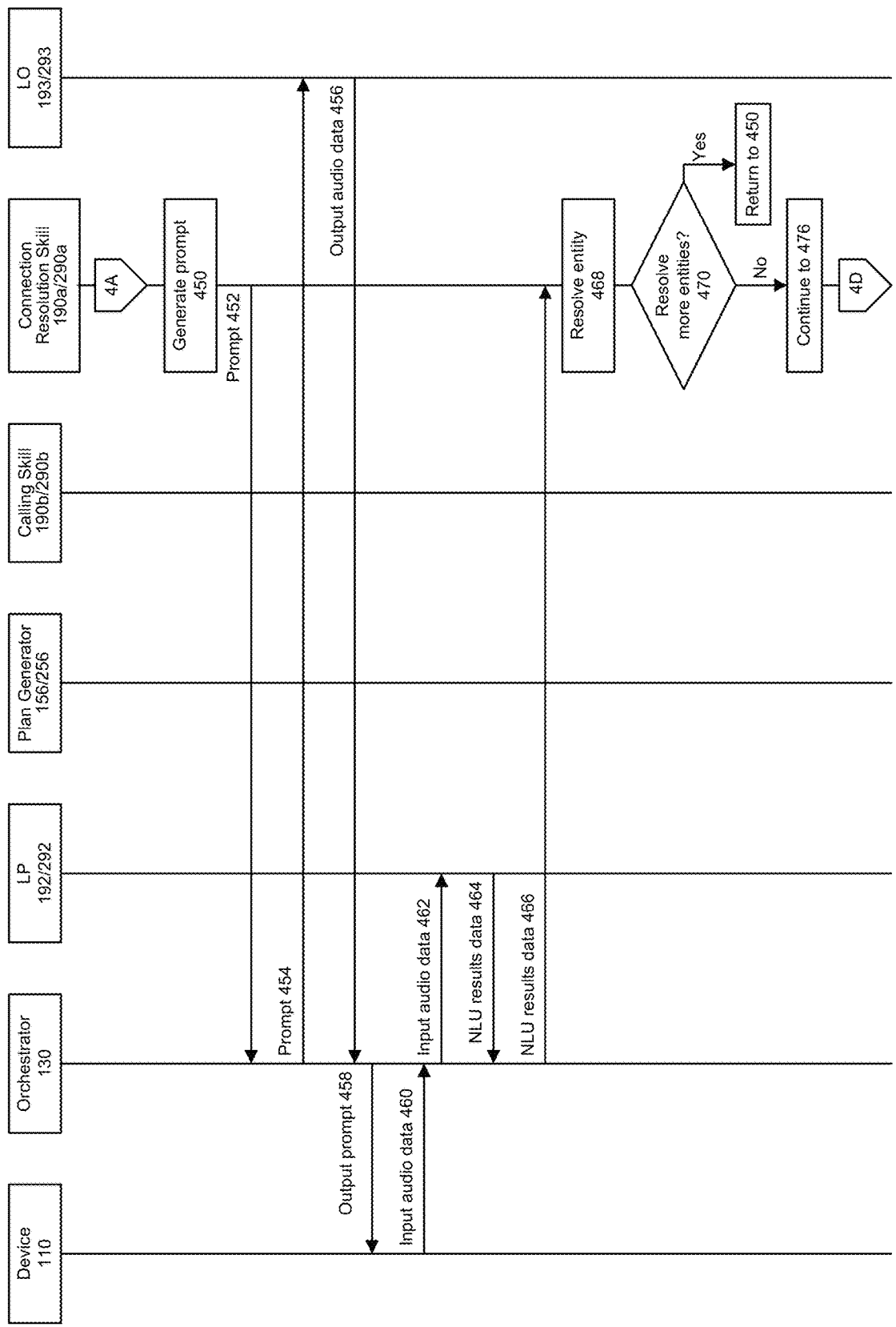

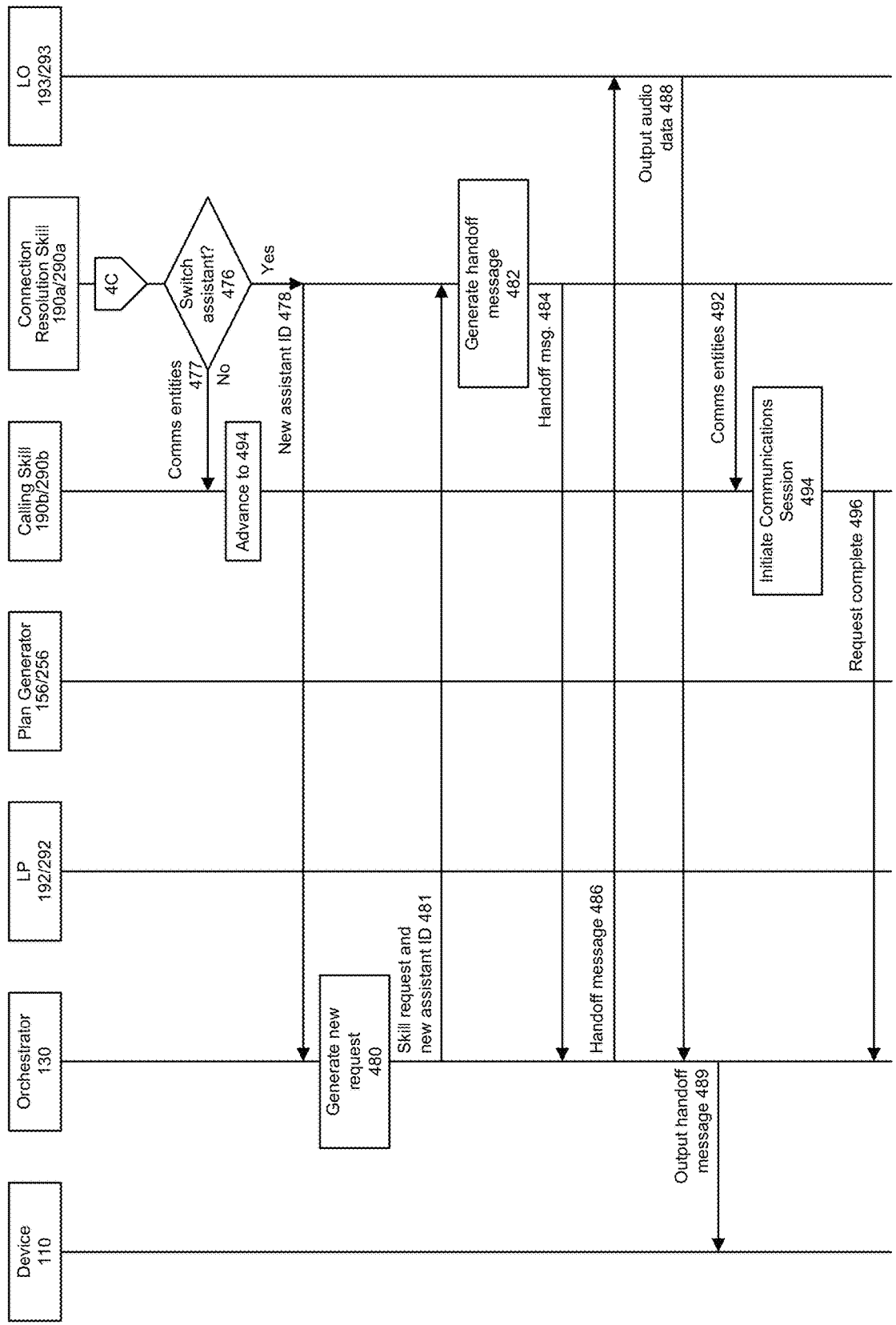

ASSISTANT DETERMINATION IN A SKILL

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating components of a virtual assistant system allowing for assistant determination in a skill, according to embodiments of the present disclosure.

FIG. 2 is a conceptual diagram illustrating components that may be included in a device, according to embodiments of the present disclosure.

FIGS. 4A and 4B are signal-flow diagrams illustrating example operations of a virtual assistant system allowing for assistant determination in a skill, where entities are resolved in a single turn, according to embodiments of the present disclosure.

FIGS. 4C and 4D are signal-flow diagrams illustrating example operations following those illustrated in FIG. 4A, where entities are resolved in a multi-turn scenario, according to embodiments of the present disclosure.

DETAILED DESCRIPTION

Figure 1B:
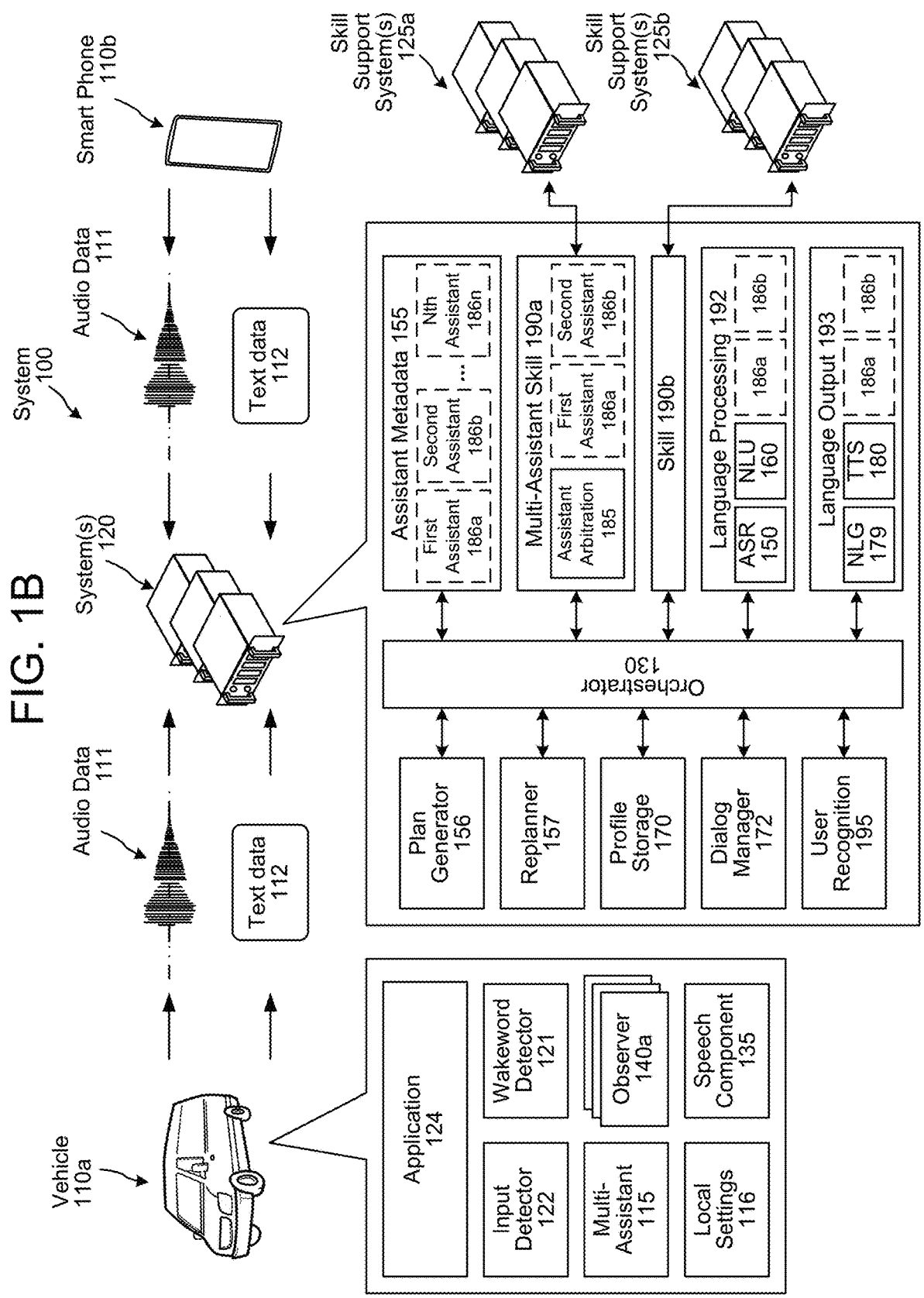
FIG. 1B is a conceptual diagram illustrating components of the virtual assistant system, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system. The assistant can leverage the speech-processing system as well as additional applications and/or skills to perform tasks for and/or on behalf of the user.

Some systems may be able to provide a user with access to multiple different virtual assistants. A user may activate an assistant by speaking a wakeword corresponding to the assistant while near a voice-enabled device and/or by making a gesture such as a button press or other non-verbal movement detectable by the device. For example, a user may invoke a first assistant using the wakeword "Alexa," and a second assistant using the wakeword "Carja," which may correspond to a virtual assistant associated with a vehicle-type device. The device may render an audible or visual indication of the invoked assistant to inform the user which assistant is active, without explicitly naming the assistant. Audible indications may include synthetic speech having a recognizable speech style and/or a distinct sound such as an earcon. Visual indication may include a light color/pattern emitted from the device and/or an image such as a voice chrome displayed on an electronic display of the device. An assistant may be associated with certain services and/or capabilities, referred to as skills. For example, a first assistant may be associated with skills for shopping, weather, and streaming media. A second assistant may be associated with skills for controlling features of the device; for example, windows of a car or lights in a house.

In some cases, a user may attempt to activate a first assistant to execute a command, but the system may determine that a second assistant may better handle the command. Accordingly, the system may perform a handoff to the second assistant. The handoff may include causing the device to output visible or audible indications to the user that the second assistant is now the active assistant. The system may initiate the handoff due to determining that a skill invoked by the command is associated with the second assistant but not the first assistant. For example, the user may say, "Alexa, roll up the car windows." The system may determine that the assistant Carja, and not Alexa, is associated with a skill that controls mechanical features of the car. In such cases, the system may determine the appropriate assistant, and send a skill request to the skill that indicates the active assistant, the requested action, etc.

In some cases, a particular skill may be able to perform actions based on requests associated with more than one assistant. For example, a calling skill may be able to initiate communications sessions such as voice calls and text messaging based on a request associated with Alexa or Carja (or others). An assistant may be associated with an assistant profile. The assistant profile may include or refer to different data associated with a particular virtual assistant and which the skill can use for executing commands. For example, different assistant profiles may correspond to different communication entities. A first assistant profile may be associated with a contact list including a Contact A and a second assistant profile may be associated with a contact list including a Contact B. Similarly, the first assistant profile may be associated with a capability to communicate over voice over internet protocol (VOIP) while the second assistant profile may be associated with a capability to communicate via SMS. Thus, if a user requests initiation of a communications session with a particular contact via a particular network, the calling skill may determine that an assistant other than the one requested by the user (or selected by the speech processing system) may be better able to handle the communications session. This could be because, for example, the requested contact name matches a contact in a contact list associated with the second assistant profile but not in a contact list associated with the first assistant profile.

The identity of the active assistant may implicate other components of the natural language command processing pipeline. In particular, the system may indicate the identity of the active assistant using audible or visual outputs from the device (earcons and/or voice chromes), may determine libraries used by language processing components, and/or may control voice parameters used by language output components. Accordingly, the skill may send the identity of the selected assistant profile back to the system for propagation to other components. When the speech processing system initiates a record of the skill request, however, the system may set the identity of the requested and/or selected assistant profile as an immutable entity maintained for the duration of the request. Thus, to enable a skill to update the assistant identity and set a new active assistant for processing the request, the skill may send an assistant identifier of the new assistant along with an indication that the selected assistant should be updated. The speech processing system may then recreate the record of the request, and resubmit the updated request to the skill and other components for processing. The skill (or other component of the system) may render a handoff to signal to the user that the active assistant has changed, and then execute the command according to the updated request; for example, buy using data associated with the assistant profile of the new active assistant.

In some cases, the skill may prompt the user for additional information for selecting a new active assistant. For example, the user may say, "Alexa, call Aaron B." The Alexa assistant profile may be associated with a contact list that includes an "Aaron Butler" and the Carja assistant profile may be associated with a contact list that includes an "Aaron Bellwether." The skill may determine that the command is ambiguous, and prompt the user for disambiguation. The skill may cause the device to output a prompt: "Did you mean 'Aaron Butler?'" Based on the user's answer, the skill may determine which contact, and thus which assistant profile, to select and set as the active assistant. The skill may iterate until entities associated with the requested communications session are identified, and an assistant is selected. The skill may notify the system that the selected assistant should be set as the new active assistant, and may generate a handoff message to notify the user of the change in active assistant profile. The skill can initiate the communications session based on the new active assistant profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating components of a virtual assistant system 100 allowing for assistant determination in a skill, according to embodiments of the present disclosure. As shown in FIG. 1A, the virtual assistant system 100 may include a voice-enabled device 110 local to a user 50, a natural language command processing system 120 (abbreviated "system 120"), and one or more skill support systems 125 (shown in FIGS. 1B and 2) connected across one or more networks 199. Although the figures and discussion of the present disclosure illustrate certain steps in a particular order, the steps described may be performed in a different order (as well as certain steps removed or added) without departing from the present disclosure.

The system 100 may provide the user 50 access to one or more virtual assistants. The system 100 may maintain a plurality of assistant profiles such as a first assistant profile 186a, a second assistant profile 186b, up to an Nth assistant profile 186n (collectively, "assistant profiles 186") in an assistant metadata component 155. An assistant profile 186 can include or refer to data associated with a virtual assistant including entity libraries that may be specific to the virtual assistant, voice characteristics for synthesized speech that may allow the user 50 to recognize the virtual assistant in absence of the system 100 explicitly identifying the assistant, and other audible or visible indications the device 110 may output to indicate the identity of the virtual assistant. An assistant profile may also include capabilities of the assistant; for example, skills the virtual assistant may be able operate in conjunction with, locations (e.g., countries) the virtual assistant may operate in, device types the virtual assistant may be accessed with, etc. Various components of the system 100 may use information associated with an assistant profile 186 when performing operations related to a command; for example, language processing components 192 performing speech recognition, language output components 193 performing synthetic speech generation, and/or the device 110 outputting visible/audible indicators of the active assistant profile.

Some skills, such as the multi-assistant skill 190a, may operate in conjunction with more than one virtual assistant.

The assistant metadata component 155 may maintain the assistant profiles 186 as well as additional data related to the assistant profiles 186. The multi-assistant skill 190*a* may retrieve one or more assistant profiles 186 from the assistant metadata component 155, depending on an active assistant profile for a dialog. In some cases, a multi-assistant skill 190*a* may be able to select an assistant profile for executing a command, even if another component of the system 100 has selected a different assistant profile for executing the command. The multi-assistant skill 190*a* may then send the identity of the new assistant profile (e.g., in the form of an assistant identifier) back to the other components of the system 100. An orchestrator component 130 of the system 100 may send data to/from the various components of the system 100. Upon receiving the assistant identifier of the new assistant profile 186, the orchestrator 130 may disseminate the assistant identifier to other components of the system 100, thereby changing the active assistant profile to reflect the assistant profile 186 selected by the multi-assistant skill 190*a*.

The various assistant profiles 186 may relate to different types of virtual assistants having different capabilities. For example, the first assistant profile 186*a* may correspond to the "Alexa" virtual assistant, and a second assistant profile 186*b* may correspond to a "Computer" virtual assistant. "Alexa" may be a wakeword associated with the first assistant profile 186*a* such that the system 100, upon detecting the wakeword, sets the first assistant profile 186*a* as the active assistant profile. Likewise, "Computer" may be a wakeword associated with the second assistant profile 186*b* such that the system 100 sets the second assistant profile 186*b* as the active assistant profile. In one example, the Computer virtual assistant may be a smart-home assistant that can control features of a smart home such as locks, windows, environmental controls, etc. An assistant profile 186 for the smart-home Computer virtual assistant may include entities and names for rooms, fixtures, and/or appliances of the smart home. In another example, the Computer virtual assistant may be a productivity assistant, such as a work assistant that can perform operations related to a work calendar, an office communications network (e.g., intra-office chat), a payroll and benefits system, etc. An assistant profile 186 for the work Computer virtual assistant may include a contact list of work contacts, credentials for licensed software, login credentials for various IT systems, etc. In yet another example, the Computer virtual assistant may be a vehicle assistant that can control features of a smart vehicle such as a sound system, engine settings, alarm, etc. An assistant profile 186 for the vehicle Computer virtual assistant may include names of windows/doors, preferred environmental or engine settings, a personal contact list for calling/messaging, and/or saved destinations for navigation, etc.

As described above, a multi-assistant skill 190*a* may operate with more than one assistant profile 186. For example, a communications skill 190 (e.g., a calling and/or messaging skill) may be accessible using both the Alexa virtual assistant and the smart-home Computer virtual assistant. The Alexa virtual assistant profile 186 may be associated with a first contact list, and the smart-home Computer virtual assistant profile 186 may be associated with a second contact list. Thus, the communications skill 190 may have contact information for a particular target contact when operating with one assistant profile 186, but not the other. In another example, an entertainment skill 190 may be accessible using both the Alexa virtual assistant and the vehicle Computer virtual assistant. The Alexa virtual assistant profile 186 may be associated with certain entertainment related settings, and the vehicle Computer virtual assistant profile 186 may be associated with other, perhaps overlapping, entertainment settings. So in some cases, both virtual assistant profiles 186 may have access to streaming media from the internet, but only the vehicle Computer virtual assistant profile 186 may have access to set the vehicle sound system to receive terrestrial radio and preset AM/FM stations. In yet another example, a productivity skill 190 may be accessible using both the Alexa virtual assistant profile 186 and the office Computer virtual assistant profile 186. The office Computer virtual assistant profile 186 may be associated with access to both a work calendar and a personal calendar, while the Alexa virtual assistant profile 186 may be associated with access to the personal calendar but not the work calendar.

Thus, there may be situations in which the system 120 may initially select a first assistant profile 186*a* to be the active assistant profile for executing a received command, but where it may be beneficial for the multi-assistant skill 190*a* to select the second assistant profile 186*b* to be the active assistant profile (or vice-versa). In an example operation, the user 50 may utter a spoken command in proximity to the device 110; for example, "Alexa, do X." The device 110 may recognize the wakeword "Alexa" as corresponding to the first assistant profile 186*a*. The device 110 may display and/or emit visible and/or audible indicators associated with the first assistant profile 186*a*. The device may send (step 1) a first assistant identifier corresponding to the first assistant profile 186*a* along with audio data representing the command to the system 120 via the network 199. The system 120 may initiate a dialog that includes the command and, based on the first assistant identifier, set the first assistant profile 186*a* as the active assistant profile for the dialog. The orchestrator 130 may send (step 2) the audio data to the language processing components 192 for speech processing. The language processing components 192 may process the audio data using data associated with the first assistant profile 186*a*; for example, acoustic models, language models, and/or entity libraries. The language processing components 192 may retrieve the assistant-specific data from, for example, the assistant metadata component 155. The language processing components 192 may return (step 3) speech processing results data to the orchestrator 130. The speech processing results may include indicators related to an intent, a skill, and/or an entity, etc. The orchestrator 130 may initiate a skill request associated with the dialog and with the first assistant profile 186*a* as the active assistant profile, and send (step 4) the speech processing results to the indicated skill (or a skill associated with the indicated intent). In this case, the indicated skill may be the multi-assistant skill 190*a*. Upon receiving the speech processing results, the multi-assistant skill 190*a* may perform assistant arbitration using an assistant arbitration component 185.

Assistant arbitration is a process of selecting an assistant profile 186 for executing a command represented by the speech processing results. The multi-assistant skill 190*a* may query (step 5) the assistant metadata component 155 for one or more assistant profiles 186 that may be enabled or available for use with commands received from the device 110. In some implementations, the multi-assistant skill 190*a* may send the query and receive a response via the orchestrator 130. The assistant metadata component 155 may return (step 6) the one or more assistant profiles 186 to the multi-assistant skill 190*a*. In some cases, assistant arbitration may be performed based on one or more entities represented in the speech processing results. For example, the assistant arbitration component 185 may determine that a target entity potentially corresponds to a first entity associated with the second assistant profile 186b with a higher probability than it corresponds to a second entity associated with the first assistant profile 186a. If the assistant arbitration component 185 determines that the multi-assistant skill 190a can execute the command preferably or only using data associated with the second assistant profile 186b, the multi-assistant skill 190a may cause the system 120 to change the active assistant profile to the second assistant profile 186b. The multi-assistant skill 190a may send (step 7) a second assistant identifier back to the orchestrator 130. The orchestrator 130, in order to change the active assistant profile and notify the other components of the system 100, may restart the skill request associated with the dialog and send (step 8) a new skill request with the new assistant identifier back to the multi-assistant skill 190a. In some implementations, the multi-assistant skill 190a may cause (step 9) the system 100 to render a handoff indication that signals to the user that the active assistant profile has changed. The handoff may be a message; for example, "Computer can help you with that" in Alexa's voice, or "Computer here, I can help you with that" in Computer's voice. In some implementations, the handoff may be non-verbal audible output such as an earcon associated with the second assistant profile 186b, or a visible output such as a change in a color/image displayed by the device 110. The orchestrator 130 may cause (step 10) the device to output the handoff indication.

The multi-assistant skill 190a may execute the command represented in the speech processing results using data associated with the second assistant profile 186b (e.g., entities associated with the second assistant profile 186b). The multi-assistant skill 190a may return (step 11) response data to the orchestrator 130. The orchestrator 130 may send (step 12) the response data to the language output components 193 for generating output data. The language output components 193 may generate the output data using data associated with the second assistant profile 186b. For example, the second assistant profile 186b may be associated with a certain speech style. The language output components 193 may thus generate synthetic speech having a speech style associated with the second assistant profile 186b. The language output components 193 may return (step 13) output audio data representing the synthetic speech back to the orchestrator 130. The orchestrator 130 may send (send 14) the output audio data to the device 110 for output. The user 50, having uttered a command addressed to Alexa, may receive a response in the voice of Computer. The response may indicate successful execution of the command by the Computer virtual assistant, when the Alexa virtual assistant may not have had the capability to execute the command as given.

FIG. 1B is a conceptual diagram illustrating components of the virtual assistant system 100, according to embodiments of the present disclosure. The system can include a device such as a vehicle 110a and/or a smart phone 110b (collectively, "devices 110") and a natural language command processing system (or speech-processing system) 120, abbreviated herein as "system 120." The system 120 may be associated with one or more skill support systems 125a, 125b, etc. (collectively "skill support systems 125") for augmenting the functions of the system 120, as described further below. A device 110 can receive natural language inputs in the form of audio data 111 and/or text data 112, and forward the data to the system 120 for processing, including execution of a command embodied in the data. Although the figures and discussion of the present disclosure illustrate certain steps in a particular order, the steps described may be performed in a different order (as well as certain steps removed or added) without departing from the present disclosure.

Figure 14:
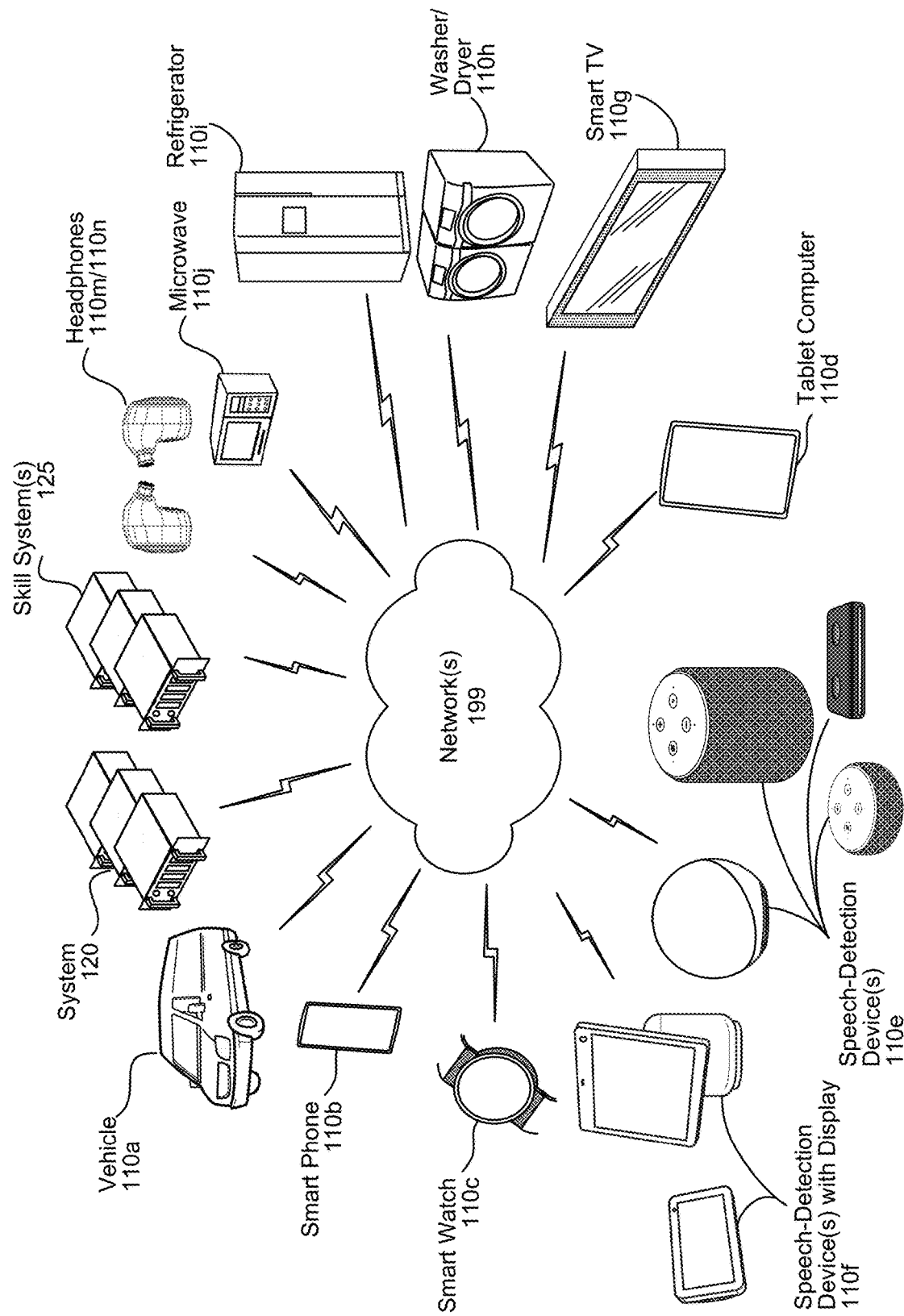
FIG. 14 illustrates an example of a computer network for use with the overall system, according to embodiments of the present disclosure.

The device 110 may receive audio corresponding to a spoken natural language input originating from the user. The device 110 may process audio following detection of a wakeword. The device 110 may generate audio data corresponding to the audio, and may send the audio data to the system 120. The device 110 may send the audio data to the system 120 via an application 124 that is installed on the device 110 and associated with the system 120. An example of such an application is the Amazon Alexa application that may be installed on a smart phone, tablet, or the like. In some implementations, the application 124 may be an original equipment manufacturer (OEM) application. In some implementations, the device 110 may receive text data 112 corresponding to a natural language input originating from the user, and send the text data to the system 120. The device 110 may also receive output data from the system 120, and generate a synthesized speech output. The device 110 may include a camera for capturing image and/or video data for processing by the system 120. An example device 110 is described in additional detail below with reference to FIG. 12. Examples of different types of devices 110 are shown in FIG. 14.

The device 110 may include an application 124 that can be in charge of operating the device 110 and all of its functions. The application 124 may be a source of truth for state data such as parameters regarding physical elements of the device; for example, a volume level, visual indicator, actuators such as vehicle locks or windows, etc. The application 124 may operate (or include) the wakeword detector 121, input detector 122, observers 140, local settings component 116, and/or the speech component 135. In some implementations, these additional components may be software or logic separate from the application 124.

The device 110 may include a wakeword detector 121. Once speech is detected in audio data representing the audio 21, the device 110 may determine if the speech is directed at the device 110 and/or system 120. In at least some embodiments, such determination may be made using a wakeword detection component 121. The wakeword detector 121 may detect a representation of one or more wakewords. A wakeword may be associated with a particular assistant; for example, the "Alexa" and "Carja" previously mentioned. In some implementations, the device 110 may include more than one wakeword detector 121. In some implementations, a first wakeword detector 121 may detect a first wakeword associated with a first assistant and a second wakeword detector 121 may detect a second wakeword associated with a second assistant. In some implementations, a first wakeword detector 121 may detect wakewords in input audio data while a second wakeword detector 121 may detect wakewords in output audio data; that is, data to be output by a speaker of the device 110.

In another example, input to the system may be in form of text data 112, for example as a result of a user typing an input into a user interface of device 110. Other input forms may include indication that the user has pressed a physical or virtual button on device 110, the user has made a gesture, etc. The device 110 may also capture images using camera(s) 1218 of the device 110 and may send image data representing those image(s) to the system 120. The image data may include raw image data or image data processed by the device 110 before sending to the system 120.

The wakeword detector 121 of the device 110 may process the audio data, representing the audio 21, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 21, is analyzed to determine if specific characteristics of the audio data match preconfigured acoustic waveforms, audio signatures, or other data corresponding to a wakeword.

Thus, the wakeword detection component 121 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 121 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 121 and/or input is detected by an input detector 122, the device 110 may "wake" and begin transmitting audio data 111, representing the audio 21, to the system(s) 120. The audio data 111 may include data corresponding to the wakeword; in other embodiments, the portion of the audio corresponding to the wakeword is removed by the device 110 prior to sending the audio data 111 to the system(s) 120. In the case of touch input detection or gesture based input detection, the audio data 111 may not include a wakeword.

The device 110 may include an input detector 122. The input detector 122 may detect certain inputs used for "waking" the device 110, such as a button press or other non-verbal physical movements detectable by the device. A gesture may be associated with a particular assistant; for example, a button press-and-hold gesture may invoke the Alexa assistant, a button press and release ("tap-to-talk") may invoke the Carja assistant, a double-click may invoke a third assistant, etc. Upon the input detector 122 detecting a gesture, the device 110 may begin sending audio data 111 to the system 120 for processing.

The device 110 may give the user access to multiple virtual assistants. Accordingly, the device 110 may include one or more components for coordinating operations associated with the different virtual assistants. The device 110 may include a multi-assistant component 115. The multi-assistant component 115 may receive and process changes in assistant settings, such as setting assistant-specific wakewords and/or gestures. The multi-assistant component 115 may process requests to enable and/or disable assistant, such as the first assistant and/or the second assistant for handling commands received by the device 110. The multi-assistant component 115 can distill the settings change request by seeing how the requested setting differs from the current settings state stored in the local settings component 116, update the local settings component 116 with the new settings, transmit the new settings to the system 120, and assign an observer component 140 to the assistant. The multi-assistant component 115 may retrieve eligible assistant information from system 120 to provide the user with a list of assistants that may be eligible for use with the speech-controlled device 110.

The device 110 may include one or more observers 140a, 140b, 140c, etc. (collectively, "observers 140"). The multi-assistant component 115 may assign an observer component 140 to each assistant enabled for the device 110. The observer component 140 can monitor the application 124, input detector 122, and/or wakeword detector 121 for invocations of the assistant for which it is assigned. The observer component 140 may notify the system 120 of assistant invocation and provide the system 120 with audio data 211, image data, and/or text data 112 associated with the invocation.

The device 110 may include a local settings component 116. The local settings component 116 may be a memory or storage that maintains settings related to the one or more CPSs eligible and/or enabled for the device 110. When the user requests a change to assistant settings, the multi-assistant component 115 can refer to the local settings component 116 to determine how the requested setting change differs from the current settings state stored in the local settings component 116. Following this process of distillation, the multi-assistant component 115 can transmit an indication of one or more assistant settings that have changed to the system 120. The system 120 may include a remote settings storage in, for example, the assistant metadata component 155.

The device 110 may include a speech component 135. The speech component 135 may receive input audio data from the application 124 and forward it to the system 120 for processing. In some implementations, the speech component 135 may include speech and/or language processing components such as those described with respect to the language processing component 292 described below with reference to FIG. 2. In some implementations, the speech component 135 may receive input audio data and send it to the system 120 in its original form; that is, as unprocessed audio data.

In some implementations, the speech component 135 may process the audio data and transmit the resulting data in the form of ASR data such as phonemes or text, or NLU data in the form of an intent, entity identifiers, and/or slot data.

The natural language command processing system 120 may be remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example a home server located in a same residence as device 110. System 120 may also include some combination thereof, for example where certain components/operations are performed via a home server(s) and others are performed via a geographically remote server(s).

The system 120 may include various language processing components 192 for processing natural language inputs in audio, text, or other format. The language processing components 192 may include, for example, an ASR component 150 and an NLU component 160. The system 120 may execute or cause to be executed natural language commands received from the device 110. The system 120 may include or communicate with one or more skill components such as the first skill 190a and the second skill 190b, etc. (collectively, "skills 190"). A skill 190 may perform one or more functions on behalf of the system 120 and/or the user. The system 120 may include various language output components 193 for returning data to the device 110 in the form of natural language outputs (e.g., synthesized speech and/or natural language text). The language output components 193 may include, for example, a natural language generation (NLG) component 179 and a TTS component 180.

The system 120 may host more than one virtual assistant, allowing a user to access multiple virtual assistants via the device 110. The system 120 may include various components for coordinating operations associated with different virtual assistants. The system 120 may include an assistant metadata component 155 (and/or 255). A virtual assistant may be associated with an assistant profile. The assistant profile may include or refer to data associated with the virtual assistant. The assistant metadata component 155 may maintain assistant profile information for assistants available on the system 120. The assistant profile information may include assistant capabilities and data used for processing commands associated with the assistant such as entity libraries, voice parameters for synthetic speech, etc. Various components of the system 120, including the plan generator 156 (and/or 256), replanner 157 (and/or 257), and skills 190 (and/or 290) may send requests to the assistant metadata component 155 for data regarding assistants. For example, a multi-assistant skill such as the first skill 190a may, upon receiving a request stemming from a user command, send a request to the assistant metadata component 155 for a list of available assistants based on, for example, a device identifier, speaker identifier, profile identifier, device type, etc. The assistant data returned may include data that may allow the first skill 190a to further narrow the list of available assistants based on, for example, entities related to a communications session such as an identity of the caller, target, and/or network, etc.

The assistant metadata component 155 may be a memory or storage configured to store assistant profile information. The assistant profile information can include, for example, whether an assistant is available for a given user, device 110, location, etc. The assistant metadata component 155 may store other assistant settings, such as which assistants are enabled for a particular user and/or device. The assistant profile information may include wakeword and/or gesture information associated with an assistant for a given user and/or device 110. In some embodiments, the assistant metadata component 155 may mirror the information stored in the local settings component 116. The assistant metadata component 155 may store ASR, NLU, and/or entity libraries associated with an assistant profile for use by the system 120 during language processing. The assistant metadata component 155 may also store speech style information for an assistant profile for use by a TTS component of the system 120 for providing verbal output in a style recognizable by a user as a personality indicating the identity of the assistant. The assistant metadata component 155 may store information regarding non-verbal indications of an assistant's identity that may be output by the device, such as colors, earcons, voice chromes, etc. These indications may signal to the user the identity of the active assistant without explicitly naming the assistant.

The system 120 may include a plan generator 156. The plan generator 156 of the system 120 may leverage assistant profile information from the assistant metadata component 155 to generate a plan for executing a command received from a user. The plan generator 156 may receive NLU results data from the language processing components 192, and create a skill request ("plan data") that describes how the system 120 and/or skills 190 may execute a command represented in the NLU results data. The plan generator 156 may, based on assistant profile information maintained by the assistant metadata component 155, identify an assistant to handle the command. For example, the NLU results data may indicate an intent, and the plan generator 156 may identify a skill for performing actions related to the intent, and further identify an assistant profile associated with the skill. The plan generator 156 may return the plan data to the orchestrator component 130. The orchestrator component 130 may parse the plan data to cause execution of the command.

The system 120 may include a replanner 157. The orchestrator 130 may invoke the replanner 157 if the assistant profile selected by the plan generator 156 is different from the requested assistant profile. A user may "request" an assistant profile by uttering a wakeword and/or inputting a gesture associated with the assistant. Following language processing of the input audio data, however, the plan generator 156 may identify a different assistant profile for handling the command. For example, the user may say, "Alexa, lock the doors." The device 110 and/or the system 120 may recognize based on the wakeword "Alexa" that the request assistant corresponds to the Alexa assistant profile. The plan generator 156 may determine, however, that the skill for actuating door locks is associated with the Carja assistant profile and not the Alexa assistant profile. Accordingly, the replanner 157 may generate new plan data and return it to the orchestrator 130. The new plan data may cause the orchestrator 130 to output a handoff notification via the device to indicate to the user that the active assistant has been changed to Carja. The new plan data may further cause the orchestrator 130 to send the skill request to the skill for execution of the command based on data associated with the Carja assistant profile.

The assistant metadata component 155 may include one or more templates describing a syntax for plan data for different handoff types. Each handoff type may be associated with a template. The replanner 157 may use a template to generate plan data according to a selected handoff type.

Rules for choosing a handoff type and templates for generating corresponding plan data may also be provided by the assistant metadata component 155. The replanner 157 may determine a handoff type to use based on parameters of the first plan data and/or other context. The replanner 157 may retrieve a template for the determined handoff type from the assistant metadata component 155 and use the template to generate the plan data. The template may specify one or more sections (e.g., data fields) to be included in the plan, where each section corresponds to an operation to be performed by the system. The template may specify a format of the sections. For example, the template may describe an operation according to a handoff pre-roll; that is, a message informing a user that an assistant other than the requested assistant will handle the user's command. The template may describe that the pre-roll data field include an instruction to launch the replanner 157 with a payload reflecting a setting of the first assistant for the purpose of generating a verbal message to the user using TTS settings associated with the first assistant. Similarly, the template may describe a post-roll data field that may be used for a barge-in handoff type. The post-roll data field may include an instruction to launch the replanner 157 to generate a verbal message in a second speech style associated with the second assistant. The template may describe a command execution section that may include an instruction to call a skill or skill system based on a setting associated with the second assistant. The template may describe additional operations for other handoff types, including updating visual themes presented by the device for indicating visually which assistant is active at a given moment. The template may specify an order of the operations as reflected by the order of sections in the plan data. The replanner 157 may use a template from the assistant metadata component 155 corresponding to the determined handoff type to generate plan data.

The assistant may include an orchestrator 130. The orchestrator 130 may convey data between the different components of the system 120. Upon receipt by the system(s) 120, the audio data 111 may be sent to an orchestrator component 130. The orchestrator component 130 may include memory and logic that enables the orchestrator component 130 to transmit various pieces and forms of data to various components of the system, as well as perform other operations as described herein. The orchestrator 130 may perform operations according to plan data generated by the plan generator 156 and/or replanner 157.

The orchestrator 130 may provide various mechanisms that allow various components of the system 120 to communicate. For example, the orchestrator 130 may convey data between skills 190 and other components of the system 120 using links. Links are a communication mechanism that allow skills 190 to communicate with each other. A link may include a token and a payload. In some implementations, the link may include other fields. The token field may be analogous to a subject field of an email message and may be visible to the orchestrator. The payload may be obscured, possibly using encryption, to parties other than the sending skill 190 and receiving skill 190. A second skill 190*b* may launch a link to send a request to a first skill 190*a* to perform a task; for example, to resolve entities for the purpose of initiating a communications session (e.g., source, target, network, etc.). In some cases, a skill 190 may launch a link with information in the token field such that the information may be observable by the orchestrator 130. Use of links for transferring data between skills 190 and/or the orchestrator 130 is discussed further below as a mechanism to enable a skill 190 to change the active assistant after the system 120 has initiated a request session in a manner that can cause the system 120 to update various components with the identity of the new active assistant.

The orchestrator component 130 may send the audio data 111 to a language processing component 192. The language processing components 192 (sometimes also referred to as a spoken language understanding (SLU) component) includes an automatic speech recognition (ASR) component 150 and a natural language understanding (NLU) component 160. The ASR component 150 may transcribe the audio data 111 into text data. The text data output by the ASR component 150 represents one or more than one (e.g., in the form of an N-best list) ASR hypotheses representing speech represented in the audio data 111. The ASR component 150 interprets the speech in the audio data 111 based on a similarity between the audio data 111 and pre-established language models. For example, the ASR component 150 may compare the audio data 111 with models for sounds (e.g., acoustic units such as phonemes, senons, phones, etc.) and sequences of sounds to identify words that match the sequence of sounds of the speech represented in the audio data 111. The ASR component 150 sends the text data generated thereby to an NLU component 160, via, in some embodiments, the orchestrator component 130. The text data sent from the ASR component 150 to the NLU component 160 may include a single top-scoring ASR hypothesis or may include an N-best list including multiple top-scoring ASR hypotheses. An N-best list may additionally include a respective score associated with each ASR hypothesis represented therein. The ASR component 150 is described in greater detail below with regard to FIG. 6.

The language processing components 192 may further include a NLU component 160. The NLU component 160 may receive the text data from the ASR component. The NLU component 160 may attempts to make a semantic interpretation of the phrase(s) or statement(s) represented in the text data input therein by determining one or more meanings associated with the phrase(s) or statement(s) represented in the text data. The NLU component 160 may determine an intent representing an action that a user desires be performed and may determine information that allows a device (e.g., the device 110, the system(s) 120, a skill component 190, a skill system(s) 125, etc.) to execute the intent. For example, if the text data corresponds to "play the $5^{th}$ Symphony by Beethoven," the NLU component 160 may determine an intent that the system output music and may identify "Beethoven" as an artist/composer and "5th Symphony" as the piece of music to be played. For further example, if the text data corresponds to "what is the weather," the NLU component 160 may determine an intent that the system output weather information associated with a geographic location of the device 110. In another example, if the text data corresponds to "turn off the lights," the NLU component 160 may determine an intent that the system turn off lights associated with the device 110 or the user. However, if the NLU component 160 is unable to resolve the entity—for example, because the entity is referred to by anaphora such as "this song" or "my next appointment"—the language processing components 192 can send a decode request to another language processing components 192 for information regarding the entity mention and/or other context related to the utterance. The language processing components 192 may augment, correct, or base results data upon the audio data 111 as well as any data received from the other language processing components 192.

The NLU component 160 may return NLU results data 885/825 (which may include tagged text data, indicators of intent, etc.) back to the orchestrator 130. The orchestrator 130 may forward the NLU results data to a skill component(s) 190. If the NLU results data includes a single NLU hypothesis, the NLU component 160 and the orchestrator component 130 may direct the NLU results data to the skill component(s) 190 associated with the NLU hypothesis. If the NLU results data 885/825 includes an N-best list of NLU hypotheses, the NLU component 160 and the orchestrator component 130 may direct the top scoring NLU hypothesis to a skill component(s) 190 associated with the top scoring NLU hypothesis. The system may also include a post-NLU ranker 865 which may incorporate other information to rank potential interpretations determined by the NLU component 160. The local device 110 may also include its own post-NLU ranker, which may operate similarly to the post-NLU ranker 865. The NLU component 160, post-NLU ranker 865 and other components are described in greater detail below with regard to FIGS. 7 and 8.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 172 (and/or 272) that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 172 may associate a dialog session identifier with the dialog upon identifying that the user is engaging in a dialog with the user. The dialog manager component 172 may track a user input and the corresponding system generated response to the user input as a turn. The dialog session identifier may correspond to multiple turns of user input and corresponding system generated response. The dialog manager component 172 may transmit data identified by the dialog session identifier directly to the orchestrator component 130 or other component. Depending on system configuration the dialog manager 172 may determine the appropriate system generated response to give to a particular utterance or user input of a turn. Or creation of the system generated response may be managed by another component of the system (e.g., the language output component 193, NLG 179, orchestrator 130, etc.) while the dialog manager 172 selects the appropriate responses. Alternatively, another component of the system(s) 120 may select responses using techniques discussed herein. The text of a system generated response may be sent to a TTS component 180 for creation of audio data corresponding to the response. The audio data may then be sent to a user device (e.g., device 110) for ultimate output to the user. Alternatively (or in addition) a dialog response may be returned in text or some other form.

The dialog manager 172 may receive the ASR hypothesis/hypotheses (i.e., text data) and make a semantic interpretation of the phrase(s) or statement(s) represented therein. That is, the dialog manager 172 determines one or more meanings associated with the phrase(s) or statement(s) represented in the text data based on words represented in the text data. The dialog manager 172 determines a goal corresponding to an action that a user desires be performed as well as pieces of the text data that allow a device (e.g., the device 110, the system(s) 120, a skill 190, a skill system(s) 125, etc.) to execute the intent. If, for example, the text data corresponds to "what is the weather," the dialog manager 172 may determine that that the system(s) 120 is to output weather information associated with a geographic location of the device 110. In another example, if the text data corresponds to "turn off the lights," the dialog manager 172 may determine that the system(s) 120 is to turn off lights associated with the device(s) 110 or the user(s) 5.

The dialog manager 172 may send the results data to one or more skill(s) 190. If the results data includes a single hypothesis, the orchestrator component 130 may send the results data to the skill(s) 190 associated with the hypothesis. If the results data includes an N-best list of hypotheses, the orchestrator component 130 may send the top scoring hypothesis to a skill(s) 190 associated with the top scoring hypothesis.

The system 120 may include one or more skills components such as the first skill 190a, the second skill 190b, etc. A skill component may be software running on the system(s) 120 that is akin to a software application. That is, a skill component 190 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 190. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 190 may operate in conjunction between the system(s) 120 and other devices, such as the device 110, in order to complete certain functions. Inputs to a skill component 190 may come from speech processing interactions or through other interactions or input sources. A skill component 190 may include hardware, software, firmware, or the like that may be dedicated to a particular skill component 190 or shared among different skill components 190.

A skill support system(s) 125 may communicate with a skill component(s) 190 within the system(s) 120 and/or directly with the orchestrator component 130 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 190 dedicated to interacting with the skill support system(s) 125. Unless expressly stated otherwise, reference to a skill, skill device, or skill component may include a skill component 190 operated by the system(s) 120 and/or skill operated by the skill support system(s) 125. Moreover, the functionality described herein as a skill or skill may be referred to using many different terms, such as an action, bot, app, or the like. The skill 190 and or skill support system(s) 125 may return output data to the orchestrator 130.

Some skills 190 may be associated with a single assistant profile; for example, a navigation skill may be available when accessed using the Carja virtual assistant. Other skills 190 may be accessed using two or more assistant profiles. The first skill 190*a* shown in FIG. 1B may be one such skill. The first skill 190*a* may be, for example, a connection resolution skill that other skills 190 may leverage to determine one or more entities associated with a communications session, such as a source (caller), target (recipient), and/or network (VOIP, SMS, cellular, etc.). A second skill 190*b* such as a calling skill may call on the connection resolution skill to resolve communications entities. The first skill 190*a* (and/or other skill components 190) may include various components for operating according to multiple assistant profiles.

For example, the first skill 190*a* may include an assistant arbitration component 185. The assistant arbitration component 185 may include software and/or logic for selecting an assistant profile for executing a command. The assistant arbitration component 185 may send a request to the assistant metadata component 155 for a list of available assistant profiles. The assistant arbitration component 185 may cache or otherwise store the list of available assistants and the associated data for each returned by the assistant metadata component 155.

The first skill 190*a* may process skill requests using data associated with one or more assistant profiles such as a first assistant profile 186*a*, a second assistant profile 186*b*, etc. (collectively, "assistant profiles 186"). An assistant profile 186 may represent data such as settings and/or libraries the first skill 190*a* may access when executing a command associated with the assistant corresponding to the assistant profile 186. For example, the first assistant profile 186*a* may include settings and libraries associated with a first assistant, such as the Alexa assistant, and the second assistant profile 186*b* may include settings and libraries associated with a second assistant, such as the Carja assistant. In the example of a communications skill, the assistant profiles 186 may include a contact list; for example, the first assistant profile 186*a* may include a contact list belonging to the user and associated with the Alexa assistant, and the second assistant profile 186*b* may include a contact list belonging to the user and associated with the Carja assistant. Other settings and/or libraries maintained by the assistant profiles 186 may include credentials for different communications networks, such as a phone number associated with the user when using a mobile phone network or SMS service, an email or instant message username and password, etc.

The system 120 includes a language output component 193. The language output component 193 includes a natural language generation (NLG) component 179 and a text-to-speech (TTS) profile 186. The NLG component 179 can generate text for purposes of TTS output to a user. For example the NLG component 179 may generate text corresponding to instructions corresponding to a particular action for the user to perform. The NLG component 179 may generate appropriate text for various outputs as described herein. The NLG component 179 may include one or more trained models configured to output text appropriate for a particular input. The text output by the NLG component 179 may become input for the TTS component 180 (e.g., output text data 1110 discussed below). Alternatively or in addition, the TTS component 180 may receive text data from a skill 190 or other system component for output.

The NLG component 179 may include a trained model. The NLG component 179 generates text data 1110 from dialog data received by the dialog manager 172 such that the output text data 1110 has a natural feel and, in some embodiments, includes words and/or phrases specifically formatted for a requesting individual. The NLG may use templates to formulate responses. And/or the NLG system may include models trained from the various templates for forming the output text data 1110. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 180.

The TTS component 180 may generate audio data (e.g., synthesized speech) from text data using one or more different methods. Text data input to the TTS component 180 may come from a skill component 190, the orchestrator component 130, or another component of the system. In one method of synthesis called unit selection, the TTS component 180 matches text data against a database of recorded speech. The TTS component 180 selects matching units of recorded speech and concatenates the units together to form audio data. In another method of synthesis called parametric synthesis, the TTS component 180 varies parameters such as frequency, volume, and noise to create audio data including an artificial speech waveform. Parametric synthesis uses a computerized voice generator, sometimes called a vocoder.

Figure 10:
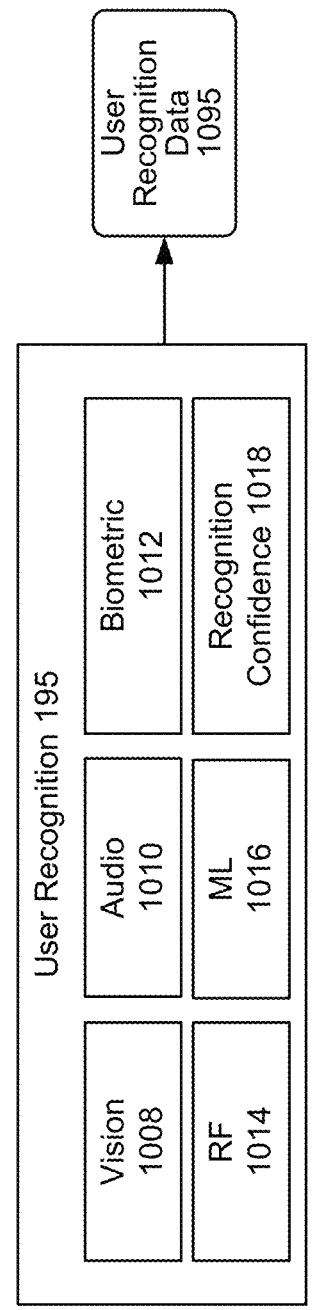
FIG. 10 is a schematic diagram of an illustrative architecture in which sensor data is combined to recognize one or more users according to embodiments of the present disclosure.

The system(s) 120 may include a user recognition component 195 that recognizes one or more users using a variety of data, as described in greater detail below with regard to FIG. 10. However, the disclosure is not limited thereto, and the device 110 may include a user recognition component 295 instead of and/or in addition to user recognition component 195 of the system(s) 120 without departing from the disclosure. User recognition component 295 operates similarly to user recognition component 195.

The user-recognition component 195 may take as input the audio data 111 and/or text data output by the ASR component 150. The user-recognition component 195 may perform user recognition by comparing audio characteristics in the audio data 111 to stored audio characteristics of users. The user-recognition component 195 may also perform user recognition by comparing biometric data (e.g., fingerprint data, iris data, etc.), received by the system in correlation with the present user input, to stored biometric data of users assuming user permission and previous authorization. The user-recognition component 195 may further perform user recognition by comparing image data (e.g., including a representation of at least a feature of a user), received by the system in correlation with the present user input, with stored image data including representations of features of different users. The user-recognition component 195 may perform additional user recognition processes, including those known in the art.

The user-recognition component 195 determines scores indicating whether user input originated from a particular user. For example, a first score may indicate a likelihood that the user input originated from a first user, a second score may indicate a likelihood that the user input originated from a second user, etc. The user-recognition component 195 also determines an overall confidence regarding the accuracy of user recognition operations.

Output of the user-recognition component 195 may include a single user identifier corresponding to the most likely user that originated the user input. Alternatively, output of the user-recognition component 195 may include an N-best list of user identifiers with respective scores indicating likelihoods of respective users originating the user input. The output of the user-recognition component 195 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 170 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

Each user profile may include identifiers of assistants (e.g., assistant profiles) that the user has enabled. When a user enables an assistant, the user is providing the system 120 with permission to allow the assistant to receive audio from the user, process it, and direct user commands to one or more skills associated with the assistant profile. For an enabled assistant, the user profile may include information relevant and/or specific to that assistant. For example, a user profile may include a first contact list corresponding to a first assistant and a second contact list corresponding to a second assistant. In some cases, the first contact list may be a personal contact list while the second contact list may be a professional contact list. In some cases, the first contact list may include contacts the user communicates with via a first communications network—e.g., VOIP—while the second contact list may include contacts the user communicates with via cellular phone. In another example, a first assistant may provide the user with access to a first online marketplace and the second assistant may provide the user with access to a second online marketplace. The user profile may associate first credentials (e.g., login and/or payment information) for the first online marketplace with the first assistant, and second credentials for the second online marketplace with the second assistant.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 2 is a conceptual diagram illustrating components that may be included in a device, according to embodiments of the present disclosure. Although certain components of FIG. 1B may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 2 illustrates such a configured device 110.

In at least some embodiments, the system 120 may receive the audio data 111 from the device 110, to recognize speech corresponding to a spoken input in the received audio data 111, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 280) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user as part of a shopping function, establishing a communication session (e.g., a video call) between the user and another user, and so on.

As noted with respect to FIG. 1B, the device 110 may include a wakeword detection component 121 configured to compare the audio data 111 to stored models used to detect a wakeword (e.g., "Alexa") that indicates to the device 110 that the audio data 111 is to be processed for determining NLU output data (e.g., slot data that corresponds to a named entity, label data, and/or intent data, etc.). In at least some embodiments, a hybrid selector 224, of the device 110, may send the audio data 111 to the wakeword detection component 121. If the wakeword detection component 121 detects a wakeword in the audio data 111, the wakeword detection component 121 may send an indication of such detection to the hybrid selector 224. In response to receiving the indication, the hybrid selector 224 may send the audio data 111 to the system 120 and/or the ASR component 250. The wakeword detection component 121 may also send an indication, to the hybrid selector 224, representing a wakeword was not detected. In response to receiving such an indication, the hybrid selector 224 may refrain from sending the audio data 111 to the system 120, and may prevent the ASR component 250 from further processing the audio data 111. In this situation, the audio data 111 can be discarded.

The device 110 may conduct its own speech processing using on-device language processing components, such as an SLU/language processing component 292 (which may include an ASR component 250 and an NLU 260), similar to the manner discussed herein with respect to the language processing components 192 (or ASR component 150 and the NLU component 160) of the system 120. Language processing component 292 may operate similarly to language processing component 192, ASR component 250 may operate similarly to ASR component 150 and NLU component 260 may operate similarly to NLU component 160. The device 110 may also internally include, or otherwise have access to, other components such as one or more skill components 290 capable of executing commands based on NLU output data or other results determined by the device 110/system 120 (which may operate similarly to skill components 190), a user recognition component 295 (configured to process in a similar manner to that discussed herein with respect to the user recognition component 195 of the system 120), profile storage 270 (configured to store similar profile data to that discussed herein with respect to the profile storage 170 of the system 120), or other components. In at least some embodiments, the profile storage 270 may only store profile data for a user or group of users specifically associated with the device 110. Similar to as described above with respect to skill component 190, a skill component 290 may communicate with a skill system(s) 125. The device 110 may also have its own language output components 293 which may include NLG component 279 and TTS component 280. Language output component 293 may operate similarly to language output component 193, NLG component 279 may operate similarly to NLG component 179 and TTS component 280 may operate similarly to TTS component 180.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 224, of the device 110, may include a hybrid proxy (HP) 226 configured to proxy traffic to/from the system 120. For example, the HP 226 may be configured to send messages to/from a hybrid execution controller (HEC) 227 of the hybrid selector 224. For example, command/directive data received from the system 120 can be sent to the HEC 227 using the HP 226. The HP 226 may also be configured to allow the audio data 111 to pass to the system 120 while also receiving (e.g., intercepting) this audio data 111 and sending the audio data 111 to the HEC 227.

In at least some embodiments, the hybrid selector 224 may further include a local request orchestrator (LRO) 228 configured to notify the ASR component 250 about the availability of new audio data 111 that represents user speech, and to otherwise initiate the operations of local language processing when new audio data 111 becomes available. In general, the hybrid selector 224 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 111 is received, the HP 226 may allow the audio data 111 to pass through to the system 120 and the HP 226 may also input the audio data 111 to the on-device ASR component 250 by routing the audio data 111 through the HEC 227 of the hybrid selector 224, whereby the LRO 228 notifies the ASR component 250 of the audio data 111. At this point, the hybrid selector 224 may wait for response data from either or both of the system 120 or the local language processing components. However, the disclosure is not limited thereto, and in some examples the hybrid selector 224 may send the audio data 111 only to the local ASR component 250 without departing from the disclosure. For example, the device 110 may process the audio data 111 locally without sending the audio data 111 to the system 120.

The local ASR component 250 is configured to receive the audio data 111 from the hybrid selector 224, and to recognize speech in the audio data 111, and the local NLU component 260 is configured to determine a user intent from the recognized speech, and to determine how to act on the user intent by generating NLU output data which may include directive data (e.g., instructing a component to perform an action). Such NLU output data may take a form similar to that as determined by the NLU component 160 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 260) may be selected as usable to respond to a natural language user input, and local response data may be sent (e.g., local NLU output data, local knowledge base information, internet search results, and/or local directive data) to the hybrid selector 224, such as a "ReadyToExecute" response. The hybrid selector 224 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user.

The device 110 and/or the system 120 may associate a unique identifier with each natural language user input. The device 110 may include the unique identifier when sending the audio data 111 to the system 120, and the response data from the system 120 may include the unique identifier to identify which natural language user input the response data corresponds.

In at least some embodiments, the device 110 may include, or be configured to use, one or more skill components 290 that may work similarly to the skill component(s) 190 implemented by the system 120. The skill component(s) 290 may correspond to one or more domains that are used in order to determine how to act on a spoken input in a particular way, such as by outputting a directive that corresponds to the determined intent, and which can be processed to implement the desired operation. The skill component(s) 290 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 290, a skill system 125, or a combination of a skill component 290 and a corresponding skill system 125. Similar to the manner discussed with regard to FIG. 1B, the local device 110 may be configured to recognize multiple different wakewords, invoke different assistants, and/or perform different categories of tasks depending on the wakeword. Such different wakewords may invoke different processing components of local device 110 (not illustrated in FIG. 2). For example, detection of the wakeword "Alexa" by the wakeword detector 121 may result in sending audio data to the language processing components 292/skills 290 for processing using a first assistant profile 286a while detection of the wakeword "Carja" by the wakeword detector may result in sending audio data to language processing components 292/skills 290 for processing using a second assistant profile 286b. The assistant profile 286 may be similar to the assistant profile 186. An assistant arbitration component 285 may select from available assistant for executing a command similar to the assistant arbitration component 185.

Figure 3:
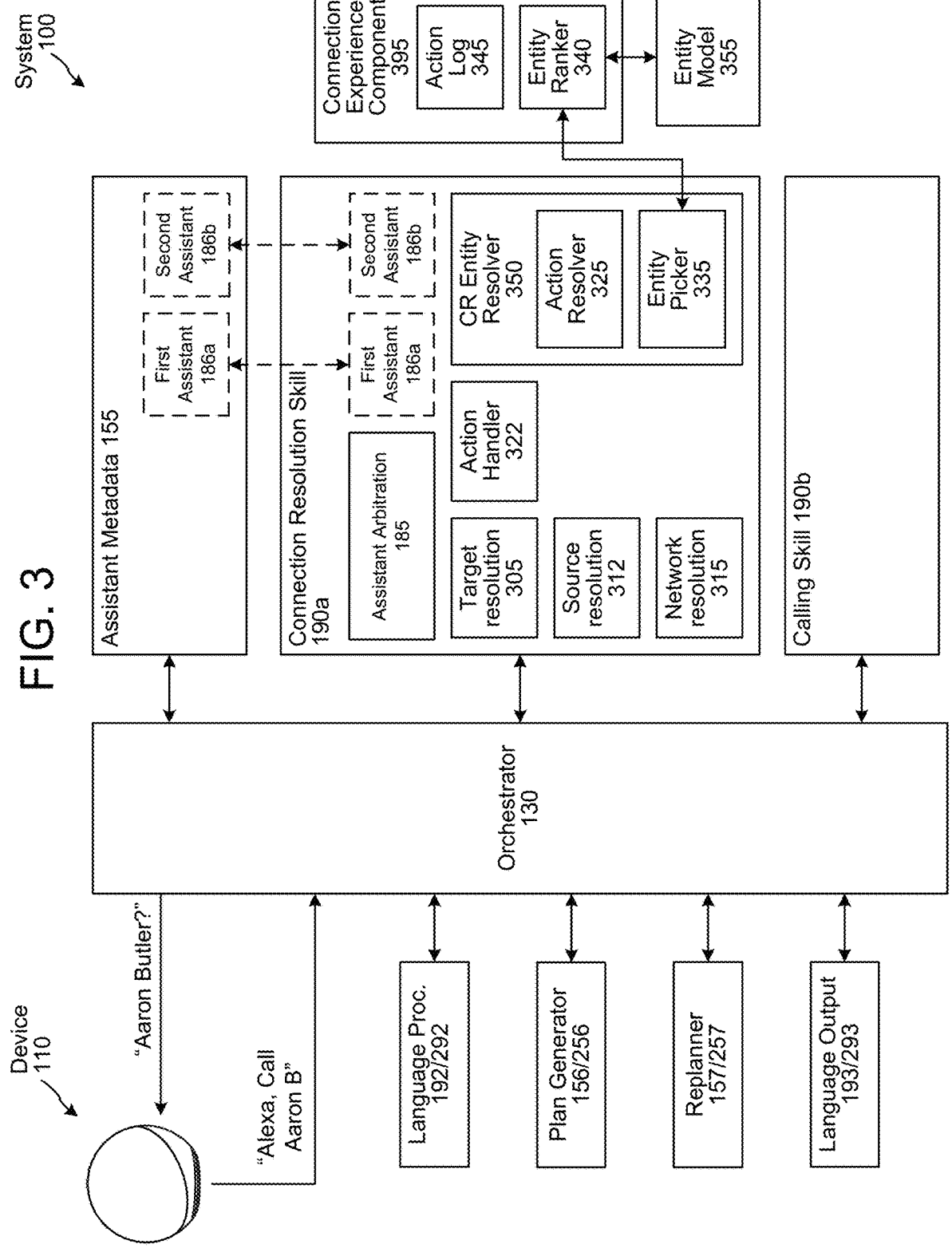
FIG. 3 is a conceptual diagram illustrating components of a virtual assistant system performing example operations for updating the active assistant based on assistant arbitration performed in a calling skill, according to embodiments of the present disclosure.

The device 110 may include additional components for facilitating multi-assistant operations, including an assistant metadata component 255 may store data associated with various assistants available to the device 110 in a manner similar to the assistant metadata component 155. The plan generator 256 may generate plan data FIG. 3 is a conceptual diagram illustrating components of a virtual assistant system 100 performing example operations for updating the active assistant based on assistant arbitration performed in a connection resolution skill 190a, according to embodiments of the present disclosure. FIG. 3 shows a calling skill 190b leveraging the connection resolution skill 190a. For example, the calling skill 190b may initially receive from the orchestrator 130 a skill request corresponding to a user command to initiation a communications session, call on the connection resolution skill 190a to resolve entities and select an assistant, and initiate the communications session based on the entities and assistant identifier returned by the connection resolution skill 190a. In some implementations, however, functions of the connection resolution skill 190a and the calling skill 190b maybe combined; for example, into a single skill 190 that can resolve entities, select an assistant profile, and initiate the communications session. Operations of the system 100 are described below with reference to the signal flow diagrams shown in FIGS. 4A and 4B (representing an example single-turn scenario) and FIGS. 4A, 4C, and 4D (representing an example multi-turn scenario).

The operations may start at a step 400 with the device 110 receiving a natural language input, for example a spoken command, from a user. The device 110 may, at the step 400, send input audio data representing the command to the orchestrator 130. The orchestrator 130 may, at a step 402, send the input audio data to the language processing components 192 (or 292) for processing by, for example, ASR and/or NLU. The language processing components 192 may, at a step 404, return NLU results data to the orchestrator 130. In the example operations illustrated in FIGS. 4A through 4D, the NLU results data may indicate an intent to initiate a communications session. The NLU results data may further include one or more entities representing parameters of the requested communications session, such as source, target, and/or network, which the system 100 may resolve in subsequent steps. The orchestrator 130 may, at a step 406, send the NLU results data to the plan generator 156 (or 256). The plan generator 156 may generate plan data that may represent one or more operations for the orchestrator 130 and other downstream components of the system 100 to perform in order to execute the command. The plan data may include a skill identifier for a skill identified by the plan generator 156 for executing commands corresponding to the intent. In this example, the plan data may include a skill identifier corresponding to the calling skill 190b (or 290b). The plan generator 156 may, at a step 408, return the plan data to the orchestrator 130. The orchestrator 130 may parse the plan data and, at a step 410, send a skill request to a skill indicated in the plan data; in this case the calling skill 190b. The calling skill 190b may, at a step 414, call on the connection resolution skill 190a (or 290a) to resolve one or more entities associated with a communications session, such as a source, target, and/or network. The connection resolution skill 190a may, at a step 416, retrieve a list of available assistants; for example, from the assistant metadata component 155. The list of available assistants may be based on one or more factors including a user, speaker, or profile identifier associated with the input audio data; a device identifier or device type; or context information such as a location of the device (e.g., what country) or a language of the input audio data; and/or user settings such as which assistants the user may have enabled for the device 110. The list of available assistants may represent all possible assistants that may handle a command received from the device 110. The connection resolution skill 190a may select an assistant or eliminate one or more assistants from the list of assistants based on entities explicitly mention in, or implicitly referenced by, the command.

The connection resolution skill 190a may, at a step 418, resolve entities pertaining to the requested communications session. Returning to FIG. 3, the connection resolution skill 190a disambiguate, confirm, or otherwise identify an entity present or implied in a request received via the device 110. The connection resolution skill 190a may resolve entities based on a ranking of entities outputted by a connection experience component (CEC) 395. The CEC 395 may list and/or rank entities based on historical data for the requesting user. The CEC 395 may refer to the one or more entity models 355 for processing the historical data.

The connection resolution skill 190a may include several resolution components for resolving the respective entities, including a target resolution component 305, a source resolution component 312, and/or a network resolution component 315. In various implementations, the connection resolution skill 190a may include more or fewer resolution components. The resolution components can disambiguate, confirm, or otherwise determine parameters used for initiating actions between parties. For example, for an operation such as a voice communication, the system may determine a source (the user/caller), a target (the recipient), and a network (cellular, VOIP, etc.).

The target resolution component 305 may receive the NLU results data from the orchestrator 130 and attempt to determine a target of the requested communication. The target resolution component 305 may run a static set of rules to find a matching contact/device/space to find one or more probable candidates for the target. The static set of rules include, for example and without limitation, trimming low entity resolution results, determining whether public-switch telephone network (PTSN) calling is enabled, filtering out-of-network contacts for communications over a proprietary network (e.g., removing non-Amazon-to-Amazon contacts when handling a request for Amazon's Drop In service), etc.

The source resolution component 312 may receive the NLU results data from the orchestrator 130 and attempt to determine a source of the requested communication. The source resolution component 312 may run a static set of rules to identify a user, group, device, etc. identities, which can be used to as a parameter for, for example, initiating a communication session. The identities may include, for example, a user who has explicitly identified herself to the device 110, or group members associated with the device 110 who have a contact matching an identified target of the communication, etc. The source resolution component 312 may receive user profile information and/or user recognition data from the user recognition component 195.

The network resolution component 315 may receive the NLU results data from the orchestrator 130 and attempt to determine a network of the requested action. The network resolution component 315 may run a static set of rules to match the probable networks that can be used to perform the requested action. For example, if the user has specified a phone number type in the utterance, the network resolution component 315 may use that information to setup a connection. In another example, if a network is not available on the device 110, the network resolution component 315 may remove that network from a list of network candidates.

The resolution components can call on the connection resolution (CR) entity resolver 350 to resolve one or more of the target, source, and/or network, and the CR entity resolver 350 may return a single high confidence target, source, and/or network. The CR entity resolver 350 can filter entity candidates, and determine whether to assume a highest ranked candidate entity is the intended entity, or whether to request disambiguation or confirmation of a specific entity name. The CR entity resolver 350 may include an entity picker 335 and an action resolver 325.

The entity picker 335 can receive a list of probable candidate entities from the resolution components via the action resolver 325, and call on a connection experience component (CEC) 395 to get scores, ranks, and/or bins of the candidate entities. (Structure and operation of the CEC 395 are described in additional detail below.) The entity picker 335 may, based on the returned scores, ranks, and/or bins, determine whether any top entity candidate can be selected and returned to the calling skill 190b. For example, if the returned entity/entities include an entity candidate with a score above a threshold, the entity picker 335 may set that entity candidate as the selected entity. If the returned entities include several entity candidates, but only one entity candidate in a High bin, the entity picker 335 may set that entity candidate as the selected entity. If the returned entities include more than one entity candidate, but the difference in scores exceeds a threshold, the entity picker 335 may set the entity candidate with the higher score as the selected entity. Various other dynamic and/or static rules may be set for picking an entity.

The action resolver 325 may receive the entity candidates from the resolution components and pass them to the entity picker 335. The action resolver 325 can receive the scores, ranks, and/or bins of the entity candidates from the entity picker 335. If the entity picker 335 sets a selected entity, the action resolver 325 can return the top entity candidate to the appropriate resolution component (e.g., the target resolution component 305, the source resolution component 312, and/or the network resolution component 315). The resolution component may pass entity resolution output data back to the orchestrator 130, which may pass it on to the calling skill 190b. The calling skill 190b may initiate the requested action based on the entity specified. The orchestrator 130 may additionally send the entity resolution output data to an action log 345 of the CEC 395 for recording. The data sent to the action log 345 may include information regarding context of the action request for use in filtering data retrieved from the action log 345, as is described further below.

The CEC 395 can receive a list of probable candidate entities from the entity picker 335 and return scores, ranks, and/or bins of the candidate entities. The CEC 395 may include an entity ranker 340 and an action log 345. The entity ranker 340 can take the list of entity candidates and compute a score for each entity candidate based on features extracted from the action log 345. Features may include, for example, a memory feature of an entity candidate based on the existence of a previous appearance of that entity candidate in the action log 345 along with a record of a user selection of that entity candidate, a frequency feature of an entity candidate based on a number of appearances of that entity candidate in the action log 345 over a given time frame, a recent feature representing which of a list of entity candidates was the most recently selected based on the records stored in the action log 345, and/or a friends/family feature may use information from the user's contact list to determine relationships between the user and contacts in the contact list. The CEC 395 may have an extensible architecture that may allow for extracting more, fewer, or different features from the action log 345, depending on the implementation. In this manner, the CEC 395 may be improved or otherwise modified when provided with new and/or alternate features. Features may be extracted in a different format and/or scale; for example, Boolean response (e.g., a 0 or a 1), a scale of 1-100, a probability of 0-1, etc. Other scales and/or ranges are possible.

The action log 345 may support features depending on the user's past usage. The action log 345 may receive entity resolution output data from the connection resolution skill 190a when the connection resolution skill 190a provides the entity resolution output data back to, for example, the calling skill 190b. The action log 345 may log the entity resolution output data once it has been confirmed by the user either by explicit verbal confirmation or by the calling skill 190b completing the action without cancelation. The data logged for a target resolution may include a contact name slot value, ER results of various catalogs, entity identifiers of the candidates, a user-chosen value, a catalogue identifier, etc. The data logged for an identity (source) resolution may include a user profile (not necessarily with high confidence), source candidates (e.g., identifiers of home group members or members with access to the device 110), and/or a user-chosen identity. In some implementations, the prompts rendered to a user can also help in predicting the churn for the user. For example, in cases where the user is unable to place a call whenever a prompt is rendered, the system 100 can render a different prompt or assume an entity. This approach may be appropriate for resolving the source or network. The action log 345 may also record when a user denies a proposed entity in favor of providing the entity explicitly. This may allow the system 100 to learn when to provide a user an option to choose an intended entity rather than automatically selecting it. In some implementations, the action log 345 may provide other features based on user-specific activity; for example, redial and/or speed dial features. The action log 345 may store other action-related events; for example, the action log 345 can receive data from the action handler 322 regarding the output of user prompts (e.g., for entity disambiguation), entity resolution output from the orchestrator 130, and/or data from the skill component 290 regarding canceled or otherwise modified actions, etc.

The entity ranker 340 may collect the feature scores for each entity candidate and provide the features scores to the entity model 355. The entity ranker 340 may provide the feature scores to the entity model 355 in the form of a vector associated with an entity candidate. The entity model 355 may calculate an overall score for each entity candidate and return the scores to the entity ranker 340. In some implementations, the entity model 355 will return one score on a scale of 0-1 for an entity candidate. In some implementations, the entity model 355 may return scores in a different format and/or on a different scale.

In some implementations, the entity model 355 may be a combined model for processing scores related to entities and actions of different types. In some implementations, the entity model 355 may include different models for scoring different entity and/or action types. For example, a connections model may resolve entities related to voice calls. The connections model may in turn include multiple models for different entity types. The connections model may include a contacts model for computing scores of entity candidates of type contact (e.g., individuals and/or organizations listed in a contact list). The connections model may include a network model for computing scores of entity candidates of type network (e.g., communications systems such as VOIP, cellular phone, Drop In, Skype, etc.). Each model may be trained independently and used for its respective action/entity type. The contacts model can be trained in the first instance with features from the feature extractor FCs and labels for the entities as per user selection. The contacts model may facilitate predicting weights of each feature. The entity model 355 can use these weights at runtime to select and/or predict a user-intended entity, and/or assign a score to each entity candidate. Table 1 below shows sample data that may be used to train a contacts model in the entity model 355:

TABLE 1

Sample data for training a contacts model

| Memory | Recent | Frequency | Family | ER query | Label (User chosen) |
|--------|--------|-----------|--------|----------|---------------------|
| 1      | 10     | 5         | 1      | 5        | 1                   |
| 0      | 120    | 1         | 5      | 4        | 0                   |
| 0      | 720    | 3         | 3      | 2        | 0                   |

Returning to FIG. 4A, the connection resolution skill 190a may, at a decision block 420, determine whether all entities have been resolved. If all entities have been resolved (YES at 420), the system 100 may proceed to the operations illustrated in FIG. 4B beginning with a decision block 421. If one or more entities need to be resolved (NO at 420), for example, via disambiguation by the user, the system may proceed to the operations illustrated in FIG. 4C beginning with a step 450.

FIG. 4B is signal-flow diagrams illustrating example operations of a virtual assistant system 100 allowing for assistant determination in a connection resolution skill 190a, where entities are resolved in a single turn, according to embodiments of the present disclosure. Having resolved the entities for the communications session, the connection resolution skill 190a may, at the decision block 421, determine whether to switch the active assistant based on the identity of one or more of the entities (e.g., a source, network, and/or target, etc.). For example, the connection resolution skill 190a may determine that a contact for the target entity (e.g., a recipient of the call or message) is in a contact list associated with one assistant profile but not the other. In some implementations, determining that the target entity is in one contact list or another may be based on confidence values. For example, the connection resolution skill 190a may determine that an entity corresponds to an entity library associated with an assistant profile with a certain probability. If the entity corresponds to the second assistant profile with a probability higher than that with which it corresponds to the first assistant profile, the connection resolution skill 190a may determine that the entity corresponds to the second assistant profile. In another example, the connection resolution skill 190a may determine that the network entity is one associated with one assistant profile but not the other. If the connection resolution skill 190a determines that the assistant is not to be switched (NO at 421), the operations may continue with sending, at a step 422, the communications entities back to the calling skill 190b. The calling skill may advance to a step 442, during which the calling skill 190b may initiate the communications session based on the current assistant profile and the entities identified by the connection resolution skill 190a.

If, however, the connection resolution skill 190a determines that the assistant is to be switched a new assistant (YES at 421), the operations may continue with a step 424 in which the connection resolution skill 190a sends an identifier of the new assistant profile to the orchestrator 130. The message sent from the connection resolution skill 190a to the orchestrator 130 may perform two functions. First, the message may inform the orchestrator 130 that the active assistant is to be updated; and second, the message may convey the identity of the new assistant profile (e.g., in the form of an assistant identifier, which may be a universally unique identifier (UUID)). Based on the message, the orchestrator 130 may, at a step 426, generate a new skill request reflecting the identity of the new active assistant profile. The orchestrator may, at a step 428, send the new skill request along with the new assistant identifier back to the connection resolution skill 190a.

The connection resolution skill 190a may, at a step 430, generate a handoff message. The connection resolution skill 190a may generate the handoff message in a manner similar to the replanner 157 described previously. Generating the handoff message may include generating a message to indicate to the user that the new assistant will handle the command. For example, if the connection resolution skill 190a determines that Carja should handle the command, the system 100 can cause the device 110 to output a message in Alexa's voice such as "Carja can help you with that." Alternatively, the system 100 can cause the device 110 to output a message in Carja's voice such as "Carja here. I can help you with that." The connection resolution skill 190a may, at a step 431, send the handoff message to the orchestrator 130. The orchestrator 130 may, at a step 432, send the handoff message to the language output components 193. The language output components 193 may generate output audio data representing the handoff message. The language output components 193 may retrieve voice characteristics corresponding to the current assistant profile and/or the new assistant profile from the assistant metadata component 155 (or 255). The language output components 193 may thus generate output audio data representing synthesized speech in a voice style that can indicate to the user the identity of the synthesized speech (e.g., which assistant the synthesized speech corresponds to). The language output components 193 may, at a step 434, send the output audio data to the orchestrator 130. The orchestrator 130 may, at a step 436, cause the device 110 to output the audio data in the form of synthetic speech conveying the handoff message. The handoff message may be accompanied by visual indications such as a change in emitted light color and/or patterns, or a change in a voice chrome shown on an electronic display of the device 110.

The connection resolution skill 190a may, either before, after, or during the handoff operations, send, at a step 438, the communications entities back to the calling skill 190b. The calling skill 190b may, at the step 442, initiate the requested communications session based on the entities and the new assistant profile. The calling skill 190b may, at a step 444, notify the orchestrator 130 that the request has been executed.

FIGS. 4C and 4D are signal-flow diagrams illustrating example operations following those illustrated in FIG. 4A, where entities are resolved in a multi-turn scenario, according to embodiments of the present disclosure. At each turn, the connection resolution skill 190a may narrow the pool of candidate assistants represented by the list of available assistants to a subset of the list by eliminating assistant profiles not associated with one or more of the resolved entities. In the event the entity picker 335 of the connection resolution skill 190a does not resolve an entity at the step 418, for example because two candidate entities are associated with similar ranks or scores, the action resolver 325 may sent a request for disambiguation and/or confirmation to an action handler 322 of the connection resolution skill 190a. The action handler 322 may, at a step 450, generate a prompt for disambiguation between two or more possible entities and/or confirmation of a possible entity. The action handler 322 may, at a step 452, send the prompt to the orchestrator component 130, which in turn may, at a step 454, send the prompt to the language output components 193 (or 293). The language output components 193 may convert the prompt into output audio data representing synthetic speech. In generating the output audio data, the language output component 193 may use voice parameters corresponding to the active assistant. The active assistant may be one requested by the user via a wakeword, or one identified by the plan generator 156 based on the NLU results data. In any event, the language output components 193 may, at a step 456, send the output audio data to the orchestrator 130. The orchestrator 130 may, at a step 458, send the output audio data to the device 110 for playback as synthetic speech representing the prompt.

After outputting the prompt, the device 110 may receive an input. The device 110 may, at a step 460, forward input audio data representing the input to the orchestrator 130. The orchestrator 130 may, at a step 462, send the input audio data to the language processing components 192 for processing. The language processing components 192 may return (464) NLU results data. The orchestrator 130 may determine that the input audio data and thus the NLU results data are part of a dialog initiated with the first input audio data received at the step 400. The orchestrator 130 may thus, at a step 466, send to the NLU results data to the connection resolution skill 190a. The connection resolution skill 190a may, at a step 468, complete resolution of the entity. A resolution component associated with the entity (e.g., the target resolution component 305, the source resolution component 312, or the network resolution component 315) may resolve the entity. The connection resolution skill 190a may, at a decision box 470, determine whether to resolve another entity. If the connection resolution skill 190a determines to resolve another entity (YES at 470), the operations may return to the step 450 and repeat the steps 450 through 468 for the next entity to be resolved. If the connection resolution skill 190a determines not to resolve another entity (NO at 470), the operations may continue to a decision block 476.

The operations of the system 100 may continue in FIG. 4D with the decision box 476. Based on the entities resolved by the components of the connection resolution skill 190a, the connection resolution skill 190a may, at the decision box 476, determine whether to select a new assistant for handling the command. The processing of selecting an assistant to handle a command may be referred to as assistant arbitration, and may be performed by the assistant arbitration component 185 of the connection resolution skill 190a. If the connection resolution skill 190a does not select a new assistant (NO at 476), the operations may proceed to a step 477 in which the communications entities are returned to the calling skill 190b. The operations may advance to a step 494, during which the calling skill 190b may initiate the communications session based on the current assistant and the entities identified by the connection resolution skill 190a. If the connection resolution skill 190a selects a new assistant (YES at 476), the operations may proceed to a step 478.

If the connection resolution skill 190a determines that the assistant is to be switched a new assistant (YES at 476), the operations may continue with a step 478 in which the connection resolution skill 190a sends an identifier of the new assistant profile to the orchestrator 130. The message sent from the connection resolution skill 190a to the orchestrator 130 may perform two functions. First, the message may inform the orchestrator 130 that the active assistant is to be updated; and second, the message may convey the identity of the new assistant profile (e.g., in the form of an assistant identifier, which may be a UUID). Based on the message, the orchestrator 130 may, at a step 480, generate a new skill request reflecting the identity of the new assistant profile. The orchestrator may, at a step 481, send the new skill request along with the new assistant identifier back to the connection resolution skill 190a.

The connection resolution skill 190a may, at a step 482, generate a handoff message. The connection resolution skill 190a may generate the handoff message in a manner similar to the replanner 157 described previously. Generating the handoff message may include generating a message to indicate to the user that the new assistant will handle the command. For example, if the connection resolution skill 190a determines that Carja should handle the command, the system 100 can cause the device 110 to output a message in Alexa's voice such as "Carja can help you with that." Alternatively, the system 100 can cause the device 110 to output a message in Carja's voice such as "Carja here. I can help you with that." The connection resolution may, at a step 484, send the handoff message to the orchestrator 130. The orchestrator 130 may, at a step 486, send the handoff message to the language output components 193. The language output components 193 may generate output audio data representing the handoff message. The language output components 193 may retrieve voice characteristics corresponding to the current assistant profile and/or the new assistant profile from the assistant metadata component 155 (or 255). The language output components 193 may thus generate output audio data representing synthesized speech in a voice style that can indicate to the user the identity of the synthesized speech (e.g., which assistant profile the synthesized speech corresponds to). The language output components 193 may, at a step 488, send the output audio data to the orchestrator 130. The orchestrator 130 may, at a step 489, cause the device 110 to output the audio data in the form of synthetic speech conveying the handoff message. The handoff message may be accompanied by visual indications such as a change in emitted light color and/or patterns, or a change in a voice chrome shown on an electronic display of the device 110.

The connection resolution skill 190a may, either before, after, or during the handoff operations, send, at a step 492, the communications entities back to the calling skill 190b. The calling skill 190b may, at the step 494, initiate the requested communications session based on the entities previously resolved and based on the new assistant profile. The calling skill 190b may, at a step 496, notify the orchestrator 130 that the request has been executed.

Figure 5A:
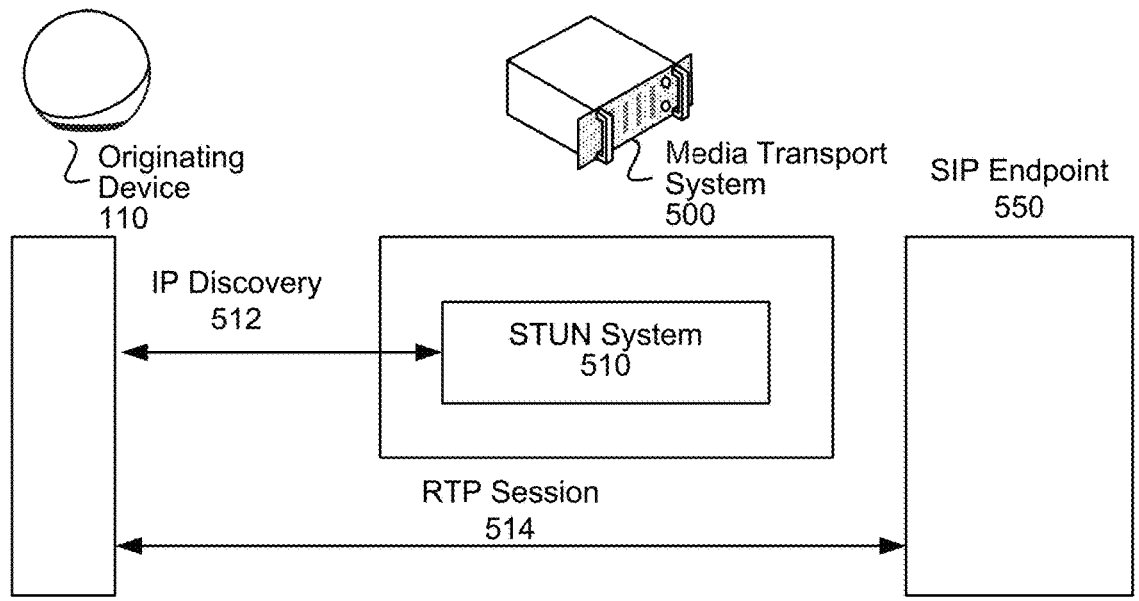
FIGS. 5A and 5B illustrate examples of establishing media connections between devices according to embodiments of the present disclosure.
Figure 5B:
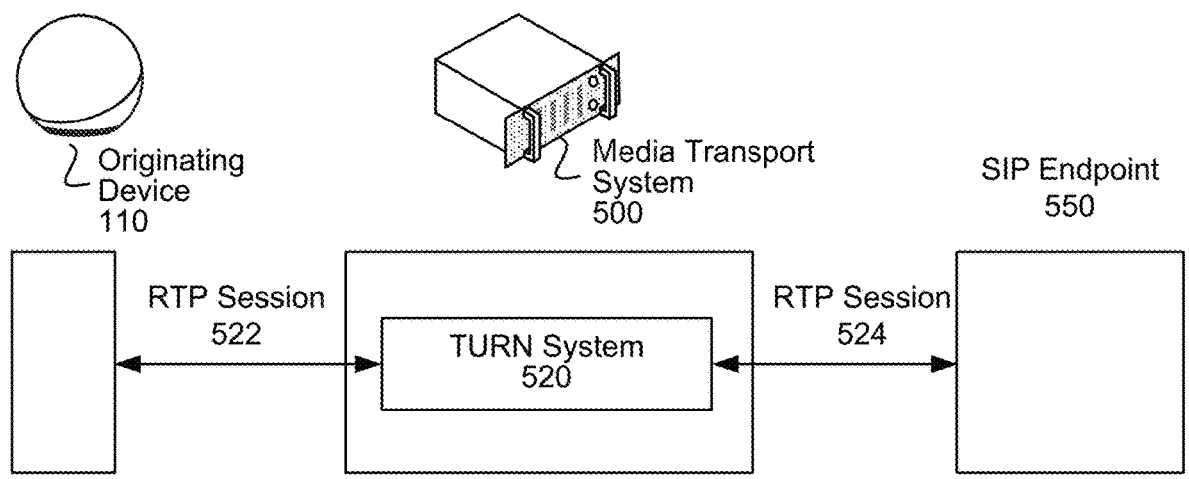

FIGS. 5A and 5B illustrate examples of establishing media connections between devices according to embodiments of the present disclosure. In some examples, an originating device 110 may have a publicly accessible IP address and may be configured to establish a real-time transport (RTP) protocol communication session directly with a SIP endpoint 550. The SIP endpoint 550 may correspond to a device 110, a component within the media transport system 500, a gateway component configured to interface with a remote network, and/or a device associated with the remote network itself. To enable the originating device 110 to establish the RTP communication session, the media transport system 500 may include Session Traversal of User Datagram Protocol (UDP) Through Network Address Translators (NATs) system (e.g., STUN system 510). The STUN system 510 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 5A, the originating device 110 may perform (512) IP discovery using the STUN system 510 and may use this information to set up an RTP communication session 514 (e.g., UDP communication) between the originating device 110 and the SIP endpoint 550 to establish a call.

In some examples, the originating device 110 may not have a publicly accessible IP address. For example, in some types of NAT the originating device 110 cannot route outside of the local network. To enable the originating device 110 to establish an RTP communication session, the media transport system 500 may include Traversal Using relays around NAT (TURN) system 520. The TURN system 520 may be configured to connect the originating device 110 to the SIP endpoint 550 when the originating device 110 is behind a NAT. As illustrated in FIG. 5B, the originating device 110 may establish (522) an RTP session with the TURN system 520 and the TURN system 520 may establish (524) an RTP session with the SIP endpoint 550. Thus, the originating device 110 may communicate with the SIP endpoint 550 via the TURN system 520. For example, the originating device 110 may send audio data and/or image data to the media transport system 500 and the media transport system 500 may send the audio data and/or the image data to the SIP endpoint 550. Similarly, the SIP endpoint 550 may send audio data and/or image data to the media transport system 500 and the media transport system 500 may send the audio data and/or the image data to the originating device 110.

In some examples, the system may establish communication sessions using a combination of the STUN system 510 and the TURN system 520 without departing from the disclosure. For example, a communication session may be more easily established/configured using the TURN system 520, but may benefit from latency improvements using the STUN system 510. Thus, the system may use the STUN system 510 when the communication session may be routed directly between two devices and may use the TURN system 520 for all other communication sessions. Additionally or alternatively, the system may use the STUN system 510 and/or the TURN system 520 selectively based on the communication session being established. For example, the system may use the STUN system 510 when establishing a communication session between two devices (e.g., point-to-point) within a single network (e.g., corporate LAN and/or WLAN), but may use the TURN system 520 when establishing a communication session between two devices on separate networks and/or three or more devices regardless of network(s).

When the communication session goes from only two devices to three or more devices, the system may need to transition from the STUN system 510 to the TURN system 520. Thus, if the system anticipates three or more devices being included in the communication session, the communication session may be performed using the TURN system 520. Similarly, when the communication session goes from three or more devices to only two devices, the system may need to transition from the TURN system 520 to the STUN system 510.

While FIGS. 5A-5B illustrate an RTP communication session being established between the originating device 110 and the SIP endpoint 550, the present disclosure is not limited thereto and the RTP communication session may be established between the originating device 110 and a gateway component or other device associated with the SIP endpoint 550 without departing from the present disclosure. Additionally or alternatively, while FIGS. 5A-5B illustrate examples of enabling communication sessions using the SIP protocol, the disclosure is not limited thereto and the media transport system 500 may use any protocols known to one of skill in the art.

While FIGS. 5A-5B illustrate examples of enabling communication sessions using a data connection (e.g., using Voice over Internet Protocol (VoIP), session initiation protocol (SIP), and/or the like), the disclosure is not limited thereto and the system 100 may enable communication sessions using any type of network without departing from the disclosure. For example, the media transport system 500 may enable communication sessions using a cellular connection (e.g., mobile phone network) or other external network without departing from the disclosure. For example, the media transport system 500 may send instructions (e.g., command data) to endpoints (e.g., caller devices, such as the device 110) instructing the endpoint to establish a communication session (e.g., dial a telephone number) in response to the voice command.

Figure 6:
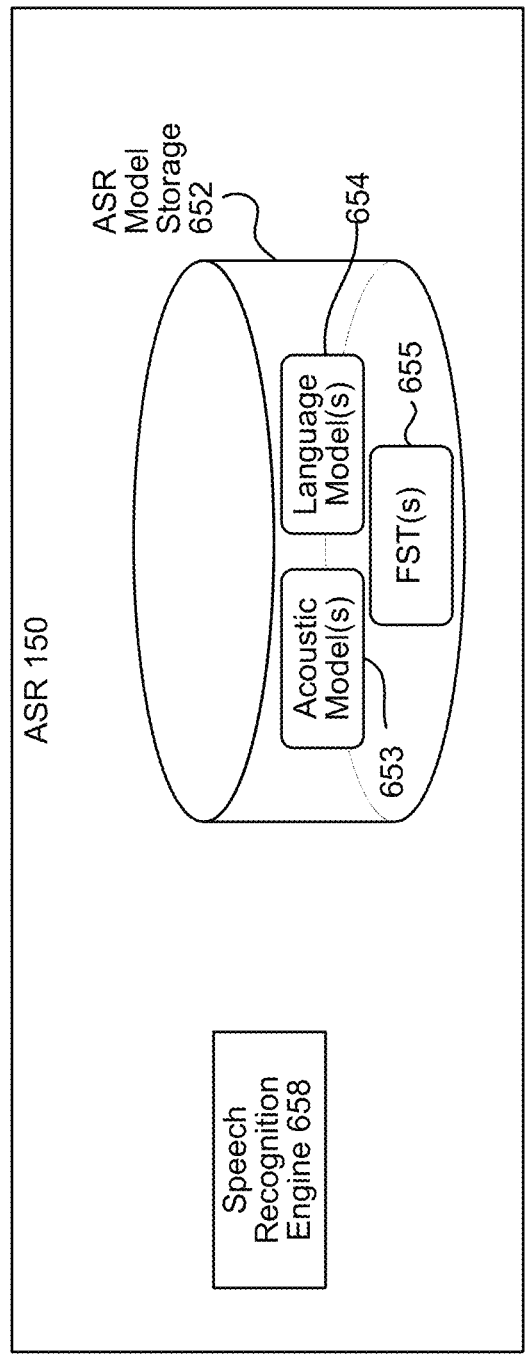
FIG. 6 is a conceptual diagram of an ASR component, according to embodiments of the present disclosure.

FIG. 6 is a conceptual diagram of an ASR component 150, according to embodiments of the present disclosure. The ASR component 150 may interpret a spoken natural language input based on the similarity between the spoken natural language input and pre-established language models 654 stored in an ASR model storage 652. For example, the ASR component 150 may compare the audio data with models for sounds (e.g., subword units or phonemes) and sequences of sounds to identify words that match the sequence of sounds spoken in the natural language input. Alternatively, the ASR component 150 may use a finite state transducer (FST) 655 to implement the language model functions.

When the ASR component 150 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 653 stored in the ASR model storage 652), and the likelihood that a particular word, which matches the sounds, would be included in the sentence at the specific location (e.g., using a language or grammar model 654). Based on the considered factors and the assigned confidence score, the ASR component 150 may output an ASR hypothesis that most likely matches the spoken natural language input, or may output multiple ASR hypotheses in the form of a lattice or an N-best list, with each ASR hypothesis corresponding to a respective score.

The ASR component 150 may include a speech recognition engine 658. The ASR component 150 receives audio data 111 (for example, received from a local device 110 having processed audio detected by a microphone by an acoustic front end (AFE) or other component). The speech recognition engine 658 compares the audio data 111 with acoustic models 653, language models 654, FST(s) 655, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 658 may process the audio data 111 with reference to information stored in the ASR model storage 652. Feature vectors of the audio data 111 may arrive at the system 120 encoded, in which case they may be decoded prior to processing by the speech recognition engine 658.

The speech recognition engine 658 attempts to match received feature vectors to language acoustic units (e.g., phonemes) and words as known in the stored acoustic models 653, language models 1B54, and FST(s) 655. For example, audio data 111 may be processed by one or more acoustic model(s) 653 to determine acoustic unit data. The acoustic unit data may include indicators of acoustic units detected in the audio data 111 by the ASR component 150. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 654 (and/or using FST 655) to determine ASR data 810. The ASR data 810 can include one or more hypotheses. One or more of the hypotheses represented in the ASR data 810 may then be sent to further components (such as the NLU component 160) for further processing as discussed herein. The ASR data 810 may include representations of text of an utterance, such as words, subword units, or the like.

The speech recognition engine 658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 150 will output ASR hypotheses that make sense grammatically. The specific models used may be general models or may be models corresponding to a particular domain, such as music, banking, etc.

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 658 may use the acoustic model(s) 653 to attempt to match received audio feature vectors to words or subword acoustic units. An acoustic unit may be a senone, phoneme, phoneme in context, syllable, part of a syllable, syllable in context, or any other such portion of a word. The speech recognition engine 658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 150 outputs ASR hypotheses that make sense grammatically.

The speech recognition engine 658 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 658 may also compute scores of branches of the paths based on language models or grammars. Language modeling involves determining scores for what words are likely to be used together to form coherent words and sentences. Application of a language model may improve the likelihood that the ASR component 150 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 7:
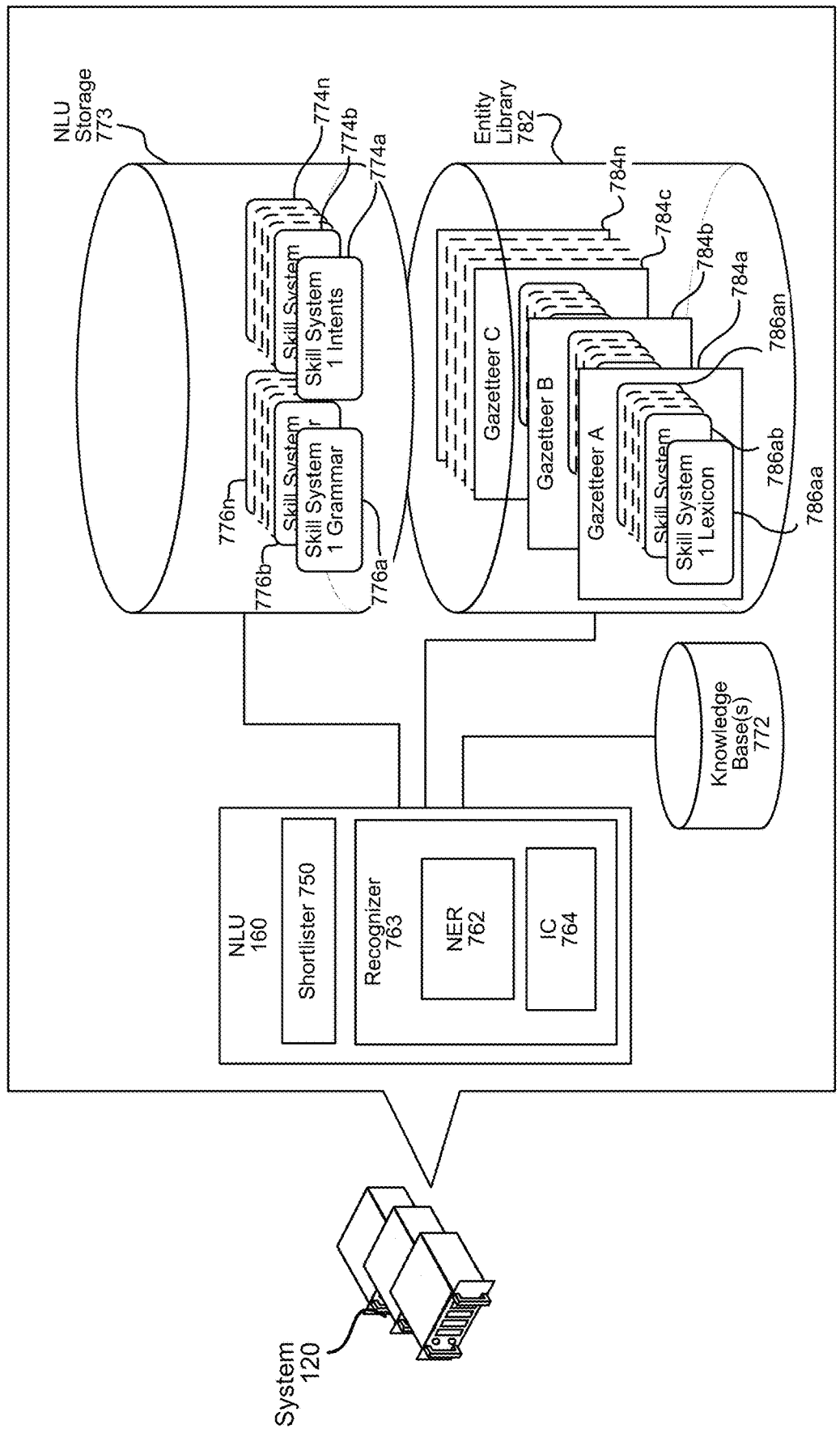
FIG. 7 is a conceptual diagram of how natural language processing is performed, according to embodiments of the present disclosure.
Figure 8:
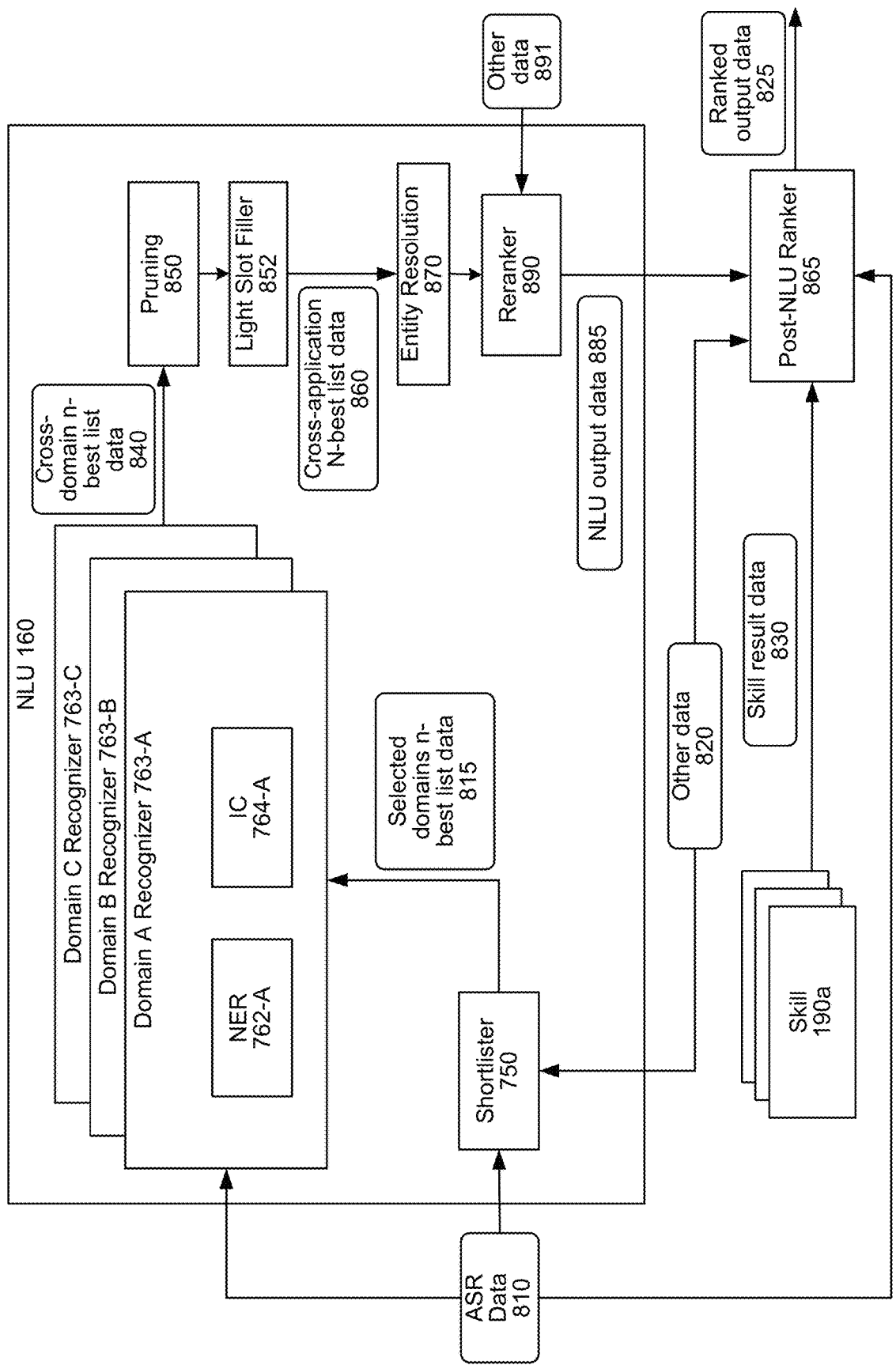
FIG. 8 is a conceptual diagram of how natural language processing is performed, according to embodiments of the present disclosure.

FIGS. 7 and 8 illustrates how the NLU component 160 may perform NLU processing. FIG. 7 is a conceptual diagram of how natural language processing is performed, according to embodiments of the present disclosure. And FIG. 8 is a conceptual diagram of how natural language processing is performed, according to embodiments of the present disclosure.

FIG. 7 illustrates how NLU processing is performed on text data. The NLU component 160 may process text data including several ASR hypotheses of a single user input. For example, if the ASR component 150 outputs text data including an n-best list of ASR hypotheses, the NLU component 160 may process the text data with respect to all (or a portion of) the ASR hypotheses represented therein.

The NLU component 160 may annotate text data by parsing and/or tagging the text data. For example, for the text data "tell me the weather for Seattle," the NLU component 160 may tag "tell me the weather for Seattle" as an <OutputWeather> intent as well as separately tag "Seattle" as a location for the weather information.

The NLU component 160 may include a shortlister component 750. The shortlister component 750 selects skills that may execute with respect to ASR output data 810 input to the NLU component 160 (e.g., applications that may execute with respect to the user input). The ASR output data 810 (which may also be referred to as ASR data 810) may include representations of text of an utterance, such as words, subword units, or the like. The shortlister component 750 thus limits downstream, more resource intensive NLU processes to being performed with respect to skills that may execute with respect to the user input.

Without a shortlister component 750, the NLU component 160 may process ASR output data 810 input thereto with respect to every skill of the system, either in parallel, in series, or using some combination thereof. By implementing a shortlister component 750, the NLU component 160 may process ASR output data 810 with respect to only the skills that may execute with respect to the user input. This reduces total compute power and latency attributed to NLU processing.

The shortlister component 750 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 750 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 750 may be trained with respect to a different skill. Alternatively, the shortlister component 750 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 750. For example, some sample user inputs may be positive examples (e.g., user inputs that may be used to invoke the skill). Other sample user inputs may be negative examples (e.g., user inputs that may not be used to invoke the skill).

As described above, the shortlister component 750 may include a different trained model for each skill of the system, a different trained model for each domain, or some other combination of trained model(s). For example, the shortlister component 750 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 750 to output indications of only a portion of the skills that the ASR output data 810 may relate to. For example, a user input may correspond to "tell me about Tom Collins." If the model is clustered based on domain, the shortlister component 750 may determine the user input corresponds to a recipe skill (e.g., a drink recipe) even though the user input may also correspond to an information skill (e.g., including information about a person named Tom Collins).

The NLU component 160 may include one or more recognizers 763. In at least some embodiments, a recognizer 763 may be associated with a skill system 125 (e.g., the recognizer may be configured to interpret text data to correspond to the skill system 125). In at least some other examples, a recognizer 763 may be associated with a domain such as smart home, video, music, weather, custom, etc. (e.g., the recognizer may be configured to interpret text data to correspond to the domain).

If the shortlister component 750 determines ASR output data 810 is potentially associated with multiple domains, the recognizers 763 associated with the domains may process the ASR output data 810, while recognizers 763 not indicated in the shortlister component 750's output may not process the ASR output data 810. The "shortlisted" recognizers 763 may process the ASR output data 810 in parallel, in series, partially in parallel, etc. For example, if ASR output data 810 potentially relates to both a communications domain and a music domain, a recognizer associated with the communications domain may process the ASR output data 810 in parallel, or partially in parallel, with a recognizer associated with the music domain processing the ASR output data 810.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity associated with a domain, associated with the recognizer 763 implementing the NER component 762. The NER component 762 (or other component of the NLU component 160) may also determine whether a word refers to an entity whose identity is not explicitly mentioned in the text data, for example "him," "her," "it" or other anaphora, exophora, or the like.

Each recognizer 763, and more specifically each NER component 762, may be associated with a particular grammar database 776, a particular set of intents/actions 774, and a particular personalized lexicon 786. The grammar databases 776, and intents/actions 774 may be stored in an NLU storage 773. Each gazetteer 784 may include domain/skill-indexed lexical information associated with a particular user and/or device 110. For example, a Gazetteer A (784a) includes skill-indexed lexical information 786aa to 786an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 762 applies grammar information 776 and lexical information 786 associated with a domain (associated with the recognizer 763 implementing the NER component 762) to determine a mention of one or more entities in text data. In this manner, the NER component 762 identifies "slots" (each corresponding to one or more particular words in text data) that may be useful for later processing. The NER component 762 may also label each slot with a type (e.g., noun, place, city, artist name, song name, etc.).

Each grammar database 776 includes the names of entities (i.e., nouns) commonly found in speech about the particular domain to which the grammar database 776 relates, whereas the lexical information 786 is personalized to the user and/or the device 110 from which the user input originated. For example, a grammar database 776 associated with a shopping domain may include a database of words commonly used when people discuss shopping.

A downstream process called entity resolution (discussed in detail elsewhere herein) links a slot of text data to a specific entity known to the system. To perform entity resolution, the NLU component 160 may utilize gazetteer information (784a-784n) stored in an entity library storage 782. The gazetteer information 784 may be used to match text data (representing a portion of the user input) with text data representing known entities, such as song titles, contact names, etc. Gazetteers 784 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 763 may also include an intent classification (IC) component 764. An IC component 764 parses text data to determine an intent(s) (associated with the domain associated with the recognizer 763 implementing the IC component 764) that potentially represents the user input. An intent represents to an action a user desires be performed. An IC component 764 may communicate with a database 774 of words linked to intents. For example, a music intent database may link words and phrases such as "quiet," "volume off," and "mute" to a <Mute> intent. An IC component 764 identifies potential intents by comparing words and phrases in text data (representing at least a portion of the user input) to the words and phrases in an intents database 774 (associated with the domain that is associated with the recognizer 763 implementing the IC component 764).

The intents identifiable by a specific IC component 764 are linked to domain-specific (i.e., the domain associated with the recognizer 763 implementing the IC component 764) grammar frameworks 776 with "slots" to be filled. Each slot of a grammar framework 776 corresponds to a portion of text data that the system believes corresponds to an entity. For example, a grammar framework 776 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786 (associated with the domain associated with the recognizer 763 implementing the NER component 762), attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as Hidden Markov Models, maximum entropy models, log linear models, conditional random fields (CRF), and the like. For example, an NER component 762 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb based on a word database associated with the music domain, which an IC component 764 (also implemented by the music domain recognizer) may determine corresponds to a <PlayMusic> intent. At this stage, no determination has been made as to the meaning of "mother's little helper" or "the rolling stones," but based on grammar rules and models, the NER component 762 has determined the text of these phrases relates to the grammatical object (i.e., entity) of the user input represented in the text data.

An NER component 762 may tag text data to attribute meaning thereto. For example, an NER component 762 may tag "play mother's little helper by the rolling stones" as: {domain} Music, {intent}<PlayMusic>, {artist name} rolling stones, {media type} SONG, and {song title} mother's little helper. For further example, the NER component 762 may tag "play songs by the rolling stones" as: {domain} Music, {intent}<PlayMusic>, {artist name} rolling stones, and {media type} SONG.

The shortlister component 750 may receive ASR output data 810 output from the ASR component 150 or output from the device 110b (as illustrated in FIG. 8). The ASR component 150 may embed the ASR output data 810 into a form processable by a trained model(s) using sentence embedding techniques as known in the art. Sentence embedding results in the ASR output data 810 including text in a structure that enables the trained models of the shortlister component 750 to operate on the ASR output data 810. For example, an embedding of the ASR output data 810 may be a vector representation of the ASR output data 810.

The shortlister component 750 may make binary determinations (e.g., yes or no) regarding which domains relate to the ASR output data 810. The shortlister component 750 may make such determinations using the one or more trained models described herein above. If the shortlister component 750 implements a single trained model for each domain, the shortlister component 750 may simply run the models that are associated with enabled domains as indicated in a user profile associated with the device 110 and/or user that originated the user input.

The shortlister component 750 may generate n-best list data 815 representing domains that may execute with respect to the user input represented in the ASR output data 810. The size of the n-best list represented in the n-best list data 815 is configurable. In an example, the n-best list data 815 may indicate every domain of the system as well as contain an indication, for each domain, regarding whether the domain is likely capable to execute the user input represented in the ASR output data 810. In another example, instead of indicating every domain of the system, the n-best list data 815 may only indicate the domains that are likely to be able to execute the user input represented in the ASR output data 810. In yet another example, the shortlister component 750 may implement thresholding such that the n-best list data 815 may indicate no more than a maximum number of domains that may execute the user input represented in the ASR output data 810. In an example, the threshold number of domains that may be represented in the n-best list data 815 is ten. In another example, the domains included in the n-best list data 815 may be limited by a threshold a score, where only domains indicating a likelihood to handle the user input is above a certain score (as determined by processing the ASR output data 810 by the shortlister component 750 relative to such domains) are included in the n-best list data 815.

The ASR output data 810 may correspond to more than one ASR hypothesis. When this occurs, the shortlister component 750 may output a different n-best list (represented in the n-best list data 815) for each ASR hypothesis. Alternatively, the shortlister component 750 may output a single n-best list representing the domains that are related to the multiple ASR hypotheses represented in the ASR output data 810.

As indicated above, the shortlister component 750 may implement thresholding such that an n-best list output therefrom may include no more than a threshold number of entries. If the ASR output data 810 includes more than one ASR hypothesis, the n-best list output by the shortlister component 750 may include no more than a threshold number of entries irrespective of the number of ASR hypotheses output by the ASR component 150. Alternatively or in addition, the n-best list output by the shortlister component 750 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 810, the shortlister component 750 may generate confidence scores representing likelihoods that domains relate to the ASR output data 810. If the shortlister component 750 implements a different trained model for each domain, the shortlister component 750 may generate a different confidence score for each individual domain trained model that is run. If the shortlister component 750 runs the models of every domain when ASR output data 810 is received, the shortlister component 750 may generate a different confidence score for each domain of the system. If the shortlister component 750 runs the models of only the domains that are associated with skills indicated as enabled in a user profile associated with the device 110 and/or user that originated the user input, the shortlister component 750 may only generate a different confidence score for each domain associated with at least one enabled skill. If the shortlister component 750 implements a single trained model with domain specifically trained portions, the shortlister component 750 may generate a different confidence score for each domain who's specifically trained portion is run. The shortlister component 750 may perform matrix vector modification to obtain confidence scores for all domains of the system in a single instance of processing of the ASR output data 810.

N-best list data 815 including confidence scores that may be output by the shortlister component 750 may be represented as, for example:

Search domain, 0.67
Recipe domain, 0.62
Information domain, 0.57
Shopping domain, 0.42

As indicated, the confidence scores output by the shortlister component 750 may be numeric values. The confidence scores output by the shortlister component 750 may alternatively be binned values (e.g., high, medium, low).

The n-best list may only include entries for domains having a confidence score satisfying (e.g., equaling or exceeding) a minimum threshold confidence score. Alternatively, the shortlister component 750 may include entries for all domains associated with user enabled skills, even if one or more of the domains are associated with confidence scores that do not satisfy the minimum threshold confidence score.

The shortlister component 750 may consider other data 820 when determining which domains may relate to the user input represented in the ASR output data 810 as well as respective confidence scores. The other data 820 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 820 may include an indicator of the user associated with the ASR output data 810, for example as determined by the user recognition component 195.

The other data 820 may be character embedded prior to being input to the shortlister component 750. The other data 820 may alternatively be embedded using other techniques known in the art prior to being input to the shortlister component 750.

The other data 820 may also include data indicating the domains associated with skills that are enabled with respect to the device 110 and/or user that originated the user input. The shortlister component 750 may use such data to determine which domain-specific trained models to run. That is, the shortlister component 750 may determine to only run the trained models associated with domains that are associated with user-enabled skills. The shortlister component 750 may alternatively use such data to alter confidence scores of domains.

As an example, considering two domains, a first domain associated with at least one enabled skill and a second domain not associated with any user-enabled skills of the user that originated the user input, the shortlister component 750 may run a first model specific to the first domain as well as a second model specific to the second domain. Alternatively, the shortlister component 750 may run a model configured to determine a score for each of the first and second domains. The shortlister component 750 may determine a same confidence score for each of the first and second domains in the first instance. The shortlister component 750 may then alter those confidence scores based on which domains is associated with at least one skill enabled by the present user. For example, the shortlister component 750 may increase the confidence score associated with the domain associated with at least one enabled skill while leaving the confidence score associated with the other domain the same. Alternatively, the shortlister component 750 may leave the confidence score associated with the domain associated with at least one enabled skill the same while decreasing the confidence score associated with the other domain. Moreover, the shortlister component 750 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 170. When the shortlister component 750 receives the ASR output data 810, the shortlister component 750 may determine whether profile data associated with the user and/or device 110 that originated the command includes an indication of enabled skills.

The other data 820 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 750 may use such data to determine which domain-specific trained models to run. For example, if the device 110 corresponds to a displayless type device, the shortlister component 750 may determine not to run trained models specific to domains that output video data. The shortlister component 750 may alternatively use such data to alter confidence scores of domains.

As an example, considering two domains, one that outputs audio data and another that outputs video data, the shortlister component 750 may run a first model specific to the domain that generates audio data as well as a second model specific to the domain that generates video data. Alternatively the shortlister component 750 may run a model configured to determine a score for each domain. The shortlister component 750 may determine a same confidence score for each of the domains in the first instance. The shortlister component 750 may then alter the original confidence scores based on the type of the device 110 that originated the user input corresponding to the ASR output data 810. For example, if the device 110 is a displayless device, the shortlister component 750 may increase the confidence score associated with the domain that generates audio data while leaving the confidence score associated with the domain that generates video data the same. Alternatively, if the device 110 is a displayless device, the shortlister component 750 may leave the confidence score associated with the domain that generates audio data the same while decreasing the confidence score associated with the domain that generates video data. Moreover, if the device 110 is a displayless device, the shortlister component 750 may increase the confidence score associated with the domain that generates audio data as well as decrease the confidence score associated with the domain that generates video data.

The type of device information represented in the other data 820 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 820 may represent the smart TV of other display device, and not the displayless device that captured the spoken user input.

The other data 820 may also include data indicating the user input originating device's speed, location, or other mobility information. For example, the device may correspond to a vehicle including a display. If the vehicle is moving, the shortlister component 750 may decrease the confidence score associated with a domain that generates video data as it may be undesirable to output video content to a user while the user is driving. The device may output data to the system(s) 120 indicating when the device is moving.

The other data 820 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 750 may use such data to alter confidence scores of domains. For example, the shortlister component 750 may run a first model specific to a first domain as well as a second model specific to a second domain. Alternatively, the shortlister component 750 may run a model configured to determine a score for each domain. The shortlister component 750 may also determine a same confidence score for each of the domains in the first instance. The shortlister component 750 may then alter the original confidence scores based on the first domain being invoked to cause the system to output content while the current user input was received. Based on the first domain being invoked, the shortlister component 750 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 815 generated by the shortlister component 750 as well as the different types of other data 820 considered by the shortlister component 750 are configurable. For example, the shortlister component 750 may update confidence scores as more other data 820 is considered. For further example, the n-best list data 815 may exclude relevant domains if thresholding is implemented. Thus, for example, the shortlister component 750 may include an indication of a domain in the n-best list 815 unless the shortlister component 750 is one hundred percent confident that the domain may not execute the user input represented in the ASR output data 810 (e.g., the shortlister component 750 determines a confidence score of zero for the domain).

The shortlister component 750 may send the ASR output data 810 to recognizers 763 associated with domains represented in the n-best list data 815. Alternatively, the shortlister component 750 may send the n-best list data 815 or some other indicator of the selected subset of domains to another component (such as the orchestrator component 130) which may in turn send the ASR output data 810 to the recognizers 763 corresponding to the domains included in the n-best list data 815 or otherwise indicated in the indicator. If the shortlister component 750 generates an n-best list representing domains without any associated confidence scores, the shortlister component 750/orchestrator component 130 may send the ASR output data 810 to recognizers 763 associated with domains that the shortlister component 750 determines may execute the user input. If the shortlister component 750 generates an n-best list representing domains with associated confidence scores, the shortlister component 750/orchestrator component 130 may send the ASR output data 810 to recognizers 763 associated with domains associated with confidence scores satisfying (e.g., meeting or exceeding) a threshold minimum confidence score.

A recognizer 763 may output tagged text data generated by an NER component 762 and an IC component 764, as described herein above. The NLU component 160 may compile the output tagged text data of the recognizers 763 into a single cross-domain n-best list 840 and may send the cross-domain n-best list 840 to a pruning component 850. Each entry of tagged text (e.g., each NLU hypothesis) represented in the cross-domain n-best list data 840 may be associated with a respective score indicating a likelihood that the NLU hypothesis corresponds to the domain associated with the recognizer 763 from which the NLU hypothesis was output. For example, the cross-domain n-best list data 840 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 850 may sort the NLU hypotheses represented in the cross-domain n-best list data 840 according to their respective scores. The pruning component 850 may perform score thresholding with respect to the cross-domain NLU hypotheses. For example, the pruning component 850 may select NLU hypotheses associated with scores satisfying (e.g., meeting and/or exceeding) a threshold score. The pruning component 850 may also or alternatively perform number of NLU hypothesis thresholding. For example, the pruning component 850 may select the top scoring NLU hypothesis(es). The pruning component 850 may output a portion of the NLU hypotheses input thereto. The purpose of the pruning component 850 is to create a reduced list of NLU hypotheses so that downstream, more resource intensive, processes may only operate on the NLU hypotheses that most likely represent the user's intent.

The NLU component 160 may include a light slot filler component 852. The light slot filler component 852 can take text from slots represented in the NLU hypotheses output by the pruning component 850 and alter them to make the text more easily processed by downstream components. The light slot filler component 852 may perform low latency operations that do not involve heavy operations such as reference to a knowledge base (e.g., 772. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-domain n-best list data 860.

The cross-domain n-best list data 860 may be input to an entity resolution component 870. The entity resolution component 870 can apply rules or other instructions to standardize labels or tokens from previous stages into an intent/slot representation. The precise transformation may depend on the domain. For example, for a travel domain, the entity resolution component 870 may transform text corresponding to "Boston airport" to the standard BOS three-letter code referring to the airport. The entity resolution component 870 can refer to a knowledge base (e.g., 772) that is used to specifically identify the precise entity referred to in each slot of each NLU hypothesis represented in the cross-domain n-best list data 860. Specific intent/slot combinations may also be tied to a particular source, which may then be used to resolve the text. In the example "play songs by the stones," the entity resolution component 870 may reference a personal music catalog, Amazon Music account, a user profile, or the like. The entity resolution component 870 may output an altered n-best list that is based on the cross-domain n-best list 860 but that includes more detailed information (e.g., entity IDs) about the specific entities mentioned in the slots and/or more detailed slot data that can eventually be used by a skill. The NLU component 160 may include multiple entity resolution components 870 and each entity resolution component 870 may be specific to one or more domains.

The NLU component 160 may include a reranker 890. The reranker 890 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 870.

The reranker 890 may apply re-scoring, biasing, or other techniques. The reranker 890 may consider not only the data output by the entity resolution component 870, but may also consider other data 891. The other data 891 may include a variety of information. For example, the other data 891 may include skill rating or popularity data. For example, if one skill has a high rating, the reranker 890 may increase the score of a NLU hypothesis that may be processed by the skill. The other data 891 may also include information about skills that have been enabled by the user that originated the user input. For example, the reranker 890 may assign higher scores to NLU hypothesis that may be processed by enabled skills than NLU hypothesis that may be processed by non-enabled skills. The other data 891 may also include data indicating user usage history, such as if the user that originated the user input regularly uses a particular skill or does so at particular times of day. The other data 891 may additionally include data indicating date, time, location, weather, type of device 110, user identifier, context, as well as other information. For example, the reranker 890 may consider when any particular skill is currently active (e.g., music being played, a game being played, etc.).

As illustrated and described, the entity resolution component 870 is implemented prior to the reranker 890. The entity resolution component 870 may alternatively be implemented after the reranker 890. Implementing the entity resolution component 870 after the reranker 890 limits the NLU hypotheses processed by the entity resolution component 870 to only those hypotheses that successfully pass through the reranker 890.

The reranker 890 may be a global reranker (e.g., one that is not specific to any particular domain). Alternatively, the NLU component 160 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 160 may perform NLU processing described above with respect to domains associated with skills wholly implemented as part of the system(s) 120 (e.g., designated 190 in FIGS. 1A and 1B). The NLU component 160 may separately perform NLU processing described above with respect to domains associated with skills that are at least partially implemented as part of the skill system(s) 125. In an example, the shortlister component 750 may only process with respect to these latter domains. Results of these two NLU processing paths may be merged into NLU output data 885, which may be sent to a post-NLU ranker 165, which may be implemented by the system(s) 120.

The post-NLU ranker 165 may include a statistical component that produces a ranked list of intent/skill pairs with associated confidence scores. Each confidence score may indicate an adequacy of the skill's execution of the intent with respect to NLU results data associated with the skill. The post-NLU ranker 165 may operate one or more trained models configured to process the NLU results data 885, skill result data 830, and the other data 820 in order to output ranked output data 825. The ranked output data 825 may include an n-best list where the NLU hypotheses in the NLU results data 885 are reordered such that the n-best list in the ranked output data 825 represents a prioritized list of skills to respond to a user input as determined by the post-NLU ranker 165. The ranked output data 825 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 165 enables the system to better determine the best skill to execute the user input. For example, first and second NLU hypotheses in the NLU results data 885 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 165 (or other scheduling component such as orchestrator component 130) may solicit the first skill and the second skill to provide potential result data 830 based on the first NLU hypothesis and the second NLU hypothesis, respectively. For example, the post-NLU ranker 165 may send the first NLU hypothesis to the first skill 190a along with a request for the first skill 190a to at least partially execute with respect to the first NLU hypothesis. The post-NLU ranker 165 may also send the second NLU hypothesis to the second skill 190b along with a request for the second skill 190b to at least partially execute with respect to the second NLU hypothesis. The post-NLU ranker 165 receives, from the first skill 190a, first result data 830a generated from the first skill 190a's execution with respect to the first NLU hypothesis. The post-NLU ranker 165 also receives, from the second skill 190b, second results data 830b generated from the second skill 190b's execution with respect to the second NLU hypothesis.

The result data 830 may include various portions. For example, the result data 830 may include content (e.g., audio data, text data, and/or video data) to be output to a user. The result data 830 may also include a unique identifier used by the system(s) 120 and/or the skill system(s) 125 to locate the data to be output to a user. The result data 830 may also include an instruction. For example, if the user input corresponds to "turn on the light," the result data 830 may include an instruction causing the system to turn on a light associated with a profile of the device (110a/110b) and/or user.

The post-NLU ranker 165 may consider the first result data 830a and the second result data 830b to alter the first confidence score and the second confidence score of the first NLU hypothesis and the second NLU hypothesis, respectively. That is, the post-NLU ranker 165 may generate a third confidence score based on the first result data 830a and the first confidence score. The third confidence score may correspond to how likely the post-NLU ranker 165 determines the first skill will correctly respond to the user input. The post-NLU ranker 165 may also generate a fourth confidence score based on the second result data 830b and the second confidence score. One skilled in the art will appreciate that a first difference between the third confidence score and the fourth confidence score may be greater than a second difference between the first confidence score and the second confidence score. The post-NLU ranker 165 may also consider the other data 820 to generate the third confidence score and the fourth confidence score. While it has been described that the post-NLU ranker 165 may alter the confidence scores associated with first and second NLU hypotheses, one skilled in the art will appreciate that the post-NLU ranker 165 may alter the confidence scores of more than two NLU hypotheses. The post-NLU ranker 165 may select the result data 830 associated with the skill 190 with the highest altered confidence score to be the data output in response to the current user input. The post-NLU ranker 165 may also consider the ASR output data 810 to alter the NLU hypotheses confidence scores.

The orchestrator component 130 may, prior to sending the NLU results data 885 to the post-NLU ranker 165, associate intents in the NLU hypotheses with skills 190. For example, if a NLU hypothesis includes a <PlayMusic> intent, the orchestrator component 130 may associate the NLU hypothesis with one or more skills 190 that can execute the <PlayMusic> intent. Thus, the orchestrator component 130 may send the NLU results data 885, including NLU hypotheses paired with skills 190, to the post-NLU ranker 165. In response to ASR output data 810 corresponding to "what should I do for dinner today," the orchestrator component 130 may generates pairs of skills 190 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 165 queries each skill 190, paired with a NLU hypothesis in the NLU output data 885, to provide result data 830 based on the NLU hypothesis with which it is associated. That is, with respect to each skill, the post-NLU ranker 165 colloquially asks the each skill "if given this NLU hypothesis, what would you do with it." According to the above example, the post-NLU ranker 165 may send skills 190 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 165 may query each of the skills 190 in parallel or substantially in parallel.

A skill 190 may provide the post-NLU ranker 165 with various data and indications in response to the post-NLU ranker 165 soliciting the skill 190 for result data 830. A skill 190 may simply provide the post-NLU ranker 165 with an indication of whether or not the skill can execute with respect to the NLU hypothesis it received. A skill 190 may also or alternatively provide the post-NLU ranker 165 with output data generated based on the NLU hypothesis it received. In some situations, a skill 190 may need further information in addition to what is represented in the received NLU hypothesis to provide output data responsive to the user input. In these situations, the skill 190 may provide the post-NLU ranker 165 with result data 830 indicating slots of a framework that the skill 190 further needs filled or entities that the skill 190 further needs resolved prior to the skill 190 being able to provided result data 830 responsive to the user input. The skill 190 may also provide the post-NLU ranker 165 with an instruction and/or computer-generated speech indicating how the skill 190 recommends the system solicit further information needed by the skill 190. The skill 190 may further provide the post-NLU ranker 165 with an indication of whether the skill 190 will have all needed information after the user provides additional information a single time, or whether the skill 190 will need the user to provide various kinds of additional information prior to the skill 190 having all needed information. According to the above example, skills 190 may provide the post-NLU ranker 165 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 830 includes an indication provided by a skill 190 indicating whether or not the skill 190 can execute with respect to a NLU hypothesis; data generated by a skill 190 based on a NLU hypothesis; as well as an indication provided by a skill 190 indicating the skill 190 needs further information in addition to what is represented in the received NLU hypothesis.

The post-NLU ranker 165 uses the result data 830 provided by the skills 190 to alter the NLU processing confidence scores generated by the reranker 890. That is, the post-NLU ranker 165 uses the result data 830 provided by the queried skills 190 to create larger differences between the NLU processing confidence scores generated by the reranker 890. Without the post-NLU ranker 165, the system may not be confident enough to determine an output in response to a user input, for example when the NLU hypotheses associated with multiple skills are too close for the system to confidently determine a single skill 190 to invoke to respond to the user input. For example, if the system does not implement the post-NLU ranker 165, the system may not be able to determine whether to obtain output data from a general reference information skill or a medical information skill in response to a user input corresponding to "what is acne."

The post-NLU ranker 165 may prefer skills 190 that provide result data 830 responsive to NLU hypotheses over skills 190 that provide result data 830 corresponding to an indication that further information is needed, as well as skills 190 that provide result data 830 indicating they can provide multiple responses to received NLU hypotheses. For example, the post-NLU ranker 165 may generate a first score for a first skill 190a that is greater than the first skill's NLU confidence score based on the first skill 190a providing result data 830a including a response to a NLU hypothesis. For further example, the post-NLU ranker 165 may generate a second score for a second skill 190b that is less than the second skill's NLU confidence score based on the second skill 190*b* providing result data 830*b* indicating further information is needed for the second skill 190*b* to provide a response to a NLU hypothesis. Yet further, for example, the post-NLU ranker 165 may generate a third score for a third skill 190*c* that is less than the third skill's NLU confidence score based on the third skill 190*c* providing result data 830*c* indicating the third skill 190*c* can provide multiple responses to a NLU hypothesis.

The post-NLU ranker 165 may consider other data 820 in determining scores. The other data 820 may include rankings associated with the queried skills 190. A ranking may be a system ranking or a user-specific ranking. A ranking may indicate a veracity of a skill from the perspective of one or more users of the system. For example, the post-NLU ranker 165 may generate a first score for a first skill 190*a* that is greater than the first skill's NLU processing confidence score based on the first skill 190*a* being associated with a high ranking. For further example, the post-NLU ranker 165 may generate a second score for a second skill 190*b* that is less than the second skill's NLU processing confidence score based on the second skill 190*b* being associated with a low ranking.

The other data 820 may include information indicating whether or not the user that originated the user input has enabled one or more of the queried skills 190. For example, the post-NLU ranker 165 may generate a first score for a first skill 190*a* that is greater than the first skill's NLU processing confidence score based on the first skill 190*a* being enabled by the user that originated the user input. For further example, the post-NLU ranker 165 may generate a second score for a second skill 190*b* that is less than the second skill's NLU processing confidence score based on the second skill 190*b* not being enabled by the user that originated the user input. When the post-NLU ranker 165 receives the NLU results data 885, the post-NLU ranker 165 may determine whether profile data, associated with the user and/or device that originated the user input, includes indications of enabled skills.

The other data 820 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 165 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 165 may increase the NLU processing confidence score associated with a first skill configured to output visual data and/or decrease the NLU processing confidence score associated with a second skill configured to output audio data.

The other data 820 may include information indicating the veracity of the result data 830 provided by a skill 190. For example, if a user says "tell me a recipe for pasta sauce," a first skill 190*a* may provide the post-NLU ranker 165 with first result data 830*a* corresponding to a first recipe associated with a five star rating and a second skill 190*b* may provide the post-NLU ranker 165 with second result data 830*b* corresponding to a second recipe associated with a one star rating. In this situation, the post-NLU ranker 165 may increase the NLU processing confidence score associated with the first skill 190*a* based on the first skill 190*a* providing the first result data 830*a* associated with the five star rating and/or decrease the NLU processing confidence score associated with the second skill 190*b* based on the second skill 190*b* providing the second result data 830*b* associated with the one star rating.

The other data 820 may include information indicating the type of device that originated the user input. For example, the device may correspond to a "hotel room" type if the device is located in a hotel room. If a user inputs a command corresponding to "order me food" to the device located in the hotel room, the post-NLU ranker 165 may increase the NLU processing confidence score associated with a first skill 190*a* corresponding to a room service skill associated with the hotel and/or decrease the NLU processing confidence score associated with a second skill 190*b* corresponding to a food skill not associated with the hotel.

The other data 820 may include information indicating a location of the device and/or user that originated the user input. The system may be configured with skills 190 that may only operate with respect to certain geographic locations. For example, a user may provide a user input corresponding to "when is the next train to Portland." A first skill 190*a* may operate with respect to trains that arrive at, depart from, and pass through Portland, Oreg. A second skill 190*b* may operate with respect to trains that arrive at, depart from, and pass through Portland, Me. If the device and/or user that originated the user input is located in Seattle, Wash., the post-NLU ranker 165 may increase the NLU processing confidence score associated with the first skill 190*a* and/or decrease the NLU processing confidence score associated with the second skill 190*b*. Likewise, if the device and/or user that originated the user input is located in Boston, Mass., the post-NLU ranker 165 may increase the NLU processing confidence score associated with the second skill 190*b* and/or decrease the NLU processing confidence score associated with the first skill 190*a*.

The other data 820 may include information indicating a time of day. The system may be configured with skills 190 that operate with respect to certain times of day. For example, a user may provide a user input corresponding to "order me food." A first skill 190*a* may generate first result data 830*a* corresponding to breakfast. A second skill 190*b* may generate second result data 830*b* corresponding to dinner. If the system(s) 120 receives the user input in the morning, the post-NLU ranker 165 may increase the NLU processing confidence score associated with the first skill 190*a* and/or decrease the NLU processing score associated with the second skill 190*b*. If the system(s) 120 receives the user input in the afternoon or evening, the post-NLU ranker 165 may increase the NLU processing confidence score associated with the second skill 190*b* and/or decrease the NLU processing confidence score associated with the first skill 190*a*.

The other data 820 may include information indicating user preferences. The system may include multiple skills 190 configured to execute in substantially the same manner. For example, a first skill 190*a* and a second skill 190*b* may both be configured to order food from respective restaurants. The system may store a user preference (e.g., in the profile storage 170) that is associated with the user that provided the user input to the system(s) 120 as well as indicates the user prefers the first skill 190*a* over the second skill 190*b*. Thus, when the user provides a user input that may be executed by both the first skill 190*a* and the second skill 190*b*, the post-NLU ranker 165 may increase the NLU processing confidence score associated with the first skill 190*a* and/or decrease the NLU processing confidence score associated with the second skill 190*b*.

The other data 820 may include information indicating system usage history associated with the user that originated the user input. For example, the system usage history may indicate the user originates user inputs that invoke a first skill 190*a* more often than the user originates user inputs that invoke a second skill 190*b*. Based on this, if the present user input may be executed by both the first skill 190*a* and the second skill 190*b*, the post-NLU ranker 165 may increase the NLU processing confidence score associated with the first skill 190*a* and/or decrease the NLU processing confidence score associated with the second skill 190*b*.

The other data 820 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 165 may increase the NLU processing confidence score associated with a first skill 190*a* that generates audio data. The post-NLU ranker 165 may also or alternatively decrease the NLU processing confidence score associated with a second skill 190*b* that generates image data or video data.

The other data 820 may include information indicating how long it took a skill 190 to provide result data 830 to the post-NLU ranker 165. When the post-NLU ranker 165 multiple skills 190 for result data 830, the skills 190 may respond to the queries at different speeds. The post-NLU ranker 165 may implement a latency budget. For example, if the post-NLU ranker 165 determines a skill 190 responds to the post-NLU ranker 165 within a threshold amount of time from receiving a query from the post-NLU ranker 165, the post-NLU ranker 165 may increase the NLU processing confidence score associated with the skill 190. Conversely, if the post-NLU ranker 165 determines a skill 190 does not respond to the post-NLU ranker 165 within a threshold amount of time from receiving a query from the post-NLU ranker 165, the post-NLU ranker 165 may decrease the NLU processing confidence score associated with the skill 190.

It has been described that the post-NLU ranker 165 uses the other data 820 to increase and decrease NLU processing confidence scores associated with various skills 190 that the post-NLU ranker 165 has already requested result data from. Alternatively, the post-NLU ranker 165 may use the other data 820 to determine which skills 190 to request result data from. For example, the post-NLU ranker 165 may use the other data 820 to increase and/or decrease NLU processing confidence scores associated with skills 190 associated with the NLU results data 885 output by the NLU component 160. The post-NLU ranker 165 may select n-number of top scoring altered NLU processing confidence scores. The post-NLU ranker 165 may then request result data 830 from only the skills 190 associated with the selected n-number of NLU processing confidence scores.

As described, the post-NLU ranker 165 may request result data 830 from all skills 190 associated with the NLU results data 885 output by the NLU component 160. Alternatively, the system(s) 120 may prefer result data 830 from skills implemented entirely by the system(s) 120 rather than skills at least partially implemented by the skill system(s) 125. Therefore, in the first instance, the post-NLU ranker 165 may request result data 830 from only skills associated with the NLU results data 885 and entirely implemented by the system(s) 120. The post-NLU ranker 165 may only request result data 830 from skills associated with the NLU results data 885, and at least partially implemented by the skill system(s) 125, if none of the skills, wholly implemented by the system(s) 120, provide the post-NLU ranker 165 with result data 830 indicating either data response to the NLU results data 885, an indication that the skill can execute the user input, or an indication that further information is needed.

As indicated above, the post-NLU ranker 165 may request result data 830 from multiple skills 190. If one of the skills 190 provides result data 830 indicating a response to a NLU hypothesis and the other skills provide result data 830 indicating either they cannot execute or they need further information, the post-NLU ranker 165 may select the result data 830 including the response to the NLU hypothesis as the data to be output to the user. If more than one of the skills 190 provides result data 830 indicating responses to NLU hypotheses, the post-NLU ranker 165 may consider the other data 820 to generate altered NLU processing confidence scores, and select the result data 830 of the skill associated with the greatest score as the data to be output to the user.

A system that does not implement the post-NLU ranker 165 may select the highest scored NLU hypothesis in the NLU results data 885. The system may send the NLU hypothesis to a skill 190 associated therewith along with a request for output data. In some situations, the skill 190 may not be able to provide the system with output data. This results in the system indicating to the user that the user input could not be processed even though another skill associated with lower ranked NLU hypothesis could have provided output data responsive to the user input.

The post-NLU ranker 165 reduces instances of the aforementioned situation. As described, the post-NLU ranker 165 queries multiple skills associated with the NLU results data 885 to provide result data 830 to the post-NLU ranker 165 prior to the post-NLU ranker 165 ultimately determining the skill 190 to be invoked to respond to the user input. Some of the skills 190 may provide result data 830 indicating responses to NLU hypotheses while other skills 190 may providing result data 830 indicating the skills cannot provide responsive data. Whereas a system not implementing the post-NLU ranker 165 may select one of the skills 190 that could not provide a response, the post-NLU ranker 165 only selects a skill 190 that provides the post-NLU ranker 165 with result data corresponding to a response, indicating further information is needed, or indicating multiple responses can be generated.

The post-NLU ranker 165 may select result data 830, associated with the skill 190 associated with the highest score, for output to the user. Alternatively, the post-NLU ranker 165 may output ranked output data 825 indicating skills 190 and their respective post-NLU ranker rankings. Since the post-NLU ranker 165 receives result data 830, potentially corresponding to a response to the user input, from the skills 190 prior to post-NLU ranker 165 selecting one of the skills or outputting the ranked output data 825, little to no latency occurs from the time skills provide result data 830 and the time the system outputs responds to the user.

If the post-NLU ranker 165 selects result audio data to be output to a user and the system determines content should be output audibly, the post-NLU ranker 165 (or another component of the system(s) 120) may cause the device 110*a* and/or the device 110*b* to output audio corresponding to the result audio data. If the post-NLU ranker 165 selects result text data to output to a user and the system determines content should be output visually, the post-NLU ranker 165 (or another component of the system(s) 120) may cause the device 110*b* to display text corresponding to the result text data. If the post-NLU ranker 165 selects result audio data to output to a user and the system determines content should be output visually, the post-NLU ranker 165 (or another component of the system(s) 120) may send the result audio data to the ASR component 150. The ASR component 150 may generate output text data corresponding to the result audio data. The system(s) 120 may then cause the device 110*b* to display text corresponding to the output text data. If the post-NLU ranker 165 selects result text data to output to a user and the system determines content should be output audibly, the post-NLU ranker 165 (or another component of the system(s) 120) may send the result text data to the TTS component 180. The TTS component 180 may generate output audio data (corresponding to computer-generated speech) based on the result text data. The system(s) 120 may then cause the device 110*a* and/or the device 110*b* to output audio corresponding to the output audio data.

As described, a skill 190 may provide result data 830 either indicating a response to the user input, indicating more information is needed for the skill 190 to provide a response to the user input, or indicating the skill 190 cannot provide a response to the user input. If the skill 190 associated with the highest post-NLU ranker score provides the post-NLU ranker 165 with result data 830 indicating a response to the user input, the post-NLU ranker 165 (or another component of the system(s) 120, such as the orchestrator component 130) may simply cause content corresponding to the result data 830 to be output to the user. For example, the post-NLU ranker 165 may send the result data 830 to the orchestrator component 130. The orchestrator component 130 may cause the result data 830 to be sent to the device (110*a*/110*b*), which may output audio and/or display text corresponding to the result data 830. The orchestrator component 130 may send the result data 830 to the ASR component 150 to generate output text data and/or may send the result data 830 to the TTS component 180 to generate output audio data, depending on the situation.

The skill 190 associated with the highest post-NLU ranker score may provide the post-NLU ranker 165 with result data 830 indicating more information is needed as well as instruction data. The instruction data may indicate how the skill 190 recommends the system obtain the needed information. For example, the instruction data may correspond to text data or audio data (i.e., computer-generated speech) corresponding to "please indicate_." The instruction data may be in a format (e.g., text data or audio data) capable of being output by the device (110*a*/110*b*). When this occurs, the post-NLU ranker 165 may simply cause the received instruction data be output by the device (110*a*/110*b*). Alternatively, the instruction data may be in a format that is not capable of being output by the device (110*a*/110*b*). When this occurs, the post-NLU ranker 165 may cause the ASR component 150 or the TTS component 180 to process the instruction data, depending on the situation, to generate instruction data that may be output by the device (110*a*/110*b*). Once the user provides the system with all further information needed by the skill 190, the skill 190 may provide the system with result data 830 indicating a response to the user input, which may be output by the system as detailed above.

The system may include "informational" skills 190 that simply provide the system with information, which the system outputs to the user. The system may also include "transactional" skills 190 that require a system instruction to execute the user input. Transactional skills 190 include ride sharing skills, flight booking skills, etc. A transactional skill 190 may simply provide the post-NLU ranker 165 with result data 830 indicating the transactional skill 190 can execute the user input. The post-NLU ranker 165 may then cause the system to solicit the user for an indication that the system is permitted to cause the transactional skill 190 to execute the user input. The user-provided indication may be an audible indication or a tactile indication (e.g., activation of a virtual button or input of text via a virtual keyboard). In response to receiving the user-provided indication, the system may provide the transactional skill 190 with data corresponding to the indication. In response, the transactional skill 190 may execute the command (e.g., book a flight, book a train ticket, etc.). Thus, while the system may not further engage an informational skill 190 after the informational skill 190 provides the post-NLU ranker 165 with result data 830, the system may further engage a transactional skill 190 after the transactional skill 190 provides the post-NLU ranker 165 with result data 830 indicating the transactional skill 190 may execute the user input.

In some instances, the post-NLU ranker 165 may generate respective scores for first and second skills that are too close (e.g., are not different by at least a threshold difference) for the post-NLU ranker 165 to make a confident determination regarding which skill should execute the user input. When this occurs, the system may request the user indicate which skill the user prefers to execute the user input. The system may output TTS-generated speech to the user to solicit which skill the user wants to execute the user input.

Figure 9:
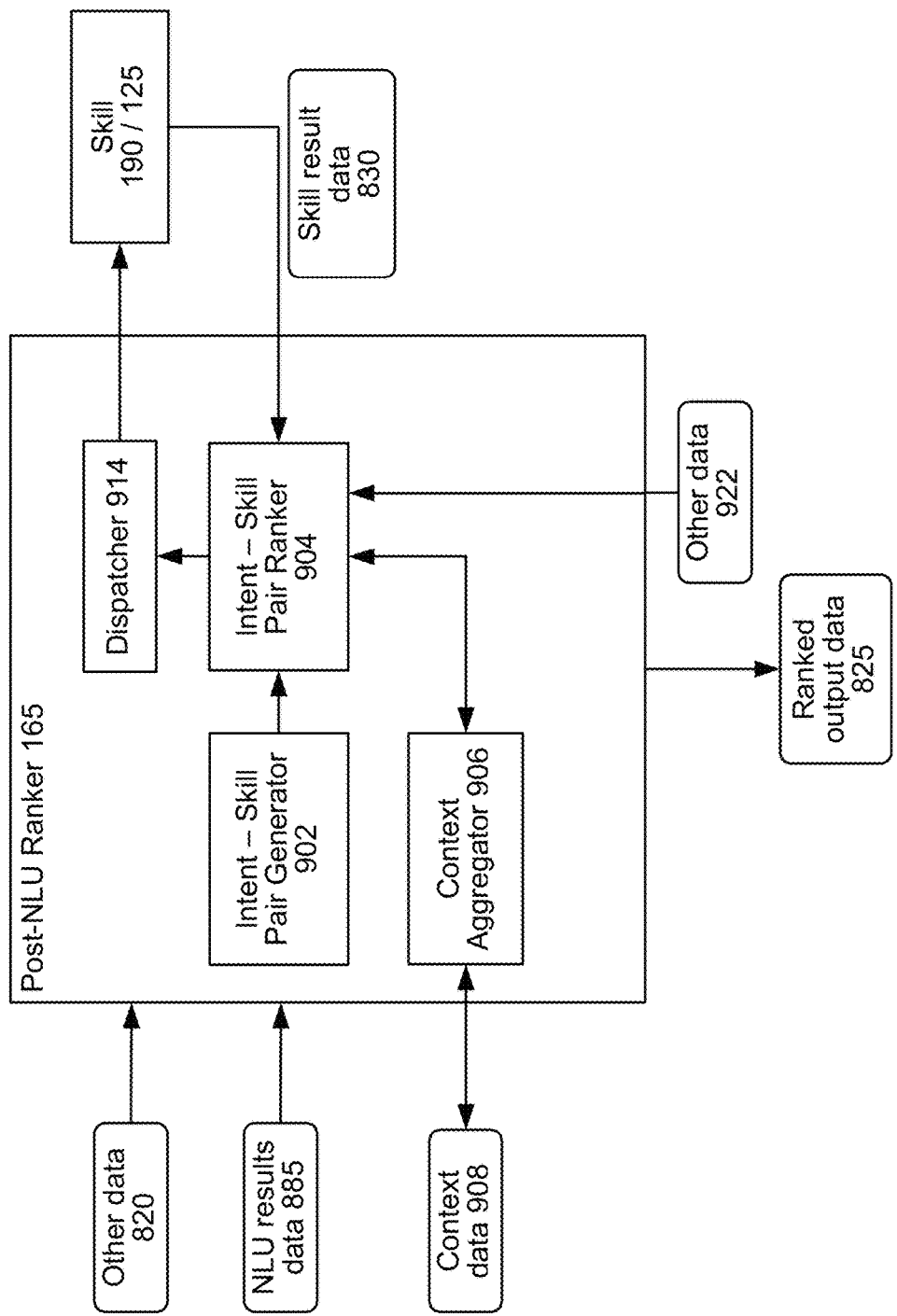
FIG. 9 is a conceptual diagram illustrating how a post-NLU ranker may process according to embodiments of the present disclosure.

FIG. 9 illustrates other configurations and operations of the post-NLU ranker 165. When the post-NLU ranker 165 receives NLU results data 885, the NLU results data 885 may be sent to an intent-skill pair generator 902. The intent-skill pair generator 902 may include information about what skills are capable of handling what intents. Such information may be context agnostic, and may thus indicate what skills are capable of handling what intents generally, without regard to the context associated with the user input. The intent-skill pair generator 902 thus receives the NLU results data 885 and identifies what particular candidate skills may handle the intent for NLU hypothesis. For example, if a NLU hypothesis includes a particular intent, the intent-skill pair generator 902 identifies each skill that may execute with respect to the intent. For further example, if the NLU results data 885 include multiple NLU hypotheses including multiple intents, the intent-skill pair generator 902 associates each different NLU hypothesis with each skill that may execute with respect to the NLU hypothesis. As illustrated, the intent-skill pair generator 902 may be implemented at part of the post-NLU ranker 165. However, one skill in the art will appreciate that the intent-skill pair generator 902 may be implemented as part of the NLU component 160 or in another component without departing from the present disclosure. In such a case, the NLU results data 885 may include intent-skill pairs.

The post-NLU ranker 165 may also include an intent-skill pair ranker 904. The intent-skill pair ranker 904 ranks the intent-skill pairs generated by the intent-skill pair generator 902 based on, for example, the number of filled slots of a NLU hypothesis, an NLU confidence score associated with a NLU hypothesis, context information output by a context aggregator 906, and/or other data.

The post-NLU ranker 165 may include the context aggregator 906. The context aggregator 906 receives context data 908 from various contextual sources. The context data 908 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 906 may aggregate the context data 908 and put the context data 908 in a form that can be processed by the intent-skill pair ranker 904. Context data 908 may include data obtained from the device 110 or from other services connected to the system(s) 120.

The context data 908 may include skill availability data. Such information may indicate what skills are available and authorized to process the user input. For example, if the user has only enabled certain skills, the enabled skills may be noted in the skill availability data.

The context data 908 may also include dialogue data. A "dialogue" or "dialogue session" as used herein may refer to data transmissions (such as relating to multiple user inputs and system(s) 120 outputs) between the system(s) 120 and a local device (e.g., the device 110) that all relate to a single originating user input. Thus, the data transmissions of a dialogue session may share a dialogue identifier or other unique identifier that may be used by the orchestrator component 130, skill(s) 190, skill server(s) 125, etc. to track information across the dialogue session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system(s) 120). The context data 908 may be one portion of the data used by the intent-skill pair ranker 904 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 908 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 908 (and/or other data 922) may include a metadata flag/indicator that represents whether the particular skill being executed is one that can handle a go-back (or other navigational) request.

The context data 908 may also include user profile data. The user profile data may represent preferences and/or characteristics of the user that originated the current user input. Such data may be received from the profile storage 170.

The context data 908 may also include location data. The location data may represent a location of the device 110 from which the user input was received.

The context data 908 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

For example, while interacting with the system, the user may refer to an entity involved in a previous exchange in a manner that is not explicit. For example, after the system answers the Starbucks query with the location of the nearest Starbucks, the user may wish to know the hours for that Starbucks and may ask the system "how late are they open?" Even though the user did not explicitly state what "they" refers to, the user may expect the system to provide the hours (or the closing time) of the Starbucks that was just part of an exchange between the user and the system. In another example, after asking the system to "play Beethoven's $5^{th}$ Symphony" the user may ask the system "when did he write that?" In order to answer the second query, the system must understand that "he" refers to Beethoven and "that" refers to the musical work $5^{th}$ Symphony. Words that refer to an entity but do not explicitly name the entity are an example of anaphora, namely a word referring to or replacing another word.

Other references to other text may also be processed by the system. For example, exophora is a reference in text to something external to the text, endophora is a reference to something preceding or following the reference within the text, and cataphora is a reference to a following word or group or words. The system may be configured to process these, and other similar types of references (which may generally be referred to below as anaphora). Further, while a language such as English may use unknown words to substitute for anaphora/(e.g., pronouns), other languages, such as Japanese may allow phrasing of anaphora without a specific word to represent the anaphora (referred to as zero-phrase anaphora), and other languages may use other forms of reference. The present system may be used to resolve many such forms of anaphora across many different languages.

The context data 908 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 908 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 908 may also include other context data not explicitly recited herein.

The intent-skill pair ranker 904 may operate one or more trained models that are configured to process the NLU results data 885, skill result data 830, and other data 922 in order to determine a single best skill for executing the current user input from the available pairs output by the intent-skill pair generator 902. The intent-skill pair ranker 904 may send queries to the skills and request a first skill and a second skill (for example the candidate skills identified by the pair generator 902), to provide potential result data indicating whether the skill can handle the intent at the particular moment and if so, what the output data for the particular skill would be (e.g., data the skill would provide to a user if the skill were selected to execute the user input) based on the NLU results data 885. For example, the intent-skill pair ranker 904 may send a first NLU hypothesis, associated with a first skill, to the first skill along with a request for the first skill to at least partially execute with respect to the first NLU hypothesis. The intent-skill pair ranker 904 may also send a second NLU hypothesis, associated with the second skill, to the second skill along with a request for the second skill to at least partially execute with respect to the second NLU hypothesis. The intent-skill pair ranker 904 receives, from the first skill, first result data 830a generated from the first skill's execution with respect to the first NLU hypothesis. The intent-skill pair ranker 904 also receives, from the second skill, second results data 830b generated from the second skill's execution with respect to the second NLU hypothesis. Based on the first results data 830a, a first NLU confidence score associated with the first NLU hypothesis, the second results data 830b, a second NLU confidence score associated with the second NLU hypothesis, and other data 922 (e.g., context data, user profile data, etc.), the intent-skill pair ranker 904 determines the best skill for executing the current user input. The intent-skill pair ranker 904 sends an indication of the best skill to a dispatcher component 914.

The dispatcher 914 may then send the selected skill the information needed to execute the user input, including an indication of the intent, the appropriate context data 908 (such as device identifier, user identifier, or the like), slot data, utterance identifier, dialogue identifier, or any other information needed.

One or more models implemented by components of the orchestrator component 130, post-NLU ranker 165, shortlister 750, or other component may be trained and operated according to various machine learning techniques.

The device 110 and/or the system(s) 120 may include a user recognition component 195 that recognizes one or more users using a variety of data. As illustrated in FIG. 10, the user recognition component 195 may include one or more subcomponents including a vision component 1008, an audio component 1010, a biometric component 1012, a radio frequency (RF) component 1014, a machine learning (ML) component 1016, and a recognition confidence component 1018. In some instances, the user recognition component 195 may monitor data and determinations from one or more subcomponents to determine an identity of one or more users associated with data input to the device 110 and/or the system(s) 120. The user recognition component 195 may output user recognition data 1095, which may include a user identifier associated with a user the user recognition component 195 determines originated data input to the device 110 and/or the system(s) 120. The user recognition data 1095 may be used to inform processes performed by various components of the device 110 and/or the system(s) 120.

The vision component 1008 may receive data from one or more sensors capable of providing images (e.g., cameras) or sensors indicating motion (e.g., motion sensors). The vision component 1008 can perform facial recognition or image analysis to determine an identity of a user and to associate that identity with a user profile associated with the user. In some instances, when a user is facing a camera, the vision component 1008 may perform facial recognition and identify the user with a high degree of confidence. In other instances, the vision component 1008 may have a low degree of confidence of an identity of a user, and the user recognition component 195 may utilize determinations from additional components to determine an identity of a user. The vision component 1008 can be used in conjunction with other components to determine an identity of a user. For example, the user recognition component 195 may use data from the vision component 1008 with data from the audio component 1010 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1012. For example, the biometric component 1012 may receive data corresponding to fingerprints, iris or retina scans, thermal scans, weights of users, a size of a user, pressure (e.g., within floor sensors), etc., and may determine a biometric profile corresponding to a user. The biometric component 1012 may distinguish between a user and sound from a television, for example. Thus, the biometric component 1012 may incorporate biometric information into a confidence level for determining an identity of a user. Biometric information output by the biometric component 1012 can be associated with specific user profile data such that the biometric information uniquely identifies a user profile of a user.

The radio frequency (RF) component 1014 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1014 the strength of the signal (e.g., as a received signal strength indication (RSSI)). The RF component 1014 may use the RSSI to determine an identity of a user (with an associated confidence level). In some instances, the RF component 1014 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1016 may track the behavior of various users as a factor in determining a confidence level of the identity of the user. By way of example, a user may adhere to a regular schedule such that the user is at a first location during the day (e.g., at work or at school). In this example, the ML component 1016 would factor in past behavior and/or trends in determining the identity of the user that provided input to the device 110 and/or the system(s) 120. Thus, the ML component 1016 may use historical data and/or usage patterns over time to increase or decrease a confidence level of an identity of a user.

In at least some instances, the recognition confidence component 1018 receives determinations from the various components 1008, 1010, 1012, 1014, and 1016, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1095.

The audio component 1010 may receive data from one or more sensors capable of providing an audio signal (e.g., one or more microphones) to facilitate recognition of a user. The audio component 1010 may perform audio recognition on an audio signal to determine an identity of the user and associated user identifier. In some instances, aspects of device 110 and/or the system(s) 120 may be configured at a computing device (e.g., a local server). Thus, in some instances, the audio component 1010 operating on a computing device may analyze all sound to facilitate recognition of a user. In some instances, the audio component 1010 may perform voice recognition to determine an identity of a user.

The audio component 1010 may also perform user identification based on audio data 111 input into the device 110 and/or the system(s) 120 for speech processing. The audio component 1010 may determine scores indicating whether speech in the audio data 111 originated from particular users. For example, a first score may indicate a likelihood that speech in the audio data 111 originated from a first user associated with a first user identifier, a second score may indicate a likelihood that speech in the audio data 111 originated from a second user associated with a second user identifier, etc. The audio component 1010 may perform user recognition by comparing speech characteristics represented in the audio data 111 to stored speech characteristics of users (e.g., stored voice profiles associated with the device 110 that captured the spoken user input).

Figure 11:
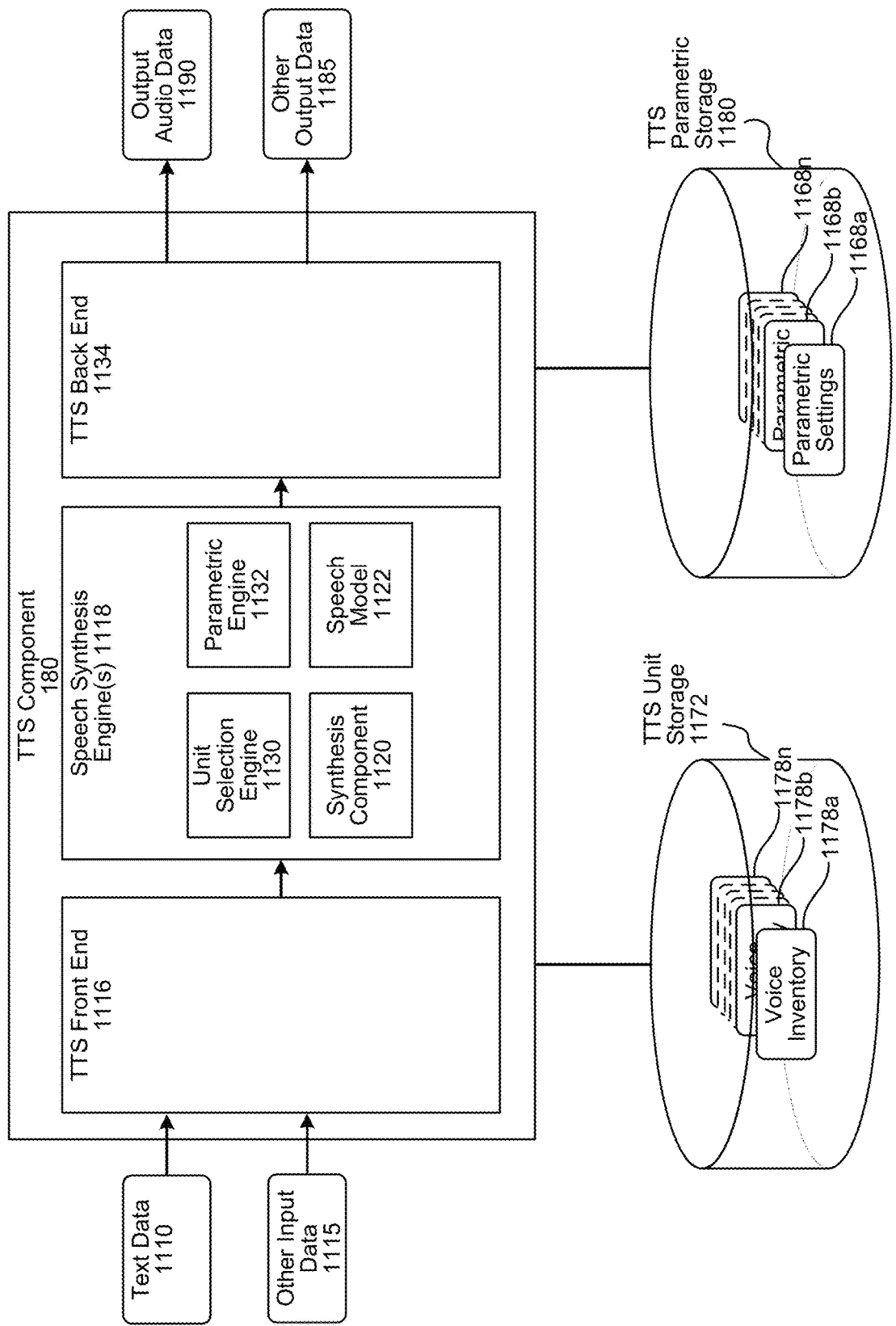
FIG. 11 is a conceptual diagram of text-to-speech components according to embodiments of the present disclosure.

Components of a system that may be used to perform unit selection, parametric TTS processing, and/or model-based audio synthesis are shown in FIG. 11. As shown in FIG. 11, the TTS component 180 may include a TTS front end 1116, a speech synthesis engine 1118, TTS unit storage 1172, TTS parametric storage 1180, and a TTS back end 1134. The TTS unit storage 1172 may include, among other things, voice inventories 1178a-1178n that may include pre-recorded audio segments (called units) to be used by the unit selection engine 1130 when performing unit selection synthesis as described below. The TTS parametric storage 1180 may include, among other things, parametric settings 1168a-1168n that may be used by the parametric synthesis engine 1132 when performing parametric synthesis as described below. A particular set of parametric settings 1168 may correspond to a particular voice profile (e.g., whispered speech, excited speech, etc.).

In various embodiments of the present disclosure, model-based synthesis of audio data may be performed using by a speech model 1122 and a TTS front end 1116. The TTS front end 1116 may be the same as front ends used in traditional unit selection or parametric systems. In other embodiments, some or all of the components of the TTS front end 1116 are based on other trained models. The present disclosure is not, however, limited to any particular type of TTS front end 1116. The speech model 1122 may be used to synthesize speech without requiring the TTS unit storage 1172 or the TTS parametric storage 1180, as described in greater detail below.

TTS component receives text data 1110. Although the text data 1110 in FIG. 11 is input into the TTS component 180, it may be output by other component(s) (such as a skill 190, NLU component 160, NLG component 179 or other component) and may be intended for output by the system. Thus in certain instances text data 1110 may be referred to as "output text data." Further, the data 1110 may not necessarily be text, but may include other data (such as symbols, code, other data, etc.) that may reference text (such as an indicator of a word) that is to be synthesized. Thus data 1110 may come in a variety of forms. The TTS front end 1116 transforms the data 1110 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1118. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1110, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1116 may also process other input data 1115, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1110 and/or the text for a TTS request may be accompanied by separate metadata indicating what text should be whispered (or have some other indicated audio characteristic). The speech synthesis engine 1118 may compare the annotated phonetic units models and information stored in the TTS unit storage 1172 and/or TTS parametric storage 1180 for converting the input text into speech. The TTS front end 1116 and speech synthesis engine 1118 may include their own controller(s)/processor(s) and memory or they may use the controller/processor and memory of the server 120, device 110, or other device, for example. Similarly, the instructions for operating the TTS front end 1116 and speech synthesis engine 1118 may be located within the TTS component 180, within the memory and/or storage of the server 120, device 110, or within an external device.

Text data 1110 input into the TTS component 180 may be sent to the TTS front end 1116 for processing. The TTS front end 1116 may include components for performing text normalization, linguistic analysis, linguistic prosody generation, or other such components. During text normalization, the TTS front end 1116 may first process the text input and generate standard text, converting such things as numbers, abbreviations (such as Apt., St., etc.), symbols ($, %, etc.) into the equivalent of written out words.

During linguistic analysis, the TTS front end 1116 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 180 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1172. The linguistic analysis performed by the TTS front end 1116 may also identify different grammatical components such as prefixes, suffixes, phrases, punctuation, syntactic boundaries, or the like. Such grammatical components may be used by the TTS component 180 to craft a natural-sounding audio waveform output. The language dictionary may also include letter-to-sound rules and other tools that may be used to pronounce previously unidentified words or letter combinations that may be encountered by the TTS component 180. Generally, the more information included in the language dictionary, the higher quality the speech output.

Based on the linguistic analysis the TTS front end 1116 may then perform linguistic prosody generation where the phonetic units are annotated with desired prosodic characteristics, also called acoustic features, which indicate how the desired phonetic units are to be pronounced in the eventual output speech. During this stage the TTS front end 1116 may consider and incorporate any prosodic annotations that accompanied the text input to the TTS component 180. Such acoustic features may include syllable-level features, word-level features, emotion, speaker, accent, language, pitch, energy, duration, and the like. Application of acoustic features may be based on prosodic models available to the TTS component 180. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1116, which may be referred to as a symbolic linguistic representation, may include a sequence of phonetic units annotated with prosodic characteristics. This symbolic linguistic representation may be sent to the speech synthesis engine 1118, which may also be known as a synthesizer, for conversion into an audio waveform of speech for output to an audio output device and eventually to a user. The speech synthesis engine 1118 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1118 may perform speech synthesis using one or more different methods. In one method of synthesis called unit selection, described further below, a unit selection engine 1130 matches the symbolic linguistic representation created by the TTS front end 1116 against a database of recorded speech, such as a database (e.g., TTS unit storage 1172) storing information regarding one or more voice corpuses (e.g., voice inventories 1178a-n). Each voice inventory may correspond to various segments of audio that was recorded by a speaking human, such as a voice actor, where the segments are stored in an individual inventory 1178 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1130 may then use the information about each unit to select units to be joined together to form the speech output.

The unit selection engine 1130 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1120) to form output audio data 1190 representing synthesized speech. Using all the information in the unit database, a unit selection engine 1130 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1132, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1120) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 180 may be configured to perform TTS processing in multiple languages. For each language, the TTS component 180 may include specially configured data, instructions and/or components to synthesize speech in the desired language(s). To improve performance, the TTS component 180 may revise/update the contents of the TTS unit storage 1172 based on feedback of the results of TTS processing, thus enabling the TTS component 180 to improve speech synthesis.

The TTS unit storage 1172 may be customized for an individual user based on his/her individualized desired speech output. In particular, the speech unit stored in a unit database may be taken from input audio data of the user speaking. For example, to create the customized speech output of the system, the system may be configured with multiple voice inventories 1178a-1178n, where each unit database is configured with a different "voice" to match desired speech qualities. Such voice inventories may also be linked to user accounts. The voice selected by the TTS component 180 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1178 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1168) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1130 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1130. As part of unit selection, the unit selection engine 1130 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1172 or in another storage component. For example, different unit selection databases may be stored in TTS unit storage 1172. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1118 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 180 may include an acoustic model, or other models, which may convert a symbolic linguistic representation into a synthetic acoustic waveform of the text input based on audio signal manipulation. The acoustic model includes rules which may be used by the parametric synthesis engine 1132 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1116.

The parametric synthesis engine 1132 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1118, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1132 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1132 may lead to a number of potential audio output sequences. Based on the acoustic model and other potential models, the potential audio output sequences may be scored according to a confidence level of the parametric synthesis engine 1132. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1168, which may represent acoustic settings matching a particular parametric "voice", may be used by the synthesis component 1120 to ultimately create the output audio data 1190.

When performing unit selection, after a unit is selected by the unit selection engine 1130, the audio data corresponding to the unit may be passed to the synthesis component 1120. The synthesis component 1120 may then process the audio data of the unit to create modified audio data where the modified audio data reflects a desired audio quality. The synthesis component 1120 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 180. For each unit that corresponds to the selected portion, the synthesis component 1120 may process the audio data for that unit to create a modified unit audio data. The modified unit audio data may then be concatenated to form the output audio data 1190. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 180. In that case, other output data 1185 may be output along with the output audio data 1190 so that an ultimate playback device (e.g., device 110) receives instructions for playback that can assist in creating the desired output audio. Thus, the other output data 1185 may include instructions or other data indicating playback device settings (such as volume, playback rate, etc.) or other data indicating how output audio data including synthesized speech should be output. For example, for whispered speech, the output audio data 1190 may include other output data 1185 that may include a prosody tag or other indicator that instructs the device 110 to slow down the playback of the output audio data 1190, thus making the ultimate audio sound more like whispered speech, which is typically slower than normal speech. In another example, the other output data 1185 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 12:
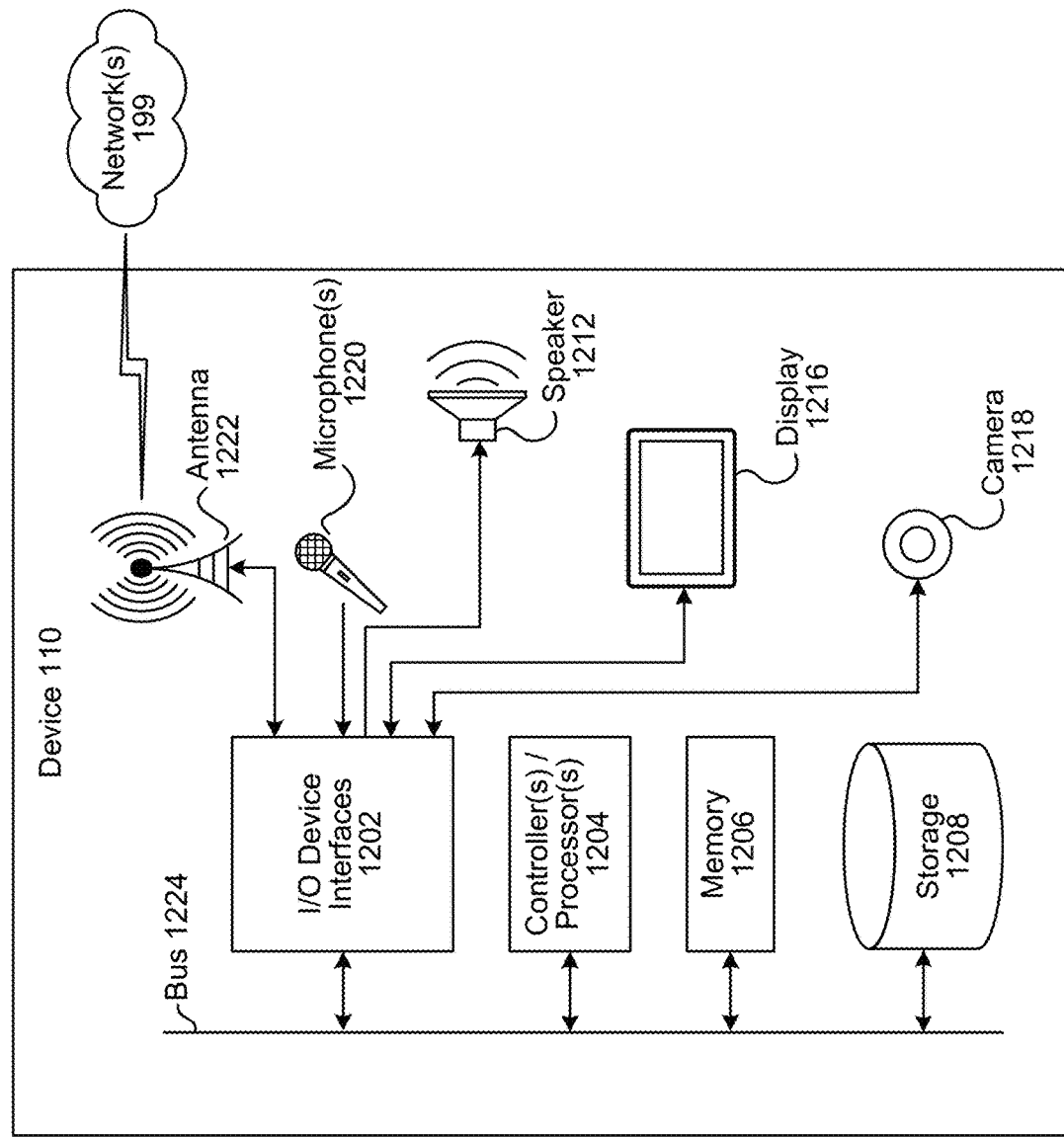
FIG. 12 is a block diagram conceptually illustrating example components of a device, according to embodiments of the present disclosure.
Figure 13:
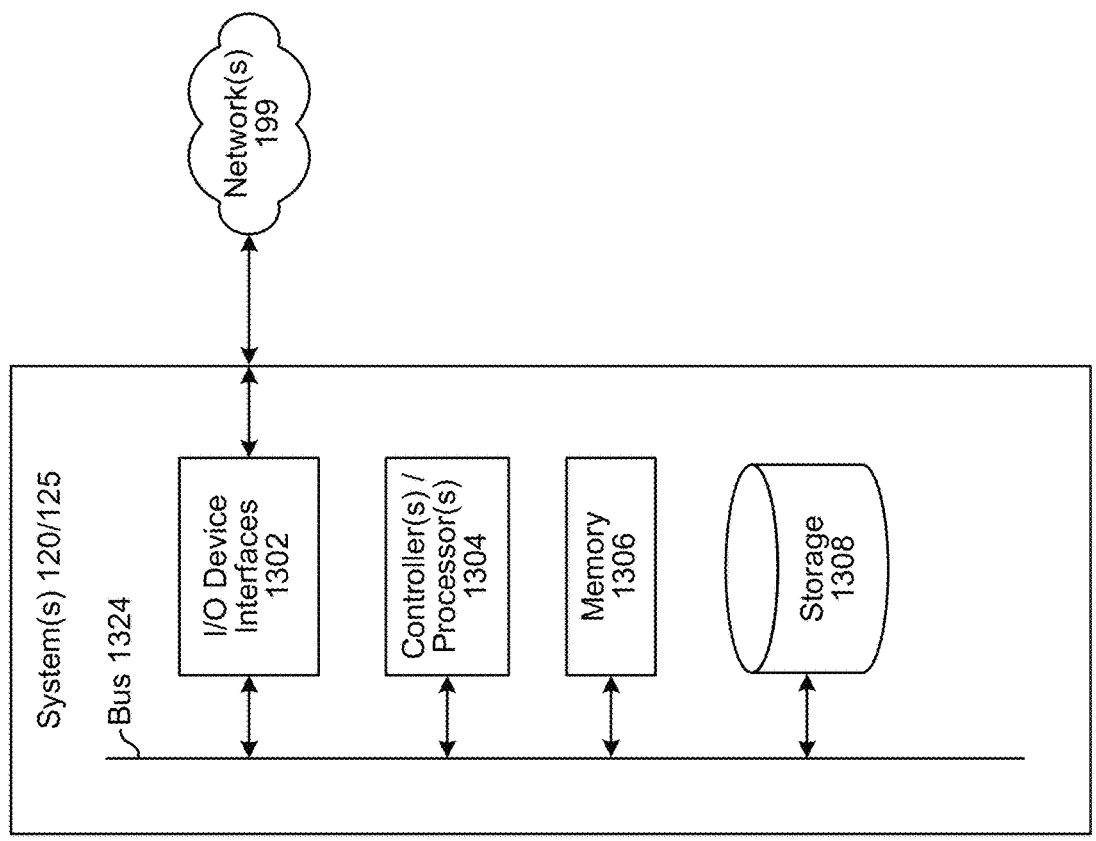
FIG. 13 is a block diagram conceptually illustrating example components of a system, according to embodiments of the present disclosure.

FIG. 12 is a block diagram conceptually illustrating a device 110 that may be used with the system. FIG. 13 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language command processing systems 120 for performing ASR processing, one or more natural language command processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120/125) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1202/1302).

Computer instructions for operating each device (110/120/125) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/125) includes input/output device interfaces (1202/1302). A variety of components may be connected through the input/output device interfaces (1202/1302), as will be discussed further below. Additionally, each device (110/120/125) may include an address/data bus (1224/1324) for conveying data among components of the respective device. Each component within a device (110/120/125) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1222, the input/output device interfaces 1202 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1202/1302) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1202/1302), processor(s) (1204/1304), memory (1206/1306), and/or storage (1208/1308) of the device(s) 110, natural language command processing system 120, or the skill system 125, respectively. Thus, the ASR component 150 may have its own I/O interface(s), processor(s), memory, and/or storage; the NLU component 160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system.

As illustrated in FIG. 14, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 160, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
 receiving, from a voice-controlled device, first input audio data representing a command and a first identifier corresponding to a first assistant profile;
 determining, based on the first identifier, that the first assistant profile represents an active assistant profile for a dialog that includes the command;
 performing speech processing on the first input audio data to determine speech processing results data indicating a skill for processing the command;
 sending, to the skill, the speech processing results data and the first identifier, wherein the first identifier indicates a request that the skill is to process the speech processing results data using first data corresponding to the first assistant profile;
 determining, by the skill, that the speech processing results data corresponds to a second assistant profile;
 receiving, from the skill, a second identifier corresponding to the second assistant profile;
 in response to receiving the second identifier, changing the active assistant profile such that the second assistant profile is the active assistant profile for the dialog;

sending, to the skill, the speech processing results data and the second identifier, wherein the second identifier corresponds to a request that the skill is to process the speech processing results data using second data corresponding to the second assistant profile;

receiving, from the skill, first response data based on processing the speech processing results data using the second data;

determining that the first response data corresponds to the dialog;

in response to determining that the first response data corresponds to the dialog, generating first synthesized speech in a first speech style corresponding to the second assistant profile, the first synthesized speech representing the first response data; and causing the voice-controlled device to output the first synthesized speech.

2. The method of claim 1, further comprising:
determining, based on the speech processing results data, that the command represents a request to initiate a communications session;
determining, based on the speech processing results data, a target entity for the communications session; and
determining that the target entity potentially corresponds to a contact in a contact list associated with the second assistant profile, wherein determining that the speech processing results data corresponds to a second assistant profile is based on determining that the target entity potentially corresponds to the contact.

3. The method of claim 1, further comprising:
determining, based on the speech processing results data, that the command represents a request to initiate a communications session;
determining, based on the speech processing results data, a target entity for the communications session;
determining that a first contact list associated with the first assistant profile includes a first contact potentially corresponding to the target entity;
determining that a second contact list associated with the second assistant profile includes a second contact potentially corresponding to the target entity;
causing the voice-controlled device to output a prompt representing a request for selection of the first contact or the second contact; and
receiving, from the voice-controlled device, second input audio data indicating a selection of the second contact, wherein determining that the speech processing results data corresponds to the second assistant profile is based on receiving the second input audio data.

4. The method of claim 1, wherein determining that the speech processing results data corresponds to a second assistant profile includes:
determining, based on a device profile associated with the voice-controlled device, a plurality of assistant profiles available for executing commands received by the voice-controlled device;
determining, based on the speech processing results data, that the command represents a request to initiate a communications session;
determining, based on the request to initiate the communications session, a subset of the plurality of assistant profiles having a capability associated with initiating the communications session, the subset including the second assistant profile;
determining, based on the speech processing results data, a target entity for the communications session;
determining a contact potentially corresponding to the target entity; and
determining that the contact is in a contact list associated with the second assistant profile.

5. A computer-implemented method comprising:
receiving speech processing results data indicating a first skill for processing a user command;
determining a first assistant profile associated with the user command;
sending, to the first skill, the speech processing results data and a first identifier corresponding to the first assistant profile, wherein the first identifier indicates a request that the first skill is to process the speech processing results data using first data corresponding to the first assistant profile;
receiving, from the first skill, a second identifier corresponding to a second assistant profile;
in response to receiving the second identifier, determining that the second assistant profile is an active assistant profile;
sending, to the first skill, the speech processing results data and the second identifier, wherein the second identifier corresponds to a request that the first skill is to process the speech processing results data using second data corresponding to the second assistant profile;
receiving, from the first skill, first response data based on processing the speech processing results data using the second data; and
generating first output data corresponding to the second assistant profile, the first output data representing the first response data.

6. The computer-implemented method of claim 5, further comprising:
determining a user identifier associated with the user command;
sending, to the first skill, the user identifier; and
determining, by the first skill based on at least the user identifier, that the speech processing results data corresponds to the second assistant profile.

7. The computer-implemented method of claim 5, further comprising:
determining, based on the speech processing results data, that the user command represents a request to perform an action with respect to a target entity;
determining that the target entity potentially corresponds to the second data; and
determining, based on determining that the target entity potentially corresponds to the second data, that the speech processing results data corresponds to a second assistant profile.

8. The computer-implemented method of claim 5, further comprising:
determining, based on the speech processing results data, that the user command represents a request to perform an action with respect to a target entity;
determining that a first entity list associated with the first assistant profile includes a first entity potentially corresponding to the target entity;
determining that a second entity list associated with the second assistant profile includes a second entity potentially corresponding to the target entity;
causing a user device to output a prompt representing a request for selection of the first entity or the second entity;
receiving, from the user device, second input audio data indicating a selection of the second entity; and determining, based on the second input audio data, that the speech processing results data corresponds to the second assistant profile.

9. The computer-implemented method of claim 5, further comprising:
determining, based on a device profile associated with a user device that received the user command, a plurality of virtual assistants available for executing commands received by the user device;
determining, based on the speech processing results data, a subset of the plurality of virtual assistants having a capability associated with an intent in the speech processing results data, the subset including the second assistant profile;
resolving an entity represented in the speech processing results data;
determining that the entity is in an entity list associated with the second assistant profile; and
determining, based on determining that the entity is in an entity list associated with the second assistant profile, that the speech processing results data corresponds to a second assistant profile.

10. The computer-implemented method of claim 9, further comprises:
determining, based on the speech processing results data, that the user command represents a request to initiate a communications session with the entity;
sending, by the first skill to a second skill, the entity; and
initiating, by the second skill, the communications session based on the entity.

11. The computer-implemented method of claim 5, further comprises:
determining that the first response data corresponds to a dialog that includes the user command;
in response to determining that the first response data corresponds to the dialog, generating the first output data by generating first synthesized speech in a speech style corresponding to the second assistant profile, the first synthesized speech representing the first response data; and
causing a user device to output the first synthesized speech.

12. The computer-implemented method of claim 11, further comprising:
in response to determining that the second assistant profile is the active assistant profile, generating second synthesized speech in a second speech style corresponding to the first assistant profile and indicating that the second assistant profile is the active assistant profile; and
causing the user device to output the second synthesized speech prior to the first synthesized speech.

13. A system, comprising:
at least one processor; and
at least one memory comprising instructions that, when executed by the at least one processor, cause the system to:
receive speech processing results data indicating a first skill for processing a user command;
determine a first assistant profile associated with the user command;
send, to the first skill, the speech processing results data and a first identifier corresponding to the first assistant profile, wherein the first identifier indicates a request that the first skill is to process the speech processing results data using first data corresponding to the first assistant profile;
receive, from the first skill, a second identifier corresponding to a second assistant profile;
in response to receiving the second identifier, determine that the second assistant profile is an active assistant profile;
send, to the first skill, the speech processing results data and the second identifier, wherein the second identifier corresponds to a request that the first skill is to process the speech processing results data using second data corresponding to the second assistant profile;
receive, from the first skill, first response data based on processing the speech processing results data using the second data; and
generate first output data corresponding to the second assistant profile, the first output data representing the first response data.

14. The system of claim 13, wherein the at least one memory further comprises instructions that, when executed by the at least one processor, further cause the system to:
determine a user identifier associated with the user command;
send, to the first skill, the user identifier; and
determine, by the first skill based on at least the user identifier, that the speech processing results data corresponds to the second assistant profile.

15. The system of claim 13, wherein the at least one memory further comprises instructions that, when executed by the at least one processor, further cause the system to:
determine, based on the speech processing results data, that the user command represents a request to perform an action with respect to a target entity;
determine that the target entity potentially corresponds to the second data; and
determining, based on determining that the target entity potentially corresponds to the second data, that the speech processing results data corresponds to a second assistant profile.

16. The system of claim 13, wherein the at least one memory further comprises instructions that, when executed by the at least one processor, further cause the system to:
determine, based on the speech processing results data, that the user command represents a request to perform an action with respect to a target entity;
determine that a first entity list associated with the first assistant profile includes a first entity potentially corresponding to the target entity;
determine that a second entity list associated with the second assistant profile includes a second entity potentially corresponding to the target entity;
cause a user device to output a prompt representing a request for selection of the first entity or the second entity;
receive, from the user device, second input audio data indicating a selection of the second entity; and
determine, based on the second input audio data, that the speech processing results data corresponds to the second assistant profile.

17. The system of claim 13, wherein the at least one memory further comprises instructions that, when executed by the at least one processor, further cause the system to:
determine, based on a device profile associated with a user device that received the user command, a plurality of virtual assistants available for executing commands received by the user device;
determine, based on the speech processing results data, a subset of the plurality of virtual assistants having a capability associated with an intent in the speech processing results data, the subset including the second assistant profile;

resolve an entity represented in the speech processing results data;

determine that the entity is in an entity list with the second assistant profile; and determining, based on determining that the entity is in an entity list associated with the second assistant profile, that the speech processing results data corresponds to a second assistant profile.

18. The system of claim 17, wherein the at least one memory further comprises instructions that, when executed by the at least one processor, further cause the system to:

determine, based on the speech processing results data, that the user command represents a request to initiate a communications session with the entity;

send, by the first skill to a second skill, the entity; and initiating, by the second skill, the communications session based on the entity.

19. The system of claim 13, wherein the at least one memory further comprises instructions that, when executed by the at least one processor, further cause the system to:

determine that the first response data corresponds to a dialog that includes the user command;

in response to determining that the first response data corresponds to the dialog, generate the first output data by generating first synthesized speech in a speech style corresponding to the second assistant profile, the first synthesized speech representing the first response data; and cause a user device to output the first synthesized speech.

20. The system of claim 19, wherein the at least one memory further comprises instructions that, when executed by the at least one processor, further cause the system to:

in response to determining that the second assistant profile is the active assistant profile, generate second synthesized speech in a second speech style corresponding to the first assistant profile and indicating that the second assistant profile is the active assistant profile; and cause the user device to output the second synthesized speech prior to the first synthesized speech.

* * * * *